US012116886B2

(12) United States Patent
Gordon et al.

(10) Patent No.: US 12,116,886 B2
(45) Date of Patent: Oct. 15, 2024

(54) APPARATUS FOR MONITORING THE INTEGRITY OF A SUBSEA WELL AND A METHOD THEREOF

(71) Applicant: SENTINEL SUBSEA LTD, Moray (GB)

(72) Inventors: Neil Ralph Gordon, Moray (GB); Andrew Jaffrey, Moray (GB)

(73) Assignee: SENTINEL SUBSEA LTD, Moray (GB)

( * ) Notice: Subject to any disclaimer, the term of this patent is extended or adjusted under 35 U.S.C. 154(b) by 349 days.

(21) Appl. No.: 17/053,373

(22) PCT Filed: May 7, 2019

(86) PCT No.: PCT/GB2019/051258
§ 371 (c)(1),
(2) Date: Nov. 6, 2020

(87) PCT Pub. No.: WO2019/215438
PCT Pub. Date: Nov. 14, 2019

(65) Prior Publication Data
US 2021/0071519 A1 Mar. 11, 2021

(30) Foreign Application Priority Data
May 8, 2018 (GB) .................................. 1807489

(51) Int. Cl.
*E21B 43/01* (2006.01)
*E21B 47/11* (2012.01)
*F17D 5/02* (2006.01)

(52) U.S. Cl.
CPC .......... *E21B 47/11* (2020.05); *E21B 43/0122* (2013.01); *F17D 5/02* (2013.01)

(58) Field of Classification Search
CPC ...... E21B 47/11; E21B 43/0122; E21B 47/10; E21B 47/111; E21B 43/01; E21B 44/00;
(Continued)

(56) References Cited

U.S. PATENT DOCUMENTS 1,909,205 A * 5/1933 Mccollum ................ G01V 1/42
367/36
2,638,167 A * 5/1953 Jones .................. E21B 33/1208
285/422
(Continued)

FOREIGN PATENT DOCUMENTS

| GB | 2573661 B | 9/2020 |
| WO | 2012/027476 A1 | 3/2012 |
| WO | 2013/169255 A1 | 11/2013 |

OTHER PUBLICATIONS

International Preliminary Report on Patentability dated Nov. 19, 2020 from corresponding International Patent Application No. PCT/GB2019/051258, 7 pages.
(Continued)

*Primary Examiner* — Edwin J Toledo-Duran
(74) *Attorney, Agent, or Firm* — Ruggiero McAllister & McMahon LLC

(57) ABSTRACT

A passive detection system is used for monitoring the integrity of abandoned, suspended, and/or decommissioned subsea wells or carbon dioxide sequestration reservoirs, where the system utilises a passive detector that reacts to the presence of a predetermined chemical to release a buoyant beacon. The beacon travels under buoyancy to the sea surface, where it transmits signals to an operator to alert the operator to a potential loss of integrity at the site. The system can include a trigger that initially restrains the beacon, but degrades in response to contact with the predetermined chemical. The system can include gathering and concentrating devices that collect the leaking chemical and direct the
(Continued)

collected chemical towards the trigger, facilitating contact between the chemical and trigger and resulting degradation. Once the trigger has degraded sufficiently, it loses structural integrity and fails, releasing the beacon.

29 Claims, 20 Drawing Sheets

(58) Field of Classification Search
CPC ...... E21B 33/1208; E21B 23/00; E21B 41/00; E21B 47/02208; E21B 47/1015; E21B 34/063; E21B 49/081; F17D 5/02; G01M 3/042; G01M 3/20; G01N 1/16; G01N 1/12; G01N 1/40; G01N 1/2042; G01N 1/04; G01N 11/02; G01N 2001/1056; G01N 2001/1031; G01V 1/3852; G01V 15/00; F16K 99/0059; F16K 99/003; B01L 2200/027; B01L 2400/0683
See application file for complete search history.

(56) References Cited

U.S. PATENT DOCUMENTS 2,918,579 A * 12/1959 Dunlap .................. G01V 9/007 250/301
3,361,203 A * 1/1968 Rensvold .............. E21B 43/082 166/228
3,399,727 A * 9/1968 Graham ................ E21B 43/267 166/280.1
3,571,591 A * 3/1971 Bradley ............... G01N 33/241 250/255
3,729,855 A * 5/1973 Niskin ................... A01K 80/00 43/9.1
3,740,739 A * 6/1973 Griffin, III ............ G01P 13/002 175/48
3,766,733 A * 10/1973 Drzewiecki .............. H01H 7/02 60/632
3,826,144 A * 7/1974 Wessels ................... G01N 1/12 73/863.31
3,848,226 A * 11/1974 Perez ........................ B63C 7/26 367/133
3,961,187 A * 6/1976 Barringer ................. G01V 8/02 250/301
4,050,517 A * 9/1977 Matthews ............... F24T 10/10 165/45
4,057,780 A * 11/1977 Shuck ...................... G01V 1/00 166/305.1
4,065,753 A * 12/1977 Paul, Jr. ............... A01K 11/006 455/92
4,092,858 A * 6/1978 Edgerton ................. G01V 1/38 73/170.29
4,332,297 A * 6/1982 Sandiford .............. C09K 8/588 166/246
4,374,543 A * 2/1983 Richardson ............. E21B 43/25 166/376
4,430,552 A * 2/1984 Peterson ................. B63B 21/60 367/133
4,464,994 A * 8/1984 Porter ....................... F42D 1/18 102/319
4,547,468 A * 10/1985 Jones .................... C04B 35/486 166/280.2
4,579,175 A * 4/1986 Grodde ................... E21B 43/32 166/295
4,631,956 A * 12/1986 Walden ................. B63B 22/003 441/25
4,791,251 A * 12/1988 Carter ....................... A61L 9/12 222/638
4,893,505 A * 1/1990 Marsden ................. E21B 49/10 374/E1.004
4,988,238 A * 1/1991 Szekely ................. C09K 17/12 405/270
5,022,013 A * 6/1991 Dalton .................... B63B 22/06 367/4
5,058,674 A * 10/1991 Schultz ................. E21B 49/082 166/264
5,348,501 A * 9/1994 Brown .................... B63B 22/06 441/2
5,417,285 A * 5/1995 Van Buskirk ......... E21B 33/127 166/292
5,441,110 A * 8/1995 Scott, III .............. E21B 49/006 166/308.1
5,503,225 A * 4/1996 Withers .................. E21B 47/01 166/250.1
5,607,017 A * 3/1997 Owens .................... E21B 33/12 166/317
5,623,993 A * 4/1997 Van Buskirk ........... E21B 43/14 166/292
5,685,372 A * 11/1997 Gano .................... E21B 34/102 166/292
5,765,641 A * 6/1998 Shy ....................... E21B 23/006 166/292
5,826,661 A * 10/1998 Parker ..................... E21B 33/12 166/135
6,026,903 A * 2/2000 Shy ....................... E21B 34/063 166/292
6,076,600 A * 6/2000 Vick, Jr. ............. E21B 33/1208 166/376
6,120,337 A * 9/2000 Bautista Real ........... B63C 9/26 441/84
6,128,949 A * 10/2000 Kleinberg ........... E21B 49/0875 73/61.79
6,161,622 A * 12/2000 Robb ...................... E21B 23/00 166/292
6,220,350 B1 * 4/2001 Brothers ................. E21B 33/12 166/376
6,367,549 B1 * 4/2002 Chatterji ................. C04B 26/14 166/295
6,443,228 B1 * 9/2002 Aronstam ............... E21B 47/12 73/152.55
6,457,539 B1 * 10/2002 Skinner ................. E21B 49/081 175/58
6,554,068 B1 * 4/2003 Chatterji ................. E21B 33/16 166/386
6,561,275 B2 * 5/2003 Glass ...................... E21B 33/12 166/376
6,578,405 B2 * 6/2003 Kleinberg .............. G01V 9/007 73/19.01
6,619,311 B2 * 9/2003 O'Connor ........... F16K 99/0051 137/118.06
6,891,477 B2 * 5/2005 Aronstam ............. G01F 15/061 340/854.6
6,898,529 B2 * 5/2005 Gao ........................ E21B 43/26 702/11
7,021,389 B2 * 4/2006 Bishop .................. E21B 34/142 166/373
7,082,993 B2 * 8/2006 Ayoub .................... E21B 47/09 166/250.1
7,134,492 B2 * 11/2006 Willberg .............. E21B 43/267 166/308.1
7,197,923 B1 * 4/2007 Wright .................. E21B 49/081 73/152.23
7,216,533 B2 * 5/2007 McGregor ............ E21B 49/008 73/152.27
7,301,474 B2 * 11/2007 Zimmerman ........... E21B 47/13 340/854.6
7,318,912 B2 * 1/2008 Pezzuto ................ B01F 35/713 422/50
7,322,417 B2 * 1/2008 Rytlewski ............... E21B 43/14 166/313
7,455,667 B2 * 11/2008 Uhland ................. A61M 37/00 604/890.1
7,539,081 B2 * 5/2009 Aoyama ................ G01V 9/007 367/87
7,712,521 B2 * 5/2010 Sorensen ............ E21B 33/1208 166/317
7,712,527 B2 * 5/2010 Roddy .................. E21B 47/138 166/250.14

(56) References Cited

U.S. PATENT DOCUMENTS

| | | | |
|---|---|---|---|
| 7,775,285 B2* | 8/2010 | Surjaatmadja | E21B 34/142 166/308.1 |
| 7,775,286 B2* | 8/2010 | Duphorne | E21B 34/063 166/376 |
| 7,796,466 B2* | 9/2010 | Combee | G01V 1/38 367/134 |
| 7,806,189 B2* | 10/2010 | Frazier | E21B 34/063 166/376 |
| 7,918,126 B2 | 4/2011 | McStay et al. | |
| 7,931,363 B2* | 4/2011 | Burress | B41J 2/0057 347/88 |
| 8,056,643 B2* | 11/2011 | Basmajian | E21B 34/10 166/334.1 |
| 8,061,388 B1* | 11/2011 | O'Brien | F16L 55/1011 166/292 |
| 8,129,318 B2* | 3/2012 | McDaniel | C09K 8/805 250/260 |
| 8,230,731 B2* | 7/2012 | Dyer | E21B 43/08 73/152.18 |
| 8,519,713 B2* | 8/2013 | Lawrence | G01N 33/2841 324/324 |
| 9,146,225 B2* | 9/2015 | Pottorf | G01N 33/241 |
| 9,261,391 B2* | 2/2016 | Berger, III | G06T 7/20 |
| 9,366,128 B2* | 6/2016 | Brouwer | E21B 19/084 |
| 9,526,228 B2* | 12/2016 | Fraser | A01K 61/95 |
| 9,568,628 B2* | 2/2017 | Berger, III | E21B 47/12 |
| 9,650,887 B2* | 5/2017 | Albinsson | E21B 43/01 |
| 9,696,193 B2* | 7/2017 | Martin | E21B 47/10 |
| 9,772,261 B2* | 9/2017 | Angelescu | A61M 5/14248 |
| 9,845,672 B2* | 12/2017 | Di | G01F 1/662 |
| 9,869,613 B2* | 1/2018 | Hausot | A61M 5/14276 |
| 9,879,492 B2* | 1/2018 | Kitzman | E21B 33/1204 |
| 9,885,229 B2* | 2/2018 | Kitzman | E21B 43/103 |
| 9,891,331 B2* | 2/2018 | Hornbostel | G01V 1/38 |
| 9,915,114 B2* | 3/2018 | Greenlee | E21B 33/1293 |
| 9,994,759 B2* | 6/2018 | Rothrock | C09K 8/03 |
| 9,995,846 B2* | 6/2018 | Erneland | G01V 1/3808 |
| 10,076,099 B2* | 9/2018 | Fraser | G06M 11/00 |
| 10,309,217 B2* | 6/2019 | Lawson | E21B 47/11 |
| 10,400,535 B1* | 9/2019 | Greenlee | E21B 33/128 |
| 10,480,685 B2* | 11/2019 | Bombino | F16L 1/163 |
| 10,677,008 B2* | 6/2020 | Xu | E21B 29/02 |
| 10,961,975 B2* | 3/2021 | Novek | E02B 9/08 |
| 11,015,430 B2* | 5/2021 | Angelescu | E21B 47/0224 |
| 11,313,192 B2* | 4/2022 | Li | E21B 33/1293 |
| 11,505,297 B2* | 11/2022 | Chelaru | B63G 8/001 |
| 11,585,210 B2* | 2/2023 | Al-Qasim | E21B 47/11 |
| 2001/0036667 A1 | 11/2001 | Tayebi et al. | |
| 2003/0092393 A1* | 5/2003 | Tokhtuev | G01N 35/00871 455/67.11 |
| 2003/0104590 A1* | 6/2003 | Santini, Jr. | B01L 3/50853 435/174 |
| 2004/0168811 A1* | 9/2004 | Shaw | E21B 41/02 166/368 |
| 2004/0250460 A1* | 12/2004 | Scott | A01M 25/006 43/1 |
| 2005/0205264 A1* | 9/2005 | Starr | E21B 33/134 166/243 |
| 2005/0241828 A1* | 11/2005 | Almond | C09K 8/5045 166/292 |
| 2006/0086503 A1* | 4/2006 | Reddy | C04B 40/0658 166/293 |
| 2006/0131031 A1* | 6/2006 | McKeachnie | E21B 33/1294 166/387 |
| 2007/0017675 A1* | 1/2007 | Hammami | E21B 43/086 166/278 |
| 2007/0039741 A1* | 2/2007 | Hailey, Jr. | E21B 43/08 166/228 |
| 2007/0044958 A1* | 3/2007 | Rytlewski | E21B 34/14 166/381 |
| 2007/0048192 A1* | 3/2007 | Kartalov | F16K 99/003 422/400 |
| 2007/0051521 A1* | 3/2007 | Fike | E21B 23/06 166/120 |
| 2007/0107908 A1* | 5/2007 | Vaidya | C09K 8/80 166/376 |
| 2007/0193377 A1* | 8/2007 | Irani | E21B 49/081 73/152.28 |
| 2007/0215352 A1* | 9/2007 | Shaw | E21B 34/063 166/321 |
| 2007/0221384 A1* | 9/2007 | Murray | E21B 34/063 166/185 |
| 2008/0047836 A1* | 2/2008 | Strand | B01L 3/502715 422/68.1 |
| 2008/0115932 A1* | 5/2008 | Cooke, Jr. | C09K 8/887 166/371 |
| 2008/0128130 A1* | 6/2008 | Whitsitt | E21B 43/04 166/278 |
| 2008/0149345 A1* | 6/2008 | Marya | E21B 33/1208 166/376 |
| 2008/0149351 A1* | 6/2008 | Marya | E21B 23/00 166/387 |
| 2008/0156489 A1* | 7/2008 | Pershikova | C09K 8/80 166/280.1 |
| 2008/0199351 A1* | 8/2008 | Woodbridge | A61L 9/015 422/4 |
| 2008/0251253 A1* | 10/2008 | Lumbye | E21B 33/16 166/317 |
| 2008/0271898 A1* | 11/2008 | Turley | E21B 33/134 166/138 |
| 2009/0084539 A1* | 4/2009 | Duan | C08G 18/44 166/292 |
| 2009/0101334 A1* | 4/2009 | Baser | E21B 33/138 166/284 |
| 2009/0126996 A1* | 5/2009 | Villareal | E21B 17/16 175/50 |
| 2009/0255674 A1* | 10/2009 | Boney | E21B 33/13 166/284 |
| 2009/0255686 A1* | 10/2009 | Richard | E21B 43/086 166/205 |
| 2009/0288820 A1* | 11/2009 | Barron | C04B 35/62894 166/250.1 |
| 2010/0051266 A1* | 3/2010 | Roddy | E21B 47/13 166/250.01 |
| 2010/0212891 A1* | 8/2010 | Stewart | E21B 41/0085 166/250.12 |
| 2010/0294510 A1* | 11/2010 | Holmes | E21B 41/00 166/243 |
| 2011/0042088 A1* | 2/2011 | Gassemzadeh | C04B 14/46 166/292 |
| 2011/0186290 A1* | 8/2011 | Roddy | E21B 47/09 166/253.1 |
| 2011/0198221 A1* | 8/2011 | Angelescu | F16K 99/0059 422/68.1 |
| 2011/0284232 A1* | 11/2011 | Huang | E21B 34/06 977/775 |
| 2011/0308802 A1* | 12/2011 | Ladva | C09K 8/035 166/305.1 |
| 2011/0311719 A1* | 12/2011 | Bicerano | E21B 47/00 427/129 |
| 2011/0314936 A1* | 12/2011 | Baxter | E21B 49/088 73/863 |
| 2011/0315381 A1* | 12/2011 | Streetman | E21B 21/003 166/292 |
| 2012/0012315 A1* | 1/2012 | Woytowich | C04B 40/0028 106/681 |
| 2012/0037368 A1* | 2/2012 | Eick | C09K 8/92 166/300 |
| 2012/0048538 A1* | 3/2012 | Brannon | G01V 1/40 166/308.1 |
| 2012/0168152 A1* | 7/2012 | Casciaro | E21B 44/00 166/250.03 |
| 2012/0181034 A1* | 7/2012 | Bour | C09K 8/508 166/310 |
| 2013/0269423 A1* | 10/2013 | Angelescu | E21B 47/02 73/54.01 |
| 2014/0212986 A1 | 7/2014 | Angelescu et al. | |
| 2014/0260553 A1 | 9/2014 | Kern et al. | |

(56) References Cited

U.S. PATENT DOCUMENTS

| | | | |
|---|---|---|---|
| 2015/0250140 A1* | 9/2015 | Fraser | A01K 61/95 340/573.2 |
| 2015/0285060 A1 | 10/2015 | Albinsson et al. | |
| 2015/0345688 A1 | 12/2015 | Kersey et al. | |
| 2017/0354121 A1* | 12/2017 | Fraser | G06M 11/00 |
| 2018/0216453 A1* | 8/2018 | Angelescu | G01N 1/40 |
| 2018/0223624 A1* | 8/2018 | Fripp | E21B 34/063 |
| 2020/0257009 A1* | 8/2020 | Pei | B63B 22/00 |
| 2022/0090992 A1* | 3/2022 | Mortensen | B64C 39/024 |

OTHER PUBLICATIONS

GB Search and Examination Report dated May 24, 2019 from corresponding Application No. 1906431.0, 9 pages.
International Search Report dated Sep. 5, 2019 from corresponding International Patent Application No. PCT/GB2019/051258, 4 pages.
Written Opinion dated Sep. 5, 2019 from corresponding International Patent Application No. PCT/GB2019/051258, 5 pages.
Examination Report dated Feb. 22, 2021 from corresponding European Patent Application No. 19 730 873.7, 4 pages.

* cited by examiner

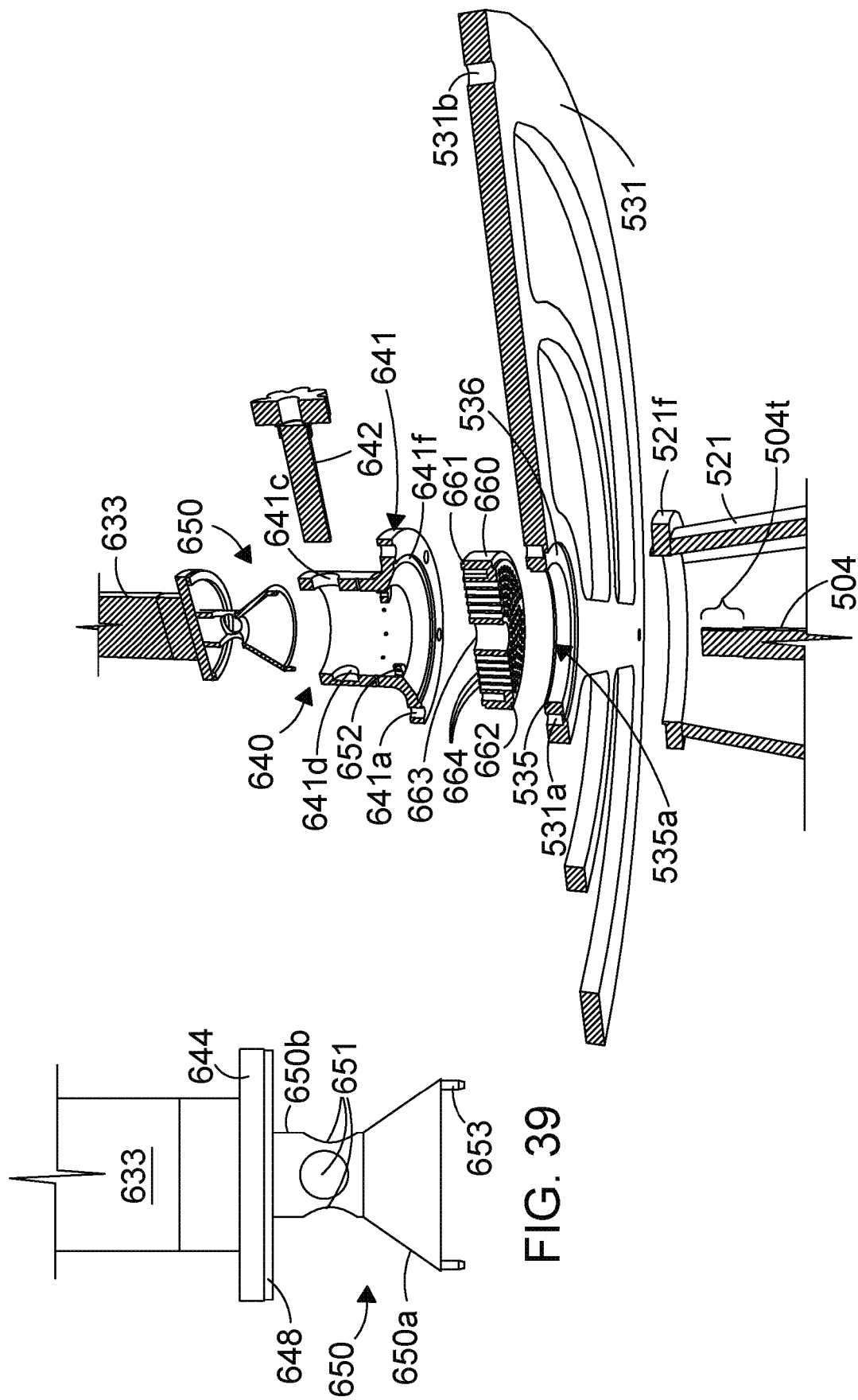

APPARATUS FOR MONITORING THE INTEGRITY OF A SUBSEA WELL AND A METHOD THEREOF

This invention relates to an apparatus and method for monitoring of wells or fluid sequestration sites, and more particularly for passively monitoring the integrity of suspended, decommissioned and/or abandoned subsea oil and/or gas wells and/or subsea $CO_2$ sequestration reservoirs.

BACKGROUND

At the end of the productive life of a subsea oil or gas well, there is typically a requirement to make the well safe and to remove production-related infrastructure from the seabed. Several techniques exist and are under development for the sequence of activities generally referred to as decommissioning a well, including Plugging and Abandonment (P&A). These activities might include creating multiple barriers between the sub-surface reservoir (which might be a considerable distance below the seabed) and the wellhead location on the seabed through which previous drilling and production activities have been performed.

However, although multiple barriers are created during decommissioning between a reservoir and the external environment, there are multiple potential leak paths that can result from processes including corrosion of the metalwork such as the casing and/or deformation caused by geological movement. Examples of potential leak paths include micro-annuli at the interface between casing and cement caused by channels and the presence of materials such as wax, scale, oil and dirt; connected pores, cracks and channels caused by permeability in cement; and through perforation of casing caused by corrosion and mechanical deformation. Such leak paths may occur at any depth within the well arrangement and give rise to the propagation or migration of hydrocarbons through the sub-surface geology.

Upon completion of well decommissioning activities, it may therefore be desirable to monitor the environment around a well site for an extended period to provide reassurance that a well's integrity is secure and that hydrocarbons from the reservoir are not leaking into the subsea environment. Several conventional systems are currently available to address this requirement, using approaches including active acoustics, bio sensors, capacitance, fibre optics, fluorescence, optical sniffers, optical cameras and passive acoustics, but these have various limitations associated with them. These limitations may include complex deployment requirements, high cost, interference with fishing activities, the need for regular maintenance or intervention, e.g. changing batteries used in active electronic systems, and data recovery requirements e.g. communications infrastructure, which might be part of a fixed installation or mobile in nature.

A further limitation of existing systems is a general inability to distinguish between hydrocarbons (such as biogenic or thermogenic methane) that are released through natural means from those emerging from a reservoir of a decommissioned well that has been isolated from the external environment. The difficulty in distinguishing between hydrocarbons may lead to false alarms being generated if a leak is notified in error.

Satellite monitoring systems are available to identify sheens of oil on the surface of the sea, suggesting that a hydrocarbon leak has occurred. This methodology has many shortcomings including: the sheen may have been caused by illegal vessel tank cleaning activities; not all hydrocarbons that emerge from the seabed ascend to the sea surface, many hydrocarbons will form sub-surface plumes or clouds that remain in the mid-water column and cannot be detected from space; even if the sheen material is from a well leak, its origin cannot be identified given the effect of natural currents that may move the material a considerable distance from its point of origin, and the time delay between a leak of sufficient magnitude to develop and be visible on the sea surface means that there is already a potentially significant loss of well integrity and the extent of the ensuing liabilities may be greater than if early warning had been given of a deteriorating situation.

In order to at least partially attempt to address these limitations, a passive detection system is described which does not rely on active means to determine that a breach of well integrity has occurred. Certain embodiments of the invention described herein utilise a passive detector that reacts to the presence of predefined materials which might include hydrocarbons but which also include materials introduced into a well during decommissioning that do not occur naturally in that environment and which, by their presence in the subsea environment, must have come from a decommissioned well. In one of the embodiments described, upon detection of a material of interest an electronic beacon is released that rises to the sea surface and broadcasts a predefined message to a satellite network. This information is used to identify the specific well that was monitored by that beacon's detection apparatus and thereby notification of the alert can be passed to the party responsible for the well.

At the time of the preparation of this disclosure, there is an increasing awareness of, and concern regarding, shallow gas migration along the paths of hydrocarbon wells.

As described above, shallow gas, e.g. biogenic methane, may be released naturally into the subsea environment through normal processes; however, there is increasing evidence that shallow gas accumulations which have been penetrated by the passage of wells drilled to much deeper hydrocarbon reservoirs are leaking biogenic gas which has been released by these boreholes. The disturbance of sediment around the outside of the casing strings used to form oil and gas wellbores can create permeable pathways for naturally buoyant gas.

From a well integrity diagnostic perspective, the presence of biogenic gas would traditionally be discounted in favour of thermogenic gas as the latter will have arisen from deep within the subsurface (therefore having bypassed barriers meant to isolate a decommissioned reservoir) whilst the former will have been regarded as a natural release from the near-surface strata.

Concern regarding the previously unaccounted for quantities of biogenic methane being released from shallow gas pockets punctured by wellbores (and their impact on climate change), means that there is considerable applicability for the apparatus disclosed herein.

SUMMARY OF THE INVENTION

According to a first aspect of the present invention, there is provided an apparatus for monitoring the integrity of a subsea well or fluid sequestration site, the apparatus comprising a detection mechanism configured to react in response to contact with a predetermined chemical and thereby release a signalling device.

Optionally the detection mechanism comprises a reactive material which is arranged to react with said predetermined chemical and typically is in the form of a rod, or optionally a disc, ring, plate or other suitable geometry. Optionally the material of the detection mechanism is configured to withstand predefined forces, including compression, tension, torsion, and bending. Optionally the detection mechanism is inert in seawater. Optionally the detection mechanism maintains its form and characteristics, including mechanical properties, for at least 10 years when submerged in seawater. Optionally the detection mechanism is operationally resilient to bio-fouling. Optionally the detection mechanism is coated with an anti-fouling coating (such as the ClearSignal® polymer-based solution available from Severn Marine Technologies, Annapolis, Maryland, USA). Optionally the detection mechanism is configured to react to the presence of the predetermined chemical in a consistent, predictable manner. Optionally the detection mechanism is configured to degrade in response to the presence of the predetermined chemical.

Optionally the predetermined chemical is a hydrocarbon, for example methane, biogenic, thermogenic, and/or abiotic materials.

Alternatively, or additionally, the predetermined chemical may be a tracer fluid, where the term "tracer fluid" is used here to indicate an example of a predetermined chemical including a traceable component, for example the fluid may optionally include a fluorophore that makes the chemical traceable by sensors, and/or optionally a dye to make it visible (in sufficient volume) to an observer. Optionally the tracer fluid may be injected into a well, optionally a decommissioned well, optionally mixed with kill fluid in one or more locations within the well.

Where there are different wells in nearby locations connected to the same reservoir, or where there are multiple fluidly isolated locations within a well (for example, multiple barriers may be installed within the well between the reservoir and the external environment, such as the setting of mechanical bridge plugs, creation of cement plugs, and the injection of a kill fluid within the voids between these mechanical barriers) and it would be advantageous to identify a specific leak location within the well, different tracer fluids may be used within kill fluid in the different locations or different wells. For example, the fluid may be supplied in concentrated or diluted form, pre-mixed with well kill fluid, or added to kill fluid as the fluid is pumped into a well during decommissioning activity.

Alternatively, if there are multiple wells in close proximity but connected to different reservoirs, the tracer fluid may be assigned to a reservoir as opposed to a well or a particular location in a well, allowing identification of a particular reservoir that the leak is originating from.

Preferably, the tracer fluid is not a naturally occurring material. This offers the advantage that it cannot be mistaken for any other substance, compound, fluid or particle that might naturally be found in the subsea or well environment. Optionally the tracer fluid is inert with any material that might be found in an oil or gas well, e.g. cement, steel, alloys and casing. Preferably, the tracer fluid is environmentally benign and more preferably does not pose a risk to personnel, flora and/or fauna. Examples of emulsions that may be suitable for use as tracer fluid include those based on a range of solvents, surfactants, fluorophores, and dyes, including:

Solvents: Ethyl acetate, methyl ethyl ketone (Butanone/MEK), N-Methyl-2-pyrrolidone (NMP), toluene;
Surfactants: Triton X-100, polysorbate 80, decyl polyglucose;
Fluorophores: Nile blue, Auramine O, eosin; and
Dyes: Cobalt blue.

Optionally a plurality of detection mechanisms may be deployed, where one or more detection mechanisms are configured to degrade when in contact with one specific tracer fluid and other detection mechanisms degrade when in contact with a different tracer fluid, for example chemical digestion (dissolution) of cured silicone elastomers and polymers by an organic solvent. Alternatively, the detection mechanism(s) may be formed from several different sections, where two or more sections are configured to degrade in response to different fluids. Examples of suitable detection mechanisms include poly(methyl methacrylate) (PMMA) and polyvinyl acetate (PVA). An advantage of using a tracer fluid with particular, recognisable characteristics is that the presence and detection of said tracer fluid in the external environment means it can only have come from within a well which has suffered a loss of integrity, providing early warning of a breach.

An example of a suitable formulation for use with a detection mechanism formed of PMMA (wholly or partially) is a surfactant/solvent mix of 1:4 polysorbate 80 to ethyl acetate, with <0.05 vol. % of Auramine O and cobalt blue to create a resulting tracer solution for mixing with kill fluid during the decommissioning or suspension of an oil or gas well. Typically, between 5% and 10% of the resulting solution would be used in the kill fluid during the decommissioning/suspension of a well.

Preferably, when a detection mechanism is exposed to the predetermined chemical, the degradation of the detection mechanism has the effect of compromising the mechanical properties of the detection mechanism. Optionally once sufficient degradation of the detection mechanism has occurred, the detection mechanism loses structural integrity and e.g. collapses or otherwise fails. This loss of integrity can be utilised as a means of triggering a secondary action, such as the disengagement of a restraining mechanism, allowing the release of a signalling device.

Alternatively, or additionally, different detection mechanisms may be deployed that are configured to degrade in response to different hydrocarbons. This may be useful where the apparatus is retrofitted to a well that has been decommissioned previously and therefore does not include any tracer fluids. Optionally the detection mechanism may comprise two or more segments, where each segment is configured to react or degrade in response to contact from a different hydrocarbon; e.g. a first segment reacts/degrades in response to a first hydrocarbon, a second segment reacts/degrades in response to a second hydrocarbon and so forth.

Optionally the reaction or degradation of the segment(s) of the detection mechanism results in the mechanical properties of the detection mechanism being compromised when the detection mechanism comes into contact with the particular hydrocarbon. Optionally once sufficient degradation of the detection mechanism has occurred, the detection mechanism loses structural integrity and e.g. collapses or otherwise fails. This loss of integrity can be utilised as a means of triggering a secondary action, such as the disengagement of a restraining mechanism, allowing the release of a signalling device.

Optionally the detection mechanism may be a structure, optionally comprising a porous outer surface and optionally containing voids within the structure. Optionally the structure is manufactured by an additive process such as 3D printing. Optionally the structure is formed of a material that is inert when in a subsea environment and is also inert to the predetermined chemical. Optionally the structure is configured to withstand predefined forces, including compression, tension, torsion and bending.

Optionally the voids within the structure are filled with a filler material. Optionally the filler material is inert in the subsea environment and optionally to the material that the structure is manufactured from. Optionally the filler material is configured to react to the predetermined chemical. Optionally the reaction of the filler material to the predetermined chemical produces a reaction product. Optionally the structure is configured to react with this reaction product, optionally to degrade when in contact with the reaction product. Optionally once sufficient degradation of the structure has occurred, the structure loses mechanical integrity and e.g. collapses or otherwise fails. This loss of integrity can be utilised as a means of triggering a further action, such as the disengagement of a restraining mechanism, allowing the release of a signalling device. Examples of suitable signalling devices include Apollo beacons available from Xeos Technologies Inc., Nova Scotia, Canada.

Optionally nanotechnologies, for example nanocomposite hydrogels, may be used to achieve the fusion of the required structural, mechanical, and chemical properties of the detection mechanism. Nanocomposite hydrogels may be advantageous as they can mimic native tissue properties, structure and microenvironment due to their hydrated and interconnected porous structure. A wide range of nanoparticles, such as carbon-based, polymeric, ceramic, and metallic nanomaterials can be incorporated within a hydrogel structure to obtain nanocomposite hydrogels with tailored functionality.

Optionally the signalling device is disposed on a release assembly that comprises jaws connected by a pivot point. Optionally the release assembly comprises a resilient device. Optionally the resilient device is configured to bias the jaws towards an open configuration. Optionally the detection mechanism is arranged to hold the jaws in a closed configuration against the biasing force of the resilient device.

Optionally the jaws of the release assembly, when in the closed configuration, are closed around a section of an anchor weight, clump weight, or similar anchoring device, which holds the release assembly (and therefore the signalling device) in the subsea location.

Optionally when the detection mechanism comes into contact with the predetermined chemical and thereby degrades, the lack of structural integrity is then overcome by the biasing force of the resilient device. Optionally when the detection mechanism degrades, the jaws actuate into the open configuration. Optionally when the jaws are in the open configuration, there is sufficient distance between the jaws to permit release of the release assembly from the anchor weight, e.g. by allowing the section of the anchor weight to pass through the jaws.

Optionally the release assembly comprises a buoyant device. Optionally the buoyant device is attached to the release assembly. Alternatively, or additionally, the release assembly and/or the signalling device comprises internal buoyancy. For example, the signalling device may have chambers that are filled with air and are accordingly less dense than the surrounding water. Optionally the buoyancy of the release assembly and/or the signalling device allows the signalling device to travel to the water surface when the release assembly is released from the anchor weight. The signal device may then transmit a signal that can be detected by, for example, satellite systems, alerting an operator, or a third (e.g. intermediate) party responsible for monitoring for signals, to the detection of a leak in the well.

Alternatively, the release assembly may comprise a ring or similar closed loop through which a detection mechanism, for example a rod-shaped detection mechanism, may be placed. Optionally upon contact with the predetermined chemical, and subsequent degradation of the detection mechanism, the release assembly may no longer be tethered to the detection mechanism. Optionally the buoyancy of the release assembly (either through internal buoyancy or a separate buoyancy device) can overcome any residual structure of the detection mechanism that may be left following degradation and carry the signalling device to the water surface to transmit a signal, indicating a leak in the well.

Optionally the release assembly may comprise a buoyant device attached to the detection mechanism, wherein contact between the detection mechanism and the predetermined chemical results in degradation of the detection mechanism and thus release of the buoyant device.

Optionally there may be more than one release assembly and more than one release assembly, signalling device and buoyant device. Optionally there may be a plurality of signalling devices connected at vertically-spaced intervals to a central line; for example, the central line may comprise vertically-spaced anchor points for connection of a release assembly. Optionally the central line may be connected to an anchor weight.

Optionally the signalling devices can be connected to the central line by a section of line, which connects to a detection mechanism, which then further connects to another section of line on which the signalling device and buoyant device may be located. Optionally when one of the detection mechanisms reacts to the predetermined chemical, it results in the line holding the signalling device and buoyant device being severed from the central line, permitting the buoyant device to carry the signalling device to the water surface and transmit a signal.

Optionally the anchor weight is shaped to permit trawling over the anchor weight without snagging the weight, i.e. optionally fishing gear such as nets may pass over the anchor weight. For example, the anchor weight may be in the shape of a dome, a conical or a pyramidal shape. Optionally the central line is flexible. Optionally the connections between the buoyant devices and the central line are also flexible. This offers the advantage that should a net or similar fishing gear pass over that section of the seabed, the equipment will be pushed over and regain its vertical orientation once the net has passed, due to the buoyancy of the buoyant devices.

Optionally each signalling device may have a unique signal (ID), thereby optionally allowing cross-reference of a signal received (ID of the signalling device) with the type of detection mechanism fitted to it and optionally its placement on, and in relation to, the seabed.

Optionally an anchor weight is placed on the seabed and protected by a shaped frame that is optionally designed to allow fishing equipment to pass over the weight and connected apparatus and optionally minimise damage to the equipment.

Optionally there may be one signalling device deployed per decommissioned well. Optionally there may be a plurality of signalling devices deployed per decommissioned well. Optionally a plurality of signalling devices are deployed in the area around a decommissioned well, optionally with the well at the centre of the deployment arrangement. Optionally the well is an abandoned well.

Optionally at least one signalling device can be contained within a unit that is adapted to rest on the seabed. Typically, the unit comprises an internal chamber. Optionally the chamber is open to the seabed, i.e., the base of the unit is not completely solid or covered. Optionally the chamber is aligned with a central axis of the unit. Optionally the unit comprises ballast to retain the unit on the seabed and resist the effects of water movement. Optionally the unit further includes anchoring devices, for example spikes, that may be formed as part of the ballast components and are adapted to further resist movement of the unit. Optionally the unit may be dome shaped, conical or pyramidal. Optionally the unit comprises a circumferential base. Optionally the unit comprises anchoring devices spaced apart around the circumferential base. Optionally the anchoring devices are in groups that are spaced apart, optionally equally spaced apart.

Optionally the signalling device is axially aligned with, or inserted within, an aperture in the unit. Optionally the chamber of the unit is aligned with the aperture.

Optionally the signalling device is contained within a frame, the frame having an open end that is directed towards the opening of the aperture in the unit. Alternatively, the signalling device is contained within a chamber. Optionally the chamber may be substantially enclosed. Optionally the chamber may comprise an open end that is directed towards an opening of an aperture in the unit. Optionally the open end of the frame or chamber is connected to the aperture in the unit. Optionally the frame or chamber is otherwise secured within the unit. Optionally the open end of the frame or chamber is at least partially obstructed by a detection mechanism, which is configured to retain the signalling device within the frame or chamber. Optionally the detection mechanism is adjacent to or otherwise proximal to the aperture. Optionally the frame or chamber is secured to or within the unit by a plurality of detection mechanisms. For example, the frame/chamber may comprise two or more holes at its lower end, and the unit may comprise a corresponding two or more holes at the upper end of the aperture, such that when the frame or chamber is in the desired position the holes on the frame/chamber and aperture align. The detection mechanisms may then be in the form of cylinders that are dimensioned to fit through the holes in both the frame/chamber and the aperture, and thereby retain the frame/chamber in place relative to the unit.

Optionally the unit is configured to direct fluids along the inner surfaces of the chamber of the unit towards the aperture. Optionally fluids leaking from a subsea well are funnelled or otherwise directed by the inner surfaces of the chamber towards the aperture. Optionally the unit comprises ribs along the inner surface of the chamber of the unit, optionally converging towards the aperture. Optionally the ribs are connected at one end to the circumferential base of the unit, and optionally at another end to a ring or similar device that acts to secure and support the ribs. For example, the base, ribs, and ring may form a skeleton of the unit over which optionally a skin or covering may be secured. Optionally the unit comprises a web or webs on the inner surface of the chamber of the unit, optionally axially aligned with and surrounding the central aperture.

As the detection mechanism is proximal to the aperture, the leak fluids optionally come into contact with the detection mechanism(s) as they are funnelled towards the aperture. Optionally the contact between the leak fluids and the detection mechanism(s) leads to the detection mechanism(s) reacting with one or more of the components of the leak fluids and subsequently degrading. Degradation of the, or each, detection mechanism optionally releases the frame or chamber holding the signalling device, permitting escape of the signalling device. Optionally the signalling device may comprise internal or external buoyancy that carries the signalling device to the water surface, where the device may then transmit a signal to alert operators to a leak.

Optionally the frame or chamber, the detection mechanism(s), the signalling device, and the buoyancy may be in the form of a modular alert assembly. Optionally the alert assembly may comprise the detection mechanism connected to or contained within the buoyancy. Optionally the alert assembly can be secured to and/or released from the unit by, for example, an ROV. This allows elements of the alert assembly to be repaired and/or replaced as required, for example to upgrade the elements or for long-term maintenance, without the need to disturb the rest of the apparatus.

Optionally where the frame or chamber is secured to or within the unit by a plurality of detection mechanisms, the detection mechanisms may be interconnected by a failure acceleration mechanism. Optionally the failure acceleration mechanism acts to accelerate the failure of the remaining detection mechanisms upon failure of any one of them. For example, a "fuse" in the form of a connecting cable between the detection mechanisms and comprising a substance that reacts rapidly upon ingress of water, the predetermined chemical, or another fluid for example, to thereby fracture or otherwise break the remaining detection mechanisms would be suitable. Optionally the failure acceleration mechanism comprises a wire containing a material that reacts rapidly, for example explosively, upon contact with water, e.g. sodium metal, or the predetermined chemical. Optionally the material is coated in a waterproof coating, layer, or is contained within a waterproof tube, or similar. Optionally at least a portion of the failure acceleration mechanism may be contained within one or more detection mechanisms. Optionally upon sufficient degradation of one or more detection mechanisms, fluid may gain access to the failure acceleration mechanism, optionally initiating the chemical reaction leading to failure of the remaining detection mechanism or mechanisms.

The acceleration of the failure of the detection mechanisms after one mechanism fails allows the signalling device to disengage from the unit rapidly and cleanly and reduces the likelihood of the signalling device becoming stuck to the unit as a result of a detection mechanism erroneously remaining intact. This is also particularly useful where the alert assembly is used as the assembly can similarly be released from the unit.

Optionally a plurality of units may be located on or around a decommissioned well, for example an abandoned well. Optionally the detection mechanisms may be selected to detect different leak fluids. Optionally the signalling devices may each have a unique signal, allowing an operator to identify where a leak is occurring, depending on which fluid has been reacted to.

Generally, the initial leak rates from a well that has lost its integrity can be expected to be low, i.e. the release of predetermined chemical from the seabed and/or wellhead will be small, for example a few ml/day. While this rate may increase over time as a leak worsens, it is valuable and advantageous to capture the leaked material at the initial stages of the leak in order that early warning of the integrity failure can be given. Owing to the dilution effect of a small quantity of the leaked material emerging into the (relatively) infinite ocean, a means of gathering and concentrating the leaked material is advantageous in facilitating the chemical reaction that leads to failure of the detection mechanism and subsequent release of the signalling device.

Optionally the apparatus for monitoring the integrity of a subsea oil or gas well may be a gathering and/or concentrating assembly comprising a plurality of substantially funnel-shaped devices, or substantially conical devices. Optionally the funnel-shaped devices/conical devices are symmetrical around a central axis of symmetry. Optionally the plurality of substantially funnel-shaped devices may be stacked upon each other, optionally in a substantially vertical arrangement. Optionally the plurality of substantially funnel-shaped devices may interconnect or interlock with one another. Optionally each funnel-shaped device maintains a given spacing from the, or each, adjacent funnel-shaped device. Optionally the funnel-shaped devices may be made of a material such as stainless steel or a material of a similar density. Optionally the funnel-shaped devices may be made of syntactic foam or material of a similar density, optionally in order to add buoyancy to the assembly. Optionally additional buoyant devices may be added to the assembly to provide yet further buoyancy if required.

Optionally each substantially funnel-shaped device has a first end with a larger diameter than a second end of the device. Optionally each of the first and the second end are at least partially open, optionally completely open, such that the funnel shape is formed by walls of the device only. Optionally the first end, optionally with the larger diameter, of the funnel-shaped devices are positioned such that they are directed towards the seabed, optionally proximal to the well undergoing monitoring.

Optionally the funnel-shaped devices/conical devices are asymmetrical. Optionally the geometry of the first (larger diameter) end of the funnel-shaped devices may be asymmetrical in order to preferentially guide or capture more predetermined chemical e.g. tracer fluid moving in one direction relative to other directions. Such a funnel-shaped device may feature a configuration having an extended section over a limited circumferential arc. Optionally the extended section projects downwards relative to the rest of the funnel-shaped device—that is, where the first end of the symmetrical funnel-shaped device represents a plane, the extended section of the asymmetrical funnel-shaped device extends past this plane while at least a section of the rest of the end of the funnel-shaped device aligns with this plane.

This extended section offers the advantage that more of the predetermined chemical may be captured by the, or each, funnel-shaped device by preventing the chemical from simply drifting past, underneath the funnel-shaped device(s) in higher current conditions. Preferably, the, or each, extended section is oriented such that it faces the tidal flow, meaning that if the chemical passes underneath the funnel-shaped device without capture, the chemical will encounter the extended section as an obstruction and will thus optionally be guided into the funnel-shaped device and upwards into the rest of the assembly.

Optionally the gathering and/or concentrating assembly comprises a means to permit the assembly to slew or rotate about its longitudinal axis (for example its vertical axis) to optionally enhance the alignment of the asymmetrical funnel-shaped devices with the direction of the subsea current. Optionally the assembly comprises a slew ring, optionally to provide vertical support for the assembly while permitting rotation. Optionally the assembly may comprise a sail plate, optionally offset from the assembly, optionally aligned with the longitudinal axis of the assembly. Optionally rotation of the assembly is driven by harnessing the movement of the subsea current, for example during its normal tidal cycle, to act on the sail plate and thereby create a rotational force around the longitudinal (e.g. vertical) axis of the assembly. Optionally this rotational force rotates the assembly until it self-aligns with the direction of the subsea current.

Optionally the assembly further comprises at least one reaction chamber, the at least one reaction chamber comprising at least one detection mechanism and optionally at least one signalling mechanism restrained in a secured position by the at least one detection mechanism. Optionally the reaction chamber is mounted to the assembly. Alternatively, the reaction chamber may be integral with the assembly.

Optionally the assembly comprises a central support, optionally connected to ballast, for example a clump weight. Optionally the assembly comprises a further support connected between the central support and the clump weight dimensioned such that at least a portion of the further support can fit inside a first end of a funnel-shaped device, for example ribs/rods in a tripod configuration or similar. Optionally the funnel-shaped devices are positioned on the central support, the central support optionally providing alignment and rigidity to the assembly. Optionally the second ends of the funnel-shaped devices may comprise at least one centralising tab, where the tab protrudes from both sides of the wall of the funnel-shaped device. The centralising tab may centralise the, or each, funnel-shaped device with both the central support and the adjacent funnel-shaped device, where applicable.

Optionally the assembly comprises a mounting ring. Optionally the mounting ring can be positioned at the second end of the uppermost funnel-shaped device. Optionally the uppermost funnel-shaped device does not comprise a centralising tab. Optionally the mounting ring comprises apertures, through which connectors may be attached. Optionally wires may be connected at one end to the connectors, and connected at another end to the further support and/or the clump weight. Optionally the wires may be tensioned. This provides additional security and stability to the assembly and assists in holding the components of the assembly in their relative positions.

Optionally the assembly may comprise, optionally between the mounting ring and the reaction chamber, a locking ring. Optionally the locking ring comprises a central threaded aperture. Optionally the central support comprises a similarly threaded portion at its uppermost end. Optionally the locking ring, the mounting ring, and the reaction chamber comprise shaped shoulders that are configured to abut against one another. Optionally the locking ring is threaded onto the central support and tightened, tensioning the assembly. Optionally the locking ring comprises a plurality of perforations which provide pathways for the predetermined chemical to pass from the funnel-shaped devices into the reaction chambers.

Optionally the locking ring comprises apertures for receiving pegs, screws, or similar that may form part of the reaction chamber. This can provide a useful method of ensuring alignment of the reaction chamber where desirable.

Optionally as material leaks from the well, it has a natural buoyancy, and therefore a tendency to travel towards the surface of the water. Optionally as material leaks from the well, it may pass into the first end of a funnel-shaped device. Optionally the shape of the device then diverts the leaked material towards the second end of the device. Optionally the leaked material may then pass into an interconnected, further, funnel-shaped device. Alternatively, if, for example, the leaked material is passing through the device adjacent to the reaction chamber, the device funnels the leaked material towards the reaction chamber, optionally through the locking ring, or alternatively through a conduit. Optionally the reaction chamber is substantially enclosed and optionally the only opening in the reaction chamber is the connection to the funnel-shaped device. Alternatively, the reaction chamber may comprise apertures, optionally apertures that are of a smaller diameter than the capillaries in the locking ring or the conduit. Optionally the apertures permit a flow of fluid and optionally particles of degraded detection mechanism out of the reaction chamber.

Optionally the leaked material can thus gather in the reaction chamber over a period of time. Optionally the reaction chamber acts as a focal point for the collected material. Optionally, over time (e.g. multiple tidal cycles), sufficient predetermined chemical, e.g. tracer fluid, will be concentrated within the reaction chamber to degrade the detection mechanism. Optionally sufficient tracer fluid will be concentrated within the reaction chamber to cause failure of the detection mechanism. Optionally, failure of the detection mechanism leads to cessation of restraint of the signalling mechanism, which is thereby released.

Advantageously the reaction chamber gathers and concentrates the tracer fluid in close proximity to the detection mechanism, maximising exposure of the detection mechanism to the tracer fluid, and thereby enhancing degradation of the detection mechanism with a relatively low volume of tracer fluid.

Optionally the reaction chamber may comprise a means of focusing the leaked material onto the detection mechanism. For example, the connection between the adjacent funnel-shaped device and the reaction chamber may itself be shaped to direct the fluid towards a single locus on the detection mechanism as the fluid enters the reaction chamber. Where the reaction chamber comprises a shaped device for focusing the flow of fluid, it may be advantageous to use the peg (or similar)/aperture alignment arrangement offered by the locking ring as described above. Alternatively, locator pins or pegs or a similar device may be used in another part of the reaction chamber to align the shaped device.

Optionally the shaped device may comprise a funnel-shaped skirt portion and cylindrical portion. Optionally the shaped device is housed within the reaction chamber. Optionally the skirt portion directs the incoming fluid towards the detection mechanism. Optionally the cylindrical portion comprises at least two apertures through which the detection mechanism may pass. Optionally the shaped device is connected to the signalling device. Optionally the detection mechanism retains the shaped device, and thereby the signalling device, in position. Optionally when the detection mechanism fails, the buoyancy of the signalling device lifts the signalling device and the shaped device away from the reaction chamber. Alternatively, the shaped device may be configured such that the cylindrical portion is separable from the skirt portion and thus when the detection mechanism fails, the cylindrical portion is released with the signalling mechanism while the skirt portion may stay in position in the reaction chamber.

Guiding the leaked material onto one or more specific areas of the detection mechanism(s) can lead to preferential degradation at these specific areas, which may lead to more rapid failure of the detection mechanism(s), and earlier release of the signalling device. In other words, notification of a loss of well integrity can be generated from a smaller volume of leaked material than would otherwise be the case if, for example, the fluid was not focused onto particular areas of the detection mechanism, and/or the reaction chamber was not an enclosed space.

Optionally, to potentially further enhance capture/detection of leaked material, the assembly or assemblies may be positioned around the well undergoing monitoring, for example a suspended well, with careful consideration given to the prevailing tidal directions. For example, by planning the lateral and radial deployment and placement of the assemblies such that they are close to an imaginary horizontal tidal line drawn across the vertical centreline of the well bore, the probability of capturing leaked material may be increased. If, for example, four assemblies were deployed around a well centre, optionally they may not be deployed at equal angles with respect to the well. Instead, two assemblies may be positioned to the tidal flood side of the well, with optionally a 30° angle between them. Optionally, a further two assemblies may be placed in a similar arrangement on the tidal ebb side of the well.

Optionally the period of time taken for a detection mechanism to fail is related to the leak rate of the well, and optionally the capture rate of the predetermined chemical. Optionally more than one detection mechanism may be used in combination with any of the disclosed features of the invention. Optionally the detection mechanisms may have, for example, different geometries such that their times to failure with a given volume of the predetermined chemical differ. Alternatively, the detection mechanisms may be made of different materials. Optionally the apparatus can thus be configured so that a series of alerts may be given, representing the scale of the leak from the well. For example, where the detection mechanisms are rods, different diameters may be used, optionally of the same material.

By using multiple detection mechanisms, multiple signalling devices may also be used. Optionally each signalling device may be retained by a detection mechanism with particular properties that provide the detection mechanism with a given failure time. Accordingly, by deploying a multi-beacon configuration, where each signalling device is retained by a different detection mechanism, the release of the first signalling device from the configuration, or cluster, can provide a very early-stage notification. The release of a second signalling device can provide an observer with both confirmation of a loss of integrity and also provide an indication of the leak rate, due to the difference in time between the release of the first and second signalling devices.

The release of a third signalling device, where, for example, the third detection mechanism was a rod with a significantly larger diameter than the first detection mechanism, may provide final confirmation of the loss of integrity of the well. The use of multiple detection mechanisms may also reduce instances of false alerts due to the subsequent release of signalling devices providing confirmation of the presence of the predetermined chemical.

A variation of the above multi-beacon approach may be to position at least two apparatuses in accordance with the invention on the flood and ebb sides of a well. If a signalling device is observed as having been released from the flood side, this provides a warning that a leak has been detected. If a signalling device is observed as having been released from the ebb side, this is a more urgent event, as the predetermined chemical/tracer fluid has been gathered in both directions of tidal flow across the well, confirming a loss of integrity.

Optionally upon reaching the sea surface the signalling device(s) may transmit signals using a particular protocol, for example short burst data (SBD), which optionally is transmitted to a satellite network. Optionally the receiving satellite(s) relays the signal to ground stations. Optionally the ground station transmits a notification to the service or operator that is responsible for monitoring the decommissioned well, alerting them to a leak in the well. Optionally the notification may include the unique identification code of the signalling device that has transmitted the signal. Optionally the service or operator may then cross-reference the unique identification code against, for example, a database of well locations and well owners and alert the well owner to a leak.

Optionally multiple units may be deployed simultaneously. Optionally a deployment framework may be utilised to lower multiple units to the seabed at the same time.

Alternatively, smaller monitoring units may be deployed by over-boarding from a surface vessel and sinking through appropriate ballast-induced forces to the seabed. Optionally the units may comprise drag devices or adjustable or releasable buoyant devices, which may optionally be used to control the rate of descent of the units.

According to the present invention there is provided a method of detecting a loss of integrity in a subsea well or fluid sequestration site, the method comprising the steps of deploying at least one apparatus in accordance with the invention on and/or around a subsea well or fluid sequestration site.

Optionally the method includes selecting deployment positions for the, or each, apparatus in accordance with the prevailing tidal directions in the proximity of the well or sequestration site.

Optionally the method includes deploying a plurality of apparatuses. Optionally the method includes providing each apparatus with a different detection mechanism comprising different mechanical, reactive, and/or physical properties configured to provide the detection mechanism with a given failure time.

Optionally the method includes configuring each signalling device with a unique signal, and optionally upon receipt of a unique signal from a signalling device, cross-referencing the signal with the deployment location of the signalling device. Optionally a signal may be cross-referenced with the detection mechanism used in the apparatus.

Optionally the method includes inserting or injecting a volume of predetermined chemical into the subsea well or fluid sequestration site such that the volume of predetermined chemical is (at least initially) sealed within the subsea well or fluid sequestration site.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. These figures are not to scale and should be considered schematic illustrations only. Still other aspects, features and advantages of the present invention are readily apparent from the entire description thereof (including the figures) which illustrates a number of exemplary aspects and implementations. The invention is also capable of other and different examples and aspects, and its several details can be modified in various respects, all without departing from the scope of the present invention as defined by the claims. Accordingly, each example herein should be understood to have broad application and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope. Language such as "including", "comprising", "having", "containing" or "involving" and variations thereof, is intended to be broad and encompass the subject matter listed thereafter, equivalents and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including" or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein are understood to include plural forms thereof and vice versa. References to directional and positional descriptions such as upper and lower and directions such as "up", "down" etc in relation to the assembly are to be interpreted by a skilled reader in the context of the examples described and are not to be interpreted as limiting the invention to the literal interpretation of the term, but instead should be as understood by the skilled addressee. In particular, positional references to the assembly such as "up" will be interpreted to refer to a direction toward the surface of the water and away from the subsea surface, and "down" will be interpreted to refer to a direction away from the surface of the water and toward the subsea surface.

BRIEF DESCRIPTION OF THE DRAWINGS

Illustrative embodiments of the present disclosure are described in detail below with reference to the attached drawing figures, which are incorporated by reference herein and wherein:—

FIG. 32 is a schematic perspective view of a generally vertically arranged gathering and concentrating assembly;

FIG. 33 is a schematic cross-sectional illustration of the assembly of FIG. 32;

FIG. 39 is a side view of the notching device;

FIG. 40 is an exploded view of the upper portion of a vertical gathering and concentrating assembly including the uppermost funnel-shaped device, mounting ring, locking ring, detection mechanism, signalling device, and the reaction chamber of FIG. 38;

DETAILED DESCRIPTION OF EXAMPLE EMBODIMENTS OF THE INVENTION

Figure 1:
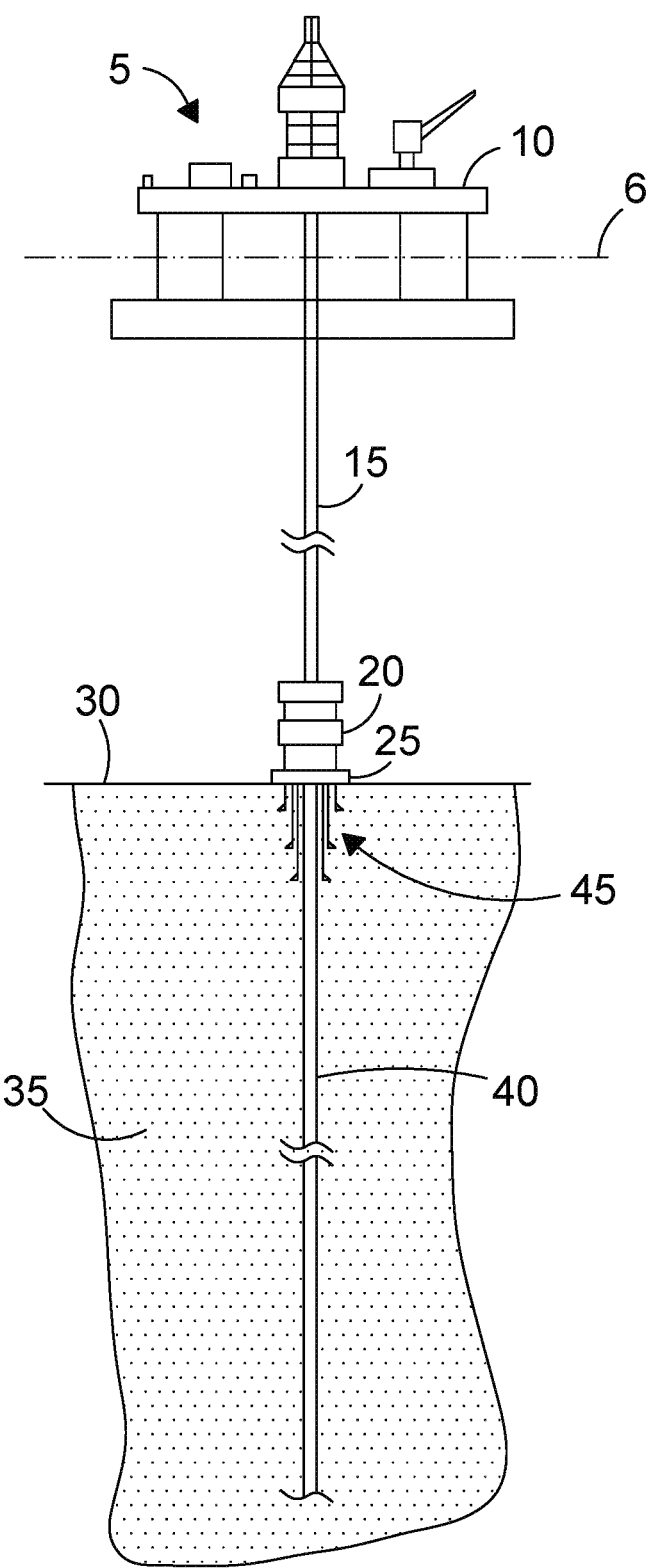
FIG. 1 is a schematic view of an example drilling system including a sectional sub-surface representation.

Turning now to the present figures, a typical example of a conventional subsea hydrocarbon well apparatus 5 is illustrated in FIG. 1. The apparatus 5, e.g., a drilling system or a production system, facilitates access to or extraction of a resource, such as oil or natural gas, from a sub-surface reservoir 35 through a well 40. The apparatus 5 is generally depicted in FIG. 1 as an offshore drilling apparatus 5 including a drilling rig 10 on the sea surface 6, coupled with a riser 15 to a blowout preventer (BOP) 20 and a wellhead assembly 25 installed at the well 40. The wellhead assembly 25 is located on the seabed 30 and is connected to a sub-surface 35 casing scheme 45 previously installed for the purpose of producing hydrocarbons.

Figure 2:
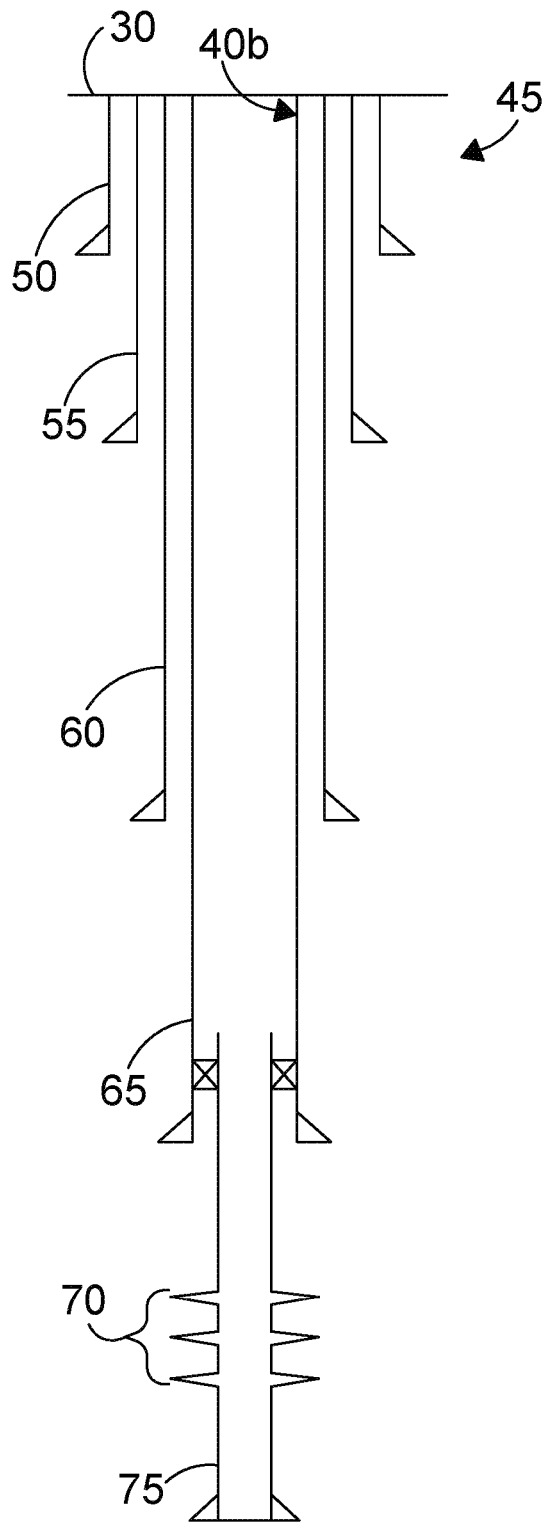
FIG. 2 is a schematic cross-sectional representation of an example casing scheme used in the construction and production of subsea hydrocarbon wells. The pre-decommissioning configuration of a typical well is illustrated.

The casing scheme 45 of a typical/conventional production (pre-decommissioning) well is shown in greater detail in FIG. 2. The well bore 40b is surrounded by multiple lengths of casing of different diameters as the bore descends through the sub-surface geological strata 35. The conductor pipe 50 is typically of 30" outer diameter, the surface casing 55 is typically of 20" outer diameter, the intermediate casing 60 is typically of 13⅜" outer diameter, the production casing 65 is typically of 9⅝" outer diameter and the production liner 75 is typically of 7" outer diameter. The perforated production interval 70 is located in a permeable zone of a reservoir and allows hydrocarbons to flow from the reservoir into the well bore 40b. Alloy steel is the most commonly used material for casing components, typically in accordance with ISO 11960 (Petroleum and natural gas industries—Steel pipes for use as casing or tubing for wells).

Figure 3:
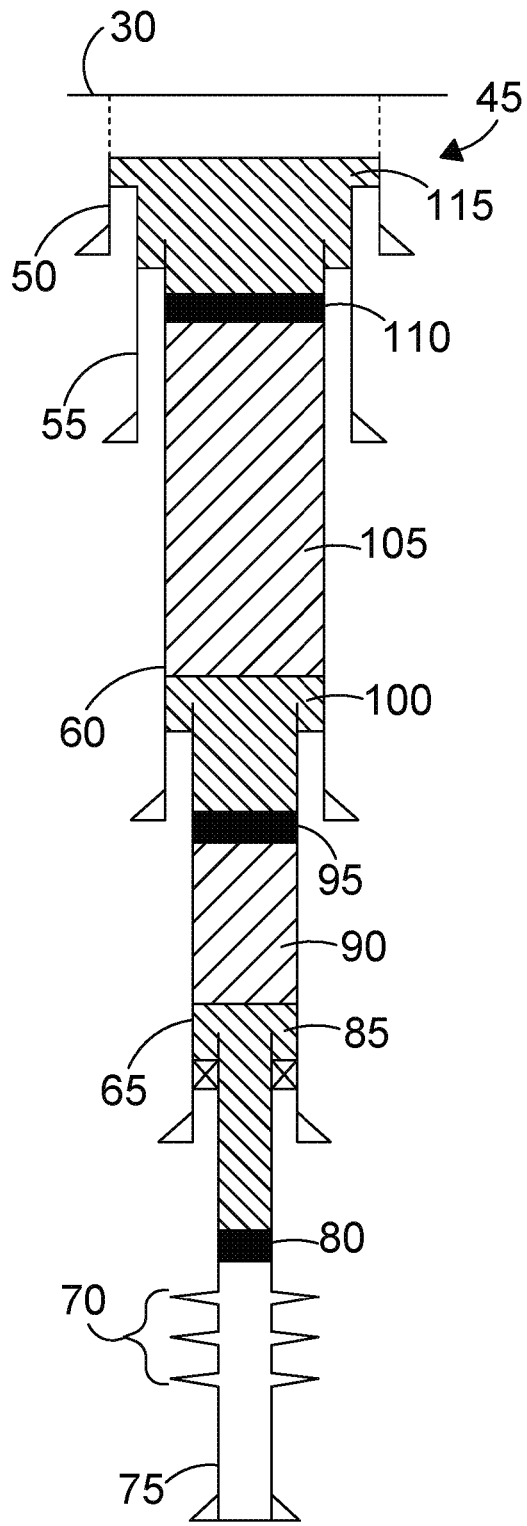
FIG. 3 is a schematic cross-sectional representation of an example casing scheme after decommissioning of a well and shows one possible configuration of barriers used in 'plug and abandonment' operations.

Whilst there are multiple approaches to the decommissioning of oil and gas wells, in terms of the tools, techniques, sequences and operations, the common objective of decommissioning is to install multiple barriers between a reservoir and the external environment. This may include the removal of sections of casing, the setting of mechanical bridge plugs, the creation of cement plugs and the use of a kill fluid in the voids between these mechanical barriers. Such a configuration of a decommissioned well is illustrated in FIG. 3. Here, the casing scheme 45 has been altered by removal of the topmost sections of the conductor pipe 50, surface casing 55, intermediate casing 60 and production casing 65. A mechanical bridge plug 80 has been set in the production liner 75 and a cement plug 85 has been created above the mechanical bridge plug 80. The cement plug 85 spans both the production liner 75 and the production casing 65.

Similar operations have been performed to install mechanical bridge plug 95 in the production casing 65 and the creation of cement plug 100 spanning the production casing 65 and intermediate casing 60. Further, operations have been performed to install mechanical bridge plug 110 in the intermediate casing 60 and the creation of cement plug 115 spanning intermediate casing 60, surface casing 55 and conductor pipe 50.

Optionally, prior to the setting of mechanical bridge plug 80, a volume of kill fluid 90 is pumped into the well in a process commonly known as bullheading. Forcibly pumping fluid into a formation ensures, so far as is possible, that the tracer fluid is present in the reservoir and particularly in the production zone below the first installed bridge plug.

Prior to the setting of mechanical bridge plug 95, a volume of kill fluid 90 is pumped into the well (above cement plug 85) sufficient to bring its level to a point at which mechanical bridge plug 95 is to be set, i.e. the void between the top of cement plug 85 and the underside of mechanical bridge plug 95 is filled with kill fluid 90. Similarly, the void between the top of cement plug 100 and the underside of mechanical bridge plug 110 is also filled with kill fluid 105.

Well kill fluids are required to help counter forces that might result from a reservoir recharging (increasing in pressure) through natural processes. Kill fluids are thus specified to have particular properties in order that an overpressure with respect to the well pressure is achieved. Given that the distance between well barriers can be several thousand feet, kill fluids must have consistent properties, unaffected by the settling of denser components such as suspended solids. The properties of the kill fluid used in different sections of a decommissioned well may be different depending on the depth of the section, i.e. distance from the reservoir. Brines are commonly used as well kill fluids with the addition of suspended solids being used to manipulate the fluid density and thus the hydrostatic head of the kill fluid to suppress the pressure of formation fluids. Kill fluids are selected to be compatible with elements such as the geological formation, well equipment and operational tools and fluids.

Figure 4:
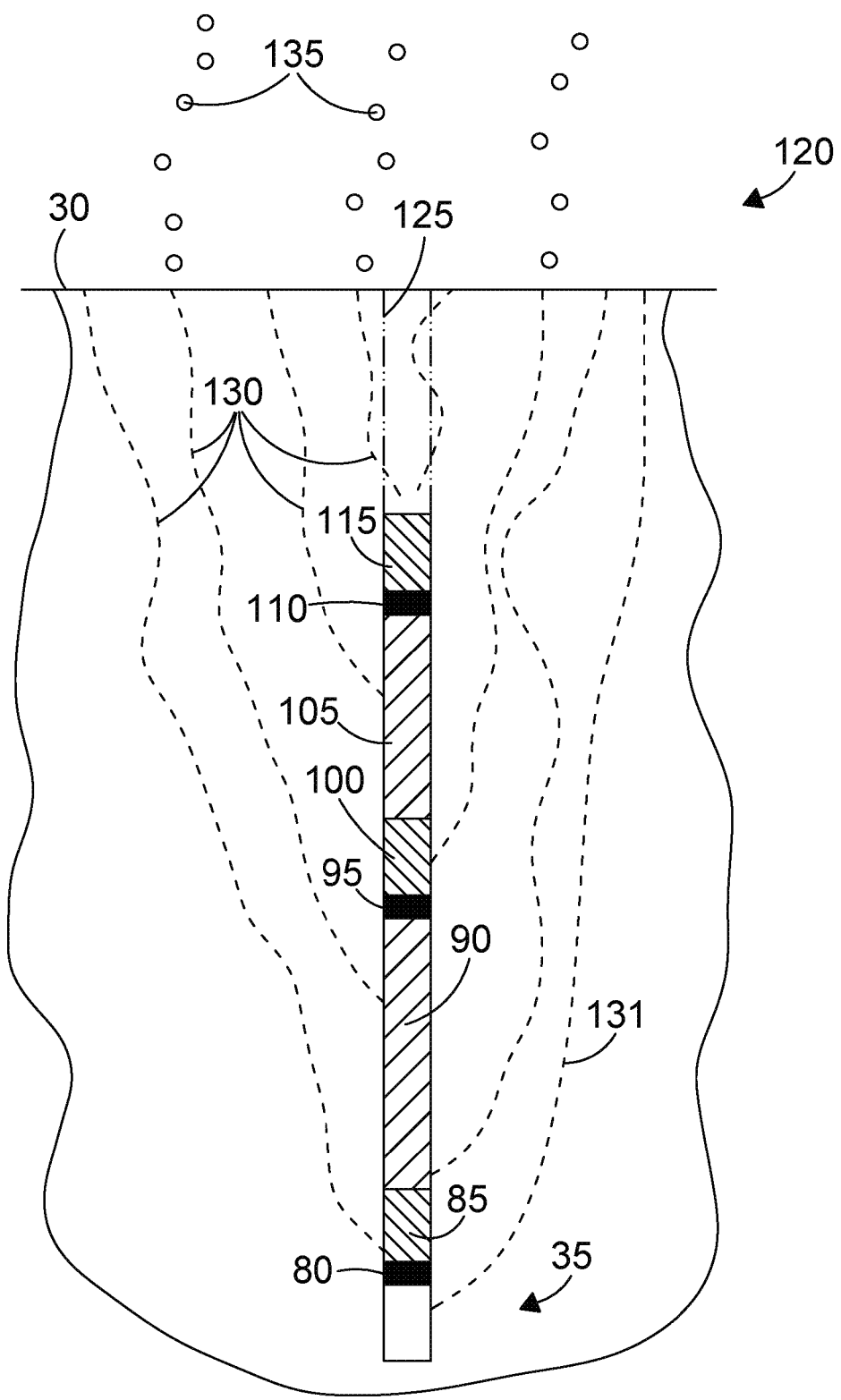
FIG. 4 is a schematic cross-sectional representation of example sub-surface post-decommissioning leak paths associated with a loss of well integrity.

Considering FIG. 4, (which is a simplified interpretation of FIG. 3) although multiple barriers are created during decommissioning between a reservoir and the external environment, there are multiple potential leak paths that can result from processes including corrosion and deformation caused by geological movement. Examples of potential leak paths include: micro-annuli at the interface between casing and cement caused by channels and the presence of materials such as wax, scale, oil and dirt; connected pores, cracks and channels caused by permeability in cement; and through perforation of casing caused by corrosion and mechanical deformation.

Such leak paths may occur at any depth within the well arrangement and give rise to the propagation or migration of hydrocarbons 130 through the sub-surface geology 35. The sub-surface post-decommissioning leak path example 120 shown in FIG. 4 may give rise to leaked material 135 emerging from the seabed 30 into the subsea environment. Whereas leaks may occur along the axis of the pre-decommissioned well bore 125, they may also remain close to the casing scheme or take any other path of least resistance to the seabed 30 such as paths 130.

An example of a leak from a reservoir is shown in FIG. 4 where leak paths 130 are related to breaches of well barriers, but path 131 is not, as it occurs below the first barrier 80 and thus originates within the reservoir (being the material previously installed by the bullheading procedure).

A first aspect of the present disclosure is achieving differentiation of the source of a leak thus minimising the probability of false alarms. This embodiment in accordance with the present invention is achieved in the following manner: a tracer fluid 145 is mixed with well kill fluid 90, 105 so that the presence and detection of said tracer fluid 145 in the external environment means it can only have come from within a well which has suffered a loss of integrity.

In the present disclosure an example of this tracer fluid 145 is referred to as Sentinel Well Integrity Fluid Tracer (SWIFT) 145, available from Sentinel Subsea Limited of Aberdeen, UK. This fluid 145 may be supplied in concentrated or diluted form, pre-mixed with well kill fluid 90, 105 or added to kill fluid 90, 105 as the fluid 90, 105; 145 is pumped into a well during decommissioning activity.

SWIFT 145 has to meet many constraints, including: It must not be a naturally occurring material, so that it cannot be mistaken for any other substance, compound, fluid or particle that would be found in the subsea environment; it must be inert with any material that might be in the well, e.g. cement, steel, alloys and casing; it must be environmentally benign and not pose a risk to human handlers.

There are multiple mechanisms by which SWIFT 145 may migrate from a kill fluid 90, 105 zone into a subsea environment. In one embodiment the SWIFT material 145 rises naturally through any available leak path 130 in the same way as reservoir hydrocarbons. In another embodiment, the SWIFT material 145 is driven by reservoir pressure, i.e. by the force of the hydrocarbons leaking from the reservoir past the installed barriers. In a further embodiment, SWIFT 145 is chemically or mechanically liberated from the kill fluid 90, 105 as it comes into contact with leaking hydrocarbons, at which point SWIFT 145 is bound chemically or mechanically to the hydrocarbons leaking from the reservoir past the barriers and carried to the subsea environment in combination with the hydrocarbons. Preferably SWIFT 145, or the material of interest that is being monitored by the examples of the invention described herein, is less dense than water/sea water (or less dense than the sea water in the vicinity of the sea bed where the monitoring apparatus is positioned), and therefore has a natural tendency to rise under its own inherent buoyancy.

A second aspect of the present disclosure is passively monitoring for the presence of SWIFT 145 (or other predetermined chemicals that will provide the required degradation of the trigger material and thereby alert an operator to a loss of well integrity) in the subsea environment. Whereas active monitoring systems are available to detect the presence of hydrocarbons or tracer fluids using a myriad of techniques, these generally require the use of active systems (therefore electrical power), sensors, processors and communication channels. Such active systems are therefore costlier, more complicated and more likely to require intervention and maintenance than simple passive solutions.

The present invention provides examples of passive monitoring systems that do not require intervention or maintenance until they are withdrawn from service. In one embodiment, this operational period is at least 10 years, but this can be extended with, for example, replacement of the trigger rods without the requirement to replace the rest of the apparatus.

Figure 5:
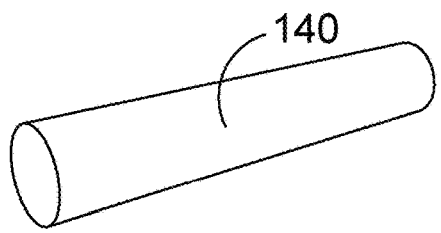
FIG. 5 is a 3D illustration of a first embodiment of a detection mechanism in the form of a single material trigger rod used in a passive detection/release system in accordance with the present invention.

The passive detection of SWIFT 145 is achieved by the use of one or more materials that react to the presence of SWIFT 145 and thus provide an embodiment of a detection mechanism in accordance with the present invention. This reactive material may be formed into components such as a trigger rod 140, 160. FIG. 5 illustrates a first embodiment of a trigger rod 140 in accordance with the present invention in the form of a single-material trigger rod 140 in cylindrical form. Such triggers may take other forms, such as a thin disc, ring or plate of material. The trigger may be designed to withstand predefined forces, including compression, tension, torsion and bending. The material of the trigger rod 140 is thus dependent upon the material of the tracer fluid 145 with which it is to react.

Some of the constraints and design considerations that must be applied to the trigger component 140 include: being inert in seawater, maintaining its form and characteristics (including mechanical properties) for at least 10 years in seawater, be operationally unaffected by bio-fouling and reacting to the presence of SWIFT 145 in a consistent, predictable manner.

Figure 6:
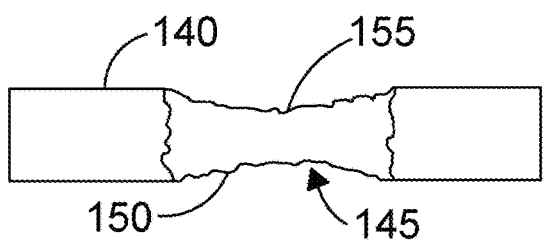
FIG. 6 is an illustration of the single material trigger rod of FIG. 5 after it has been subject to some (but not total) degradation by reaction with an example tracer fluid.

Considering FIG. 6, when a trigger rod 140 is exposed to SWIFT material 145, a reaction 150 occurs which may be chemical in nature. This reaction causes degradation 155 of the rod material thus compromising the mechanical properties of the trigger rod 140.

Figure 7:
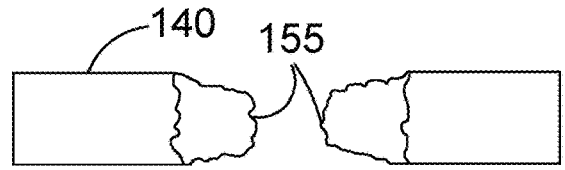
FIG. 7 is an illustration of the mechanical failure of the single material trigger rod of FIG. 6 after being subject to further (total) degradation by reaction with a tracer fluid.

As can be seen in FIG. 7, once sufficient degradation 155 has occurred, the trigger rod 140 loses integrity and fails completely and can thus be used as a means of triggering a secondary action, such as the disengagement of a restraining mechanism, allowing the release of a beacon as will be described subsequently in more detail.

Figure 8:
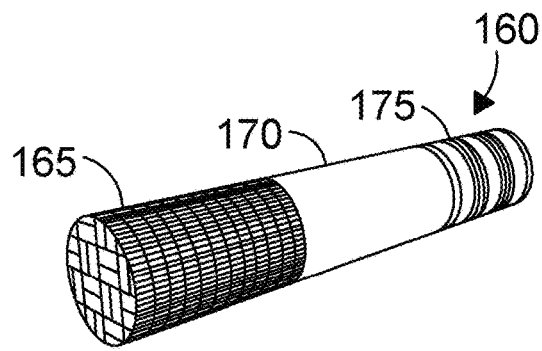
FIG. 8 is a 3D illustration of a second embodiment of a detection mechanism in the form of a multi-material trigger rod used in a passive detection/release system in accordance with the present invention.

In another embodiment, illustrated in FIG. 8, the trigger material may be chosen to react to the presence of one or more specific hydrocarbons. This may be used in situations where, for example, a monitoring system is retro-fitted to a previously decommissioned well where the decommissioning activity did not include adding SWIFT to the kill fluid. A multi-segment rod 160 comprises two or more segments where a first segment 165 will react with a first hydrocarbon, a second segment 170 will react with a second hydrocarbon and a third segment 175 will react with a third hydrocarbon. Examples of suitable material to form each segment 165, 170, 175 will thus be dependent upon the hydrocarbon with which it is arranged to react.

Figure 9:
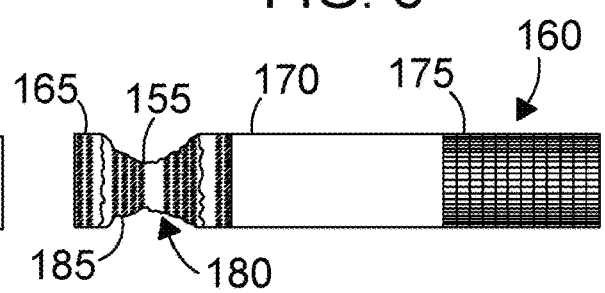
FIG. 9 is an illustration of the multi-material trigger rod of FIG. 8 where one section is subject to some (but not total) degradation by reaction with a tracer fluid.

As illustrated in FIG. 9, when a first segment 165 reacts with a first hydrocarbon 180, a reaction 185 occurs which may be chemical in nature. This reaction causes degradation 155 of the first segment material and thus compromises the mechanical properties of the trigger rod assembly 160.

Figure 10:
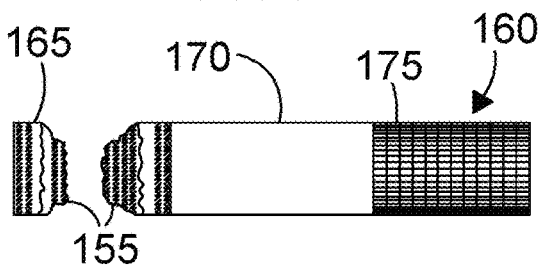
FIG. 10 is an illustration of the mechanical failure of the multi-material trigger rod of FIG. 9 where one section is subject to further (total) degradation by reaction with the tracer fluid.

As can be seen in FIG. 10, once sufficient degradation 155 has occurred, the affected segment of the trigger rod 160 fails completely and can thus be used as a means of triggering a secondary action, such as the disengagement of a restraining mechanism, allowing the release of a beacon, as will be described subsequently in more detail.

Figure 11:
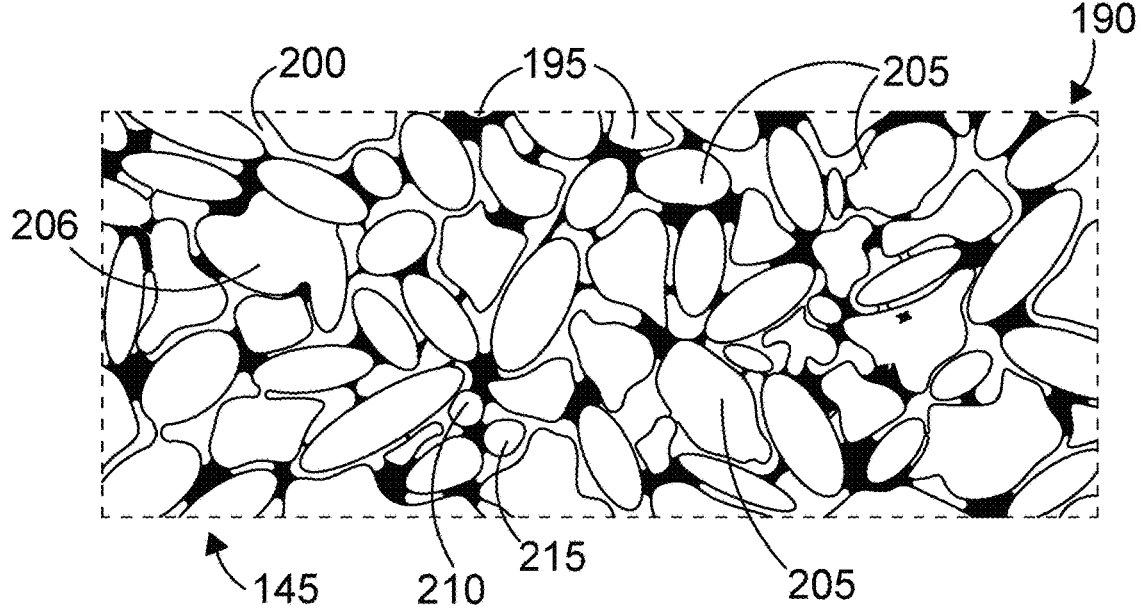
FIG. 11 is an illustration of a 3D printed material used to provide a supporting framework to a first reactive material. This illustrates the framework and the voids created in the framework by the manufacturing process.

A further embodiment of the present disclosure related to the use of a passive trigger rod is illustrated in FIG. 11. In this approach, a framework structure 190 is created using an additive manufacturing process such as 3D printing. This framework includes a porous outer surface 195, solid walls 200 and voids 205. The material used to create the framework is inert in the subsea environment and to the presence of the SWIFT well kill fluid additive 145. The framework 190 has sufficient mechanical properties to resist the same forces discussed in connection with the single 140 or multi-segment 160 trigger rods disclosed earlier. The voids 205 in the framework 190 are filled with a material 206 that is inert in the subsea environment and to the material used in the framework 190. The filling material 206 reacts 210 in a way which may be chemical in nature to the presence of the SWIFT well kill fluid additive 145. The product of this reaction 210 causes a secondary reaction 215 with the framework material 200 which leads to the degradation of the framework 190. As with the previously disclosed single and multi-segment trigger rods 140, 160, the subsequent loss of mechanical integrity of the 3D framework 190 can be used to trigger a further action, such as the disengagement of a restraining mechanism, allowing the release of a beacon as will be described subsequently in more detail. The material 206 could be any suitable material that reacts with the SWIFT fluid additive 145.

Although an irregular framework pattern 190 is illustrated in FIG. 11 it should be understood that this may take other forms, such as a regular geometric 3D design.

Other approaches to the design of reactive trigger materials are possible, including the use of nanotechnologies such as nanocomposite hydrogels to achieve the fusion of the required structural, mechanical and chemical properties.

Figure 12:
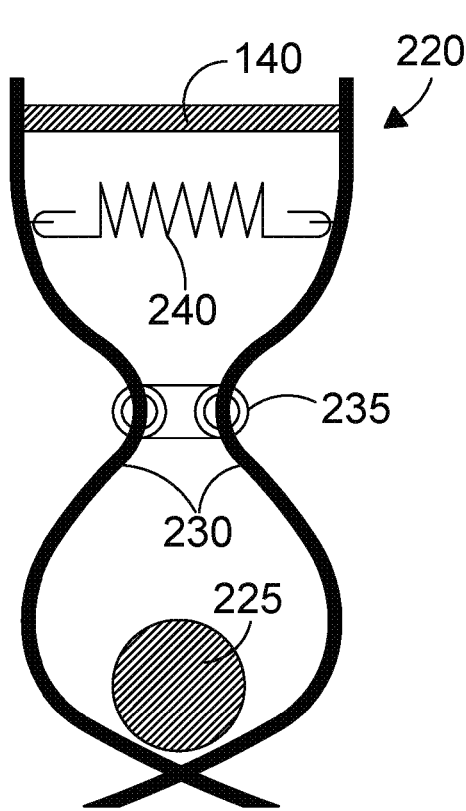
FIG. 12 is a schematic front view of a first embodiment of an example release mechanism assembly in accordance with the present invention. In this illustration, the example mechanism is in the closed (engaged) position.

An example of a beacon release mechanism is illustrated in FIG. 12. In this example, a single segment trigger rod 140 holds the mechanism closed 220 by preventing a spring 240 from drawing the upper portion of the mechanism's jaws 230 together by rotating them about a pivot assembly 235. The enclosed perimeter formed by the lower portion of the closed jaws 230 engages an anchor point 225 which prevents the vertical ascent of the assembly 220 towards the sea surface. As will be discussed in relation to FIG. 15, this upward force is provided by the buoyancy associated with the item to be released to the sea surface 6.

Figure 13:
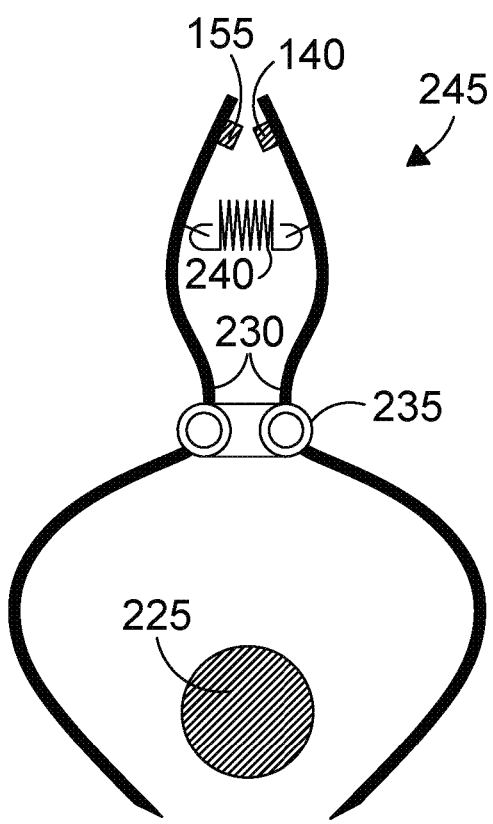
FIG. 13 is a schematic front view of the example release mechanism assembly of FIG. 12 but in this illustration, the example mechanism is in the open (dis-engaged) position.

FIG. 13 illustrates the opening of the release mechanism 245 following the degradation 155 of trigger rod 140. The collapse of the rod 140 allows spring 240 to draw together the upper portion of the mechanism's jaws 230 by pivoting them around pivot assembly 235. It can be seen that the lower portions of the jaws thus move apart, creating a gap which allows the open assembly 245 to disengage from the anchor point 225.

Figure 14:
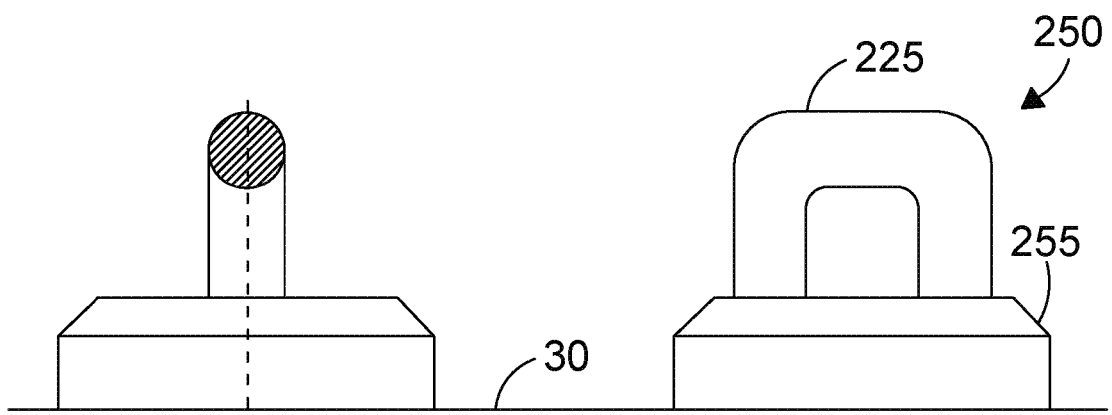
FIG. 14 is an illustrative sketch showing front and sectional side views of an example clump weight assembly that could be used in conjunction with the release mechanism shown in FIG. 12 and FIG. 13.

An example of an anchor 250 is given in FIG. 14 where a suitable clump weight 255 is located on the seabed 30 and the anchor point 225 is secured to the clump weight 255.

The single material trigger rod 140 may be replaced by the multiple material trigger rod 160 if desired prior to installation of the closed release mechanism 220.

Figure 15:
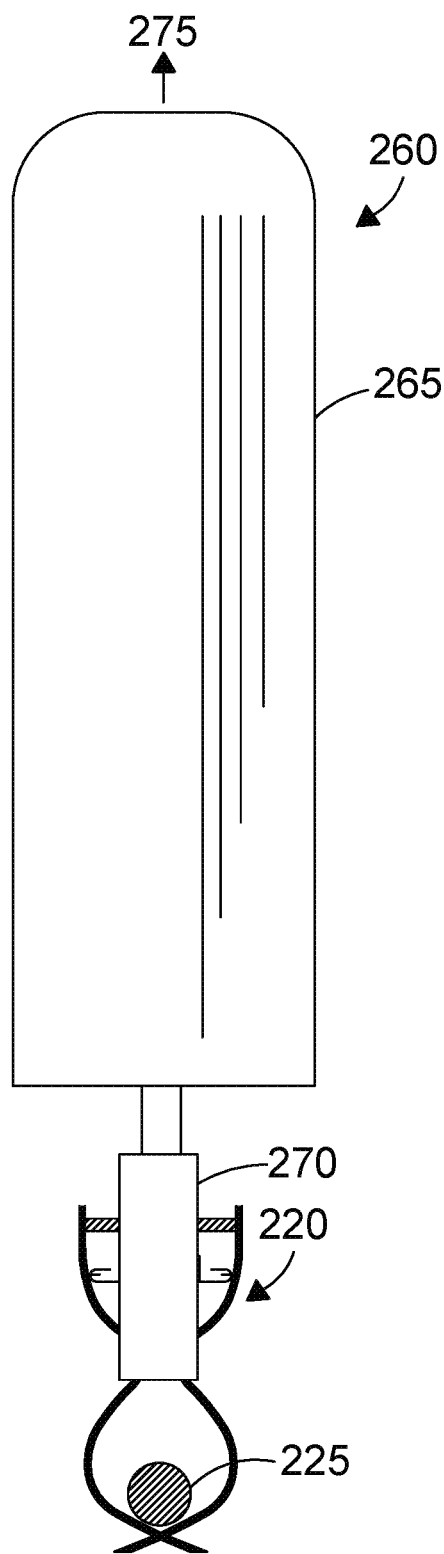
FIG. 15 is a schematic front view of the example release mechanism assembly of FIG. 12 showing an alert beacon and the release mechanism of FIG. 12 in context with each other.

Following the passive detection of SWIFT 145 or specific hydrocarbons and the completion of the trigger rod 140, 160 reactions and degradation processes disclosed previously, one embodiment of the present invention releases an electronic beacon which, through buoyancy, rises to the sea surface 6 where it begins transmitting to a satellite network 435. An example 260 of a complete beacon 265, release mechanism 220, anchor point 225 and buoyancy force 275 arrangement is shown in FIG. 15 for reference. An example of a beacon release mechanism attachment bracket 270 is also shown.

Figure 16:
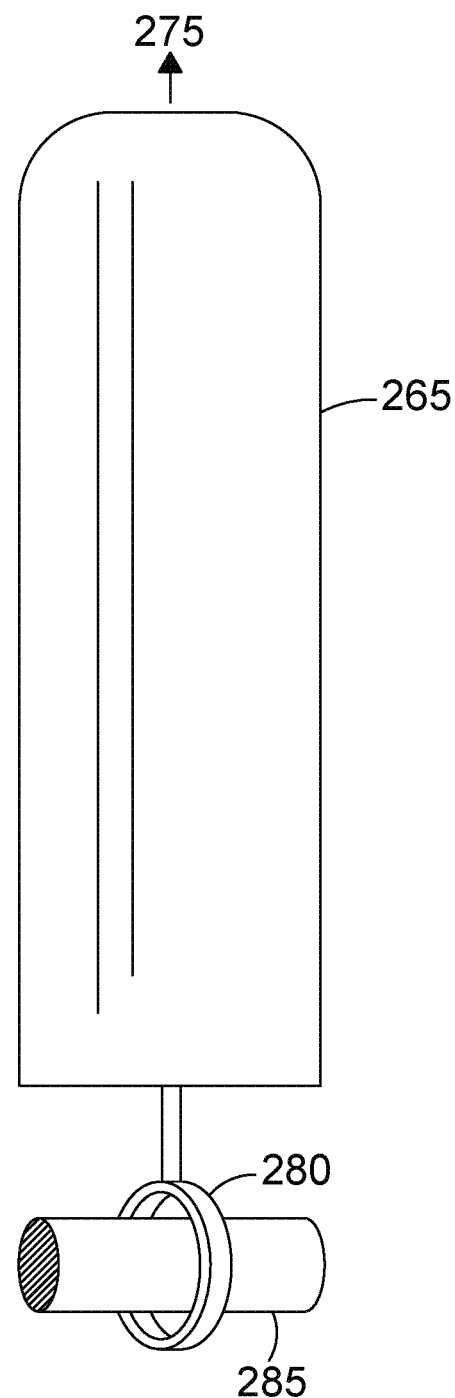
FIG. 16 is an offset schematic view of a second embodiment of another example release mechanism assembly in accordance with the present invention, showing an alert beacon and the other release mechanism in context with each other.

An alternative embodiment of beacon release mechanism is illustrated in FIG. 16. In this example, the beacon release mechanism attachment bracket is a simple ring 280 and the assembly is prevented from moving under buoyancy force 275 by trigger rod 285. In this embodiment, the trigger rod directly restrains the beacon assembly and the failure of the trigger rod 285, upon the completion of the reactions and degradation processes disclosed previously, allows the beacon assembly to ascend.

Figures 17, 18:
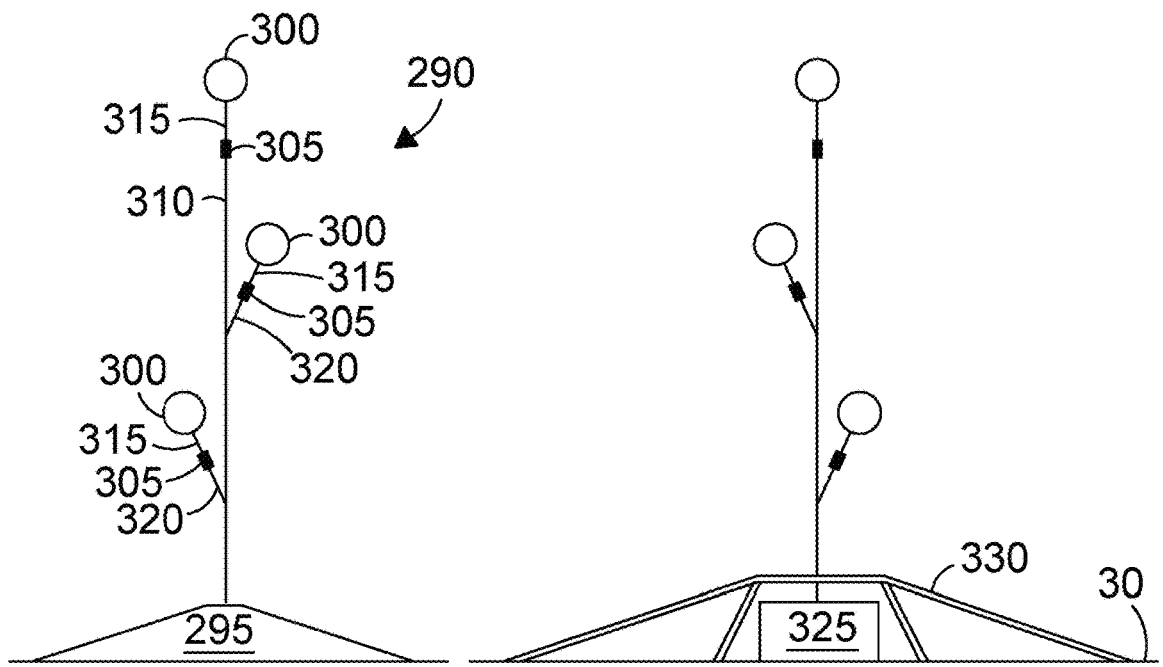
FIG. 17 is a schematic view of an example multi-buoy detection assembly in accordance with the present invention with a single-piece clump weight.
FIG. 18 is a schematic view of the example multi-buoy detection assembly of FIG. 17 but with a protective frame over a clump weight.

In FIG. 17 an apparatus 290 is described whereby many of the previously disclosed elements are shown in an example operational context. A shaped clump weight 295 is located on the seabed 30 and a main strop 310 is attached to clump weight 295. In this embodiment three beacon buoy assemblies 300 are shown, though any suitable number may be deployed. Branch strops 320 are fitted at vertical intervals along the main strop 310, these branch strops providing anchor points for each beacon assembly 300. Passive detection-release mechanisms 305 are attached to buoy strops 315 and are held in place by engaging their release mechanisms with the anchor points on the branch strops 320. Buoys 300 are attached to the other end of the buoy strops 315, where the buoys 300 incorporate an alert beacon. In this way a monitoring assembly 290 is configured that will passively detect the presence of SWIFT 145 or specific hydrocarbons in the local subsea environment. The particular configuration illustrated in FIG. 17 provides a number of benefits: the clump weight 295 is shaped to allow for the passage of fishing gear, such as nets, to pass over the structure; the buoys 300, by dint of being mounted on flexible strops 315, will be pushed over by the passage of nets and then regain their vertical orientation through the buoyancy of the buoy units 300. Placing multiple detection units 300 at different heights above the seabed 30 increases the probability that one of the detectors will be exposed to SWIFT 145 or other materials of interest, and thereby lead to the release of an alert beacon 300.

Another example of how this configuration could be utilised uses different triggers in each release mechanism 305 such that each reacts to different circumstances. Examples of this include the presence of different formulations of SWIFT 145, whereby different formulations are used in different zones of the decommissioned well 90, 105. It is therefore possible to distinguish which zone of a well a leak has come from by using different formulations of SWIFT 145 in each of the zones and suitable trigger materials in the release mechanisms. Similarly, if there are multiple wells in close proximity, but connected to different reservoirs, the technique can be used to identify which reservoir a leak has come from, rather than which well.

Each alert beacon has a unique identification (ID), thereby allowing cross-reference of a signal received (ID of the beacon) with the type of trigger fitted to it and its placement on, and in relation to, the seabed. As a minimum this would allow a monitoring party to identify which well a beacon was monitoring, and therefore the owner/responsible party to be informed of the alert signal.

A further variation of this embodiment is to utilise different trigger materials that react to the presence of different hydrocarbons, for example in addition to trigger materials that react to SWIFT, different formulations of SWIFT, or different variations of tracer fluids. This allows alerts to be generated which identify the specific hydrocarbon that reacts with the trigger material used for a particular beacon.

A further variation of the apparatus 290 is shown in FIG. 18. In this example, a clump weight (not shaped for overtrawling) 325 is located on the seabed 30 and protected by a shaped frame 330 that is designed to allow the safe passage of fishing equipment over the installation.

Figure 19:
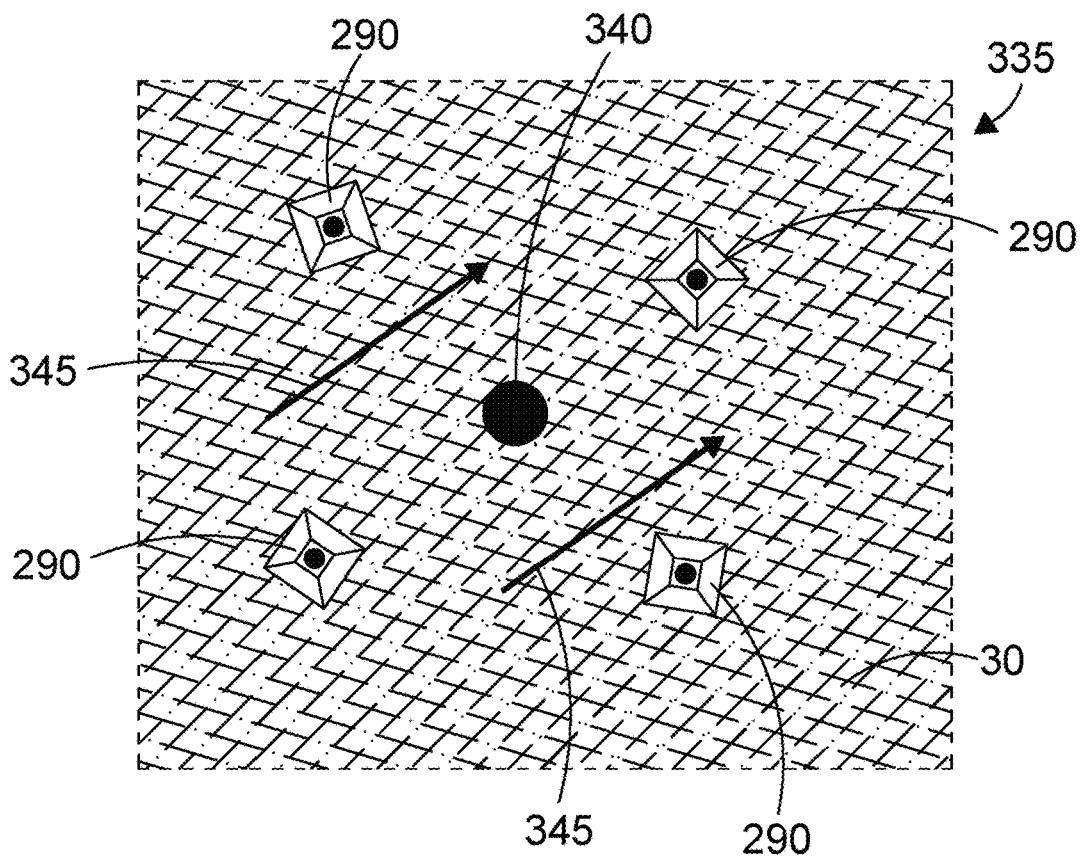
FIG. 19 is a schematic plan view of an example deployment of monitoring units comprising the multi-buoy detection assemblies of FIG. 18 around a well centre.

Although a single monitoring unit 290 may be deployed per decommissioned well, it is anticipated that multiple units 290 will be used to provide greater coverage of the area around a well centre. As illustrated in FIG. 19 several monitoring units 290 may be deployed on the seabed 30 in a pattern 335 around the original well centre 340. It will be appreciated that subsea currents are variable and highly dependent on many factors, including global location, but the example direction 345 shown in FIG. 19 illustrates how currents may move leaked material, including SWIFT 145 and hydrocarbons, towards monitoring units 290.

Figure 20:
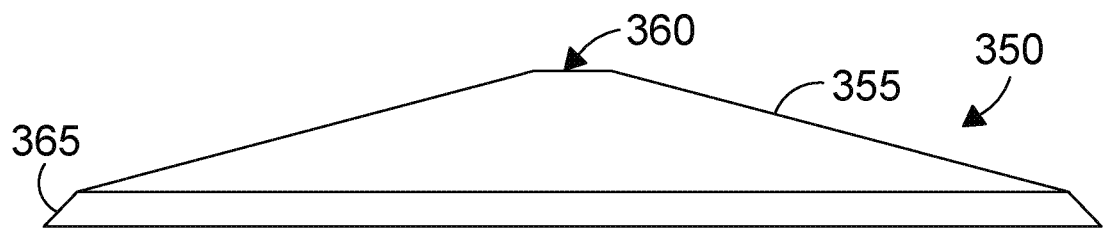
FIG. 20 is a schematic front view of an example conical monitoring assembly comprising a further embodiment of buoy detection assembly in accordance with the present invention.

It will be clear to those skilled in the art that many other forms of monitoring unit design are possible. An alternative example is shown in front elevation in FIG. 20 where a conical monitoring assembly 350 is illustrated. The assembly 350 in this embodiment is circular in plan form and includes: an outer surface 355, a beacon launch aperture 360 and an anti-trawl leading edge 365. Similar conical units may be envisaged with different plan view geometry, including square and triangular.

Figure 21:
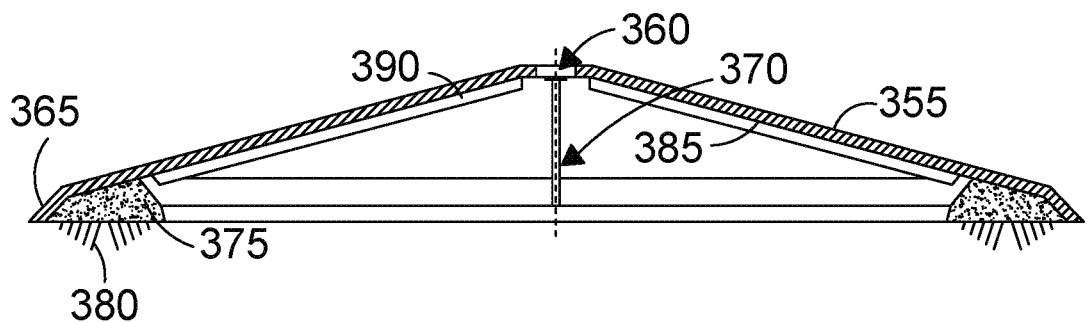
FIG. 21 is a cross-sectional front view sketch of the example conical monitoring assembly of FIG. 20 identifying the main components.

The elements of the conical monitoring assembly 350 are shown in greater detail in cross-section in FIG. 21. In addition to the outer surface of the cone 355, beacon launch aperture 360 and anti-trawl leading edge 365, the following elements are observed: beacon cage assembly 370, ballast ring assembly 375, ballast ring ground spikes 380, inner surface 385 and stiffening ribs 390. These elements are now discussed in more detail.

The outer surface of the cone 355 is formed from a material suitable for use in the subsea environment, such as glass reinforced plastic (GRP), and provides protection for the rest of the assembly 350 from the passage of fishing equipment. The beacon launch aperture 360 is necessary for the passage of an alert beacon through the aperture 360 of the cone 355 upon release by the passive detection mechanism. The cone's anti-trawl leading edge 365 is profiled to guide fishing equipment, such as the footrope of a demersal trawling fishing rig, onto the outer surface of the cone 355. In the present example a beacon cage assembly 370 is formed from a series of longitudinal rods arranged parallel in a circular pattern such that an elongated alert beacon 395 is loosely held in place in a vertical orientation. The cage assembly 370 is secured to the inner surface 385 of the monitoring cone 355. To provide stability and a secure placement on the seabed 30, a ballast ring assembly 375 is specified to generate a downward force for the conical assembly 350. A ballast ring assembly 375 may be constructed from any suitable material that is inert in the subsea environment and has sufficient density to generate the necessary downward force. The ballast ring assembly 375 is located inside the lower, inner portion of the monitoring cone 355 and held flush against the inner surface 385 by suitable fasteners. Recessed pad eyes (not shown) are equally distributed in at least three locations round the upper, outer surface of the ballast ring assembly 375, these being accessible through corresponding apertures in the cone's outer surface 355. These recessed pad eyes may be used in the deployment and/or recovery of the conical monitoring unit 350 from a surface vessel to the seabed. Distributed around the lower face of the ballast ring assembly 375 are ground spikes 380. These spikes, which may be of various lengths and set at different angles, are formed from a material of suitable strength and corrosion resistance for prolonged seabed use and are intended to engage the seabed surface material as a means of minimising horizontal movement of the assembly, however that may be caused.

Figure 22:
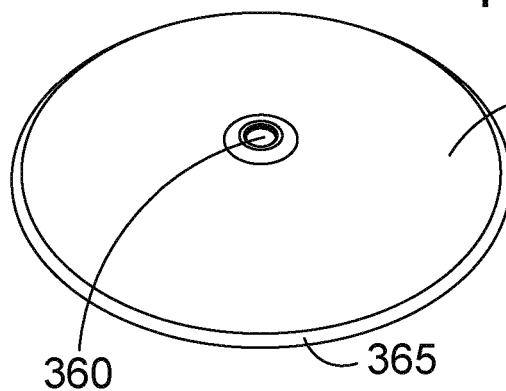
FIG. 22 is an offset (to the side and above) 3D view of the example conical monitoring assembly of FIG. 20.

For clarity, an offset (to the side and above) 3D view of the example conical monitoring assembly 350 is shown in FIG. 22. Here, the outer surface 355, beacon launch aperture 360 and anti-trawl leading edge 365 can be seen more clearly.

Figure 23:
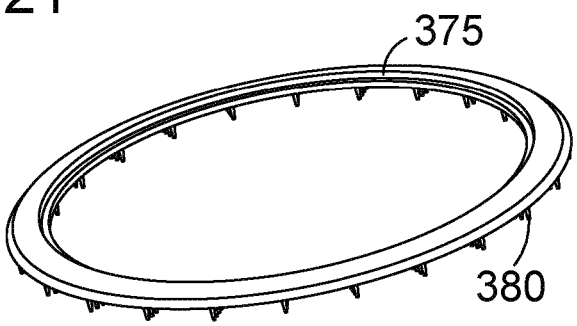
FIG. 23 is an offset (to the side and above) 3D view of a ballast ring assembly used in conjunction with the example conical monitoring assembly of FIG. 20.

FIG. 23 shows an offset (to the side and above) 3D view of a ballast ring assembly 375 and its ground spikes 380. The side profile of the ballast ring 375 and the manner in which it fits into the cone 355 are thus better understood.

Figure 24:
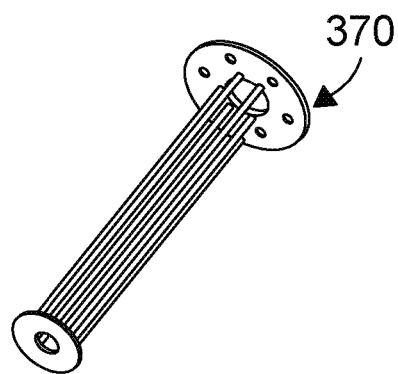
FIG. 24 is an offset (to the side and below) 3D view of an alert beacon cage assembly used in the example conical monitoring assembly of FIG. 20.

FIG. 24 shows an offset (to the side and below) 3D view of an alert beacon cage assembly 370. The arrangement of the supporting rods and their relation to the upper and lower retaining flanges is clearly seen.

Figure 25:
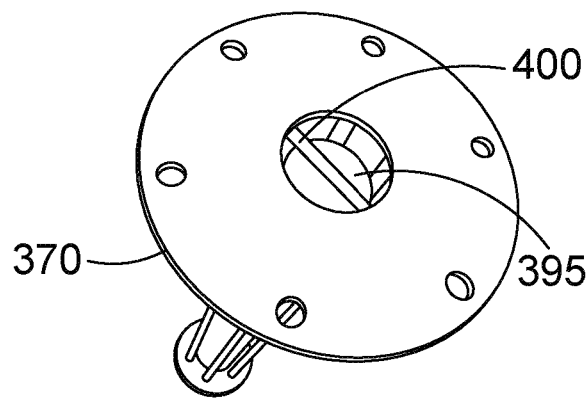
FIG. 25 is an offset (to the side and above) 3D perspective view of the beacon cage of FIG. 24, beacon and trigger rod used in the example conical monitoring assembly of FIG. 20.

In FIG. 25 an offset (to the side and above) 3D perspective view of an example of a possible relationship between the alert beacon cage assembly 370, the beacon 395 and the trigger rod 400 is given. Whereas in previous teachings in the present disclosure the trigger mechanisms have been illustrated below the alert beacon, in FIG. 25 it can be seen that the trigger rod 400 is located above the beacon 395 in such a way that it prevents the release of the beacon 395 from launch cage 370. It will also be appreciated that the trigger rod 400 is shown placed in close proximity to the beacon launch aperture 360.

This example arrangement is further distinguished from previous examples 260, 290 by the design of the cone 355 which gathers and funnels materials, such as SWIFT 145 or hydrocarbons emerging from the seabed 30, via the inner surface 385 of the cone 355 towards the beacon 395 launch aperture 360. This novel approach naturally guides materials of interest 145 towards a trigger rod 400 to maximise the probability of detection and subsequent generation of an alert signal.

Figure 26:
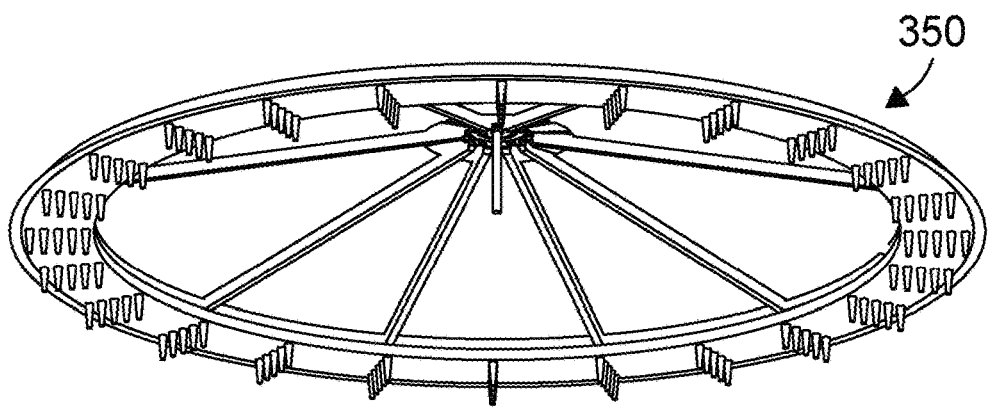
FIG. 26 is an offset (to the side and below) 3D view of the example conical monitoring assembly of FIG. 20 where the main components are seen in context.

For greater understanding, all the main components of the example conical monitoring assembly 350 can be seen in the offset (to the side and below) 3D view of FIG. 26.

Figure 27:
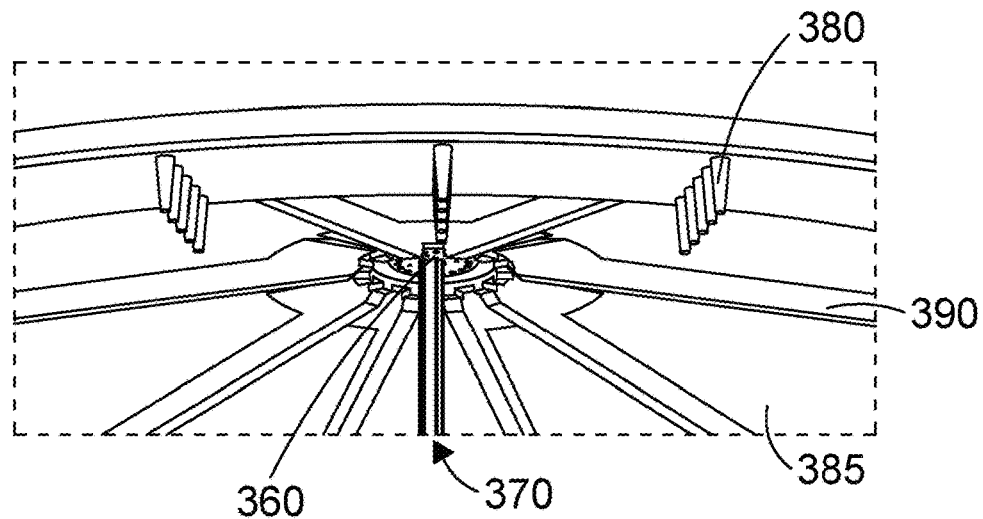
FIG. 27 is a zoomed-in offset (to the side and below) 3D view of the example conical monitoring assembly of FIG. 26 where several of the main components are seen more clearly in context.

FIG. 27 is provided to further illustrate some of the key features of this design in a zoomed-in offset (to the side and below) 3D view of the example conical monitoring assembly 350. The relationship between the following elements is more clearly seen: beacon launch aperture 360, beacon cage assembly 370, ballast ring ground spikes 380, cone inner surface 385 and cone stiffening ribs 390.

Figure 28:
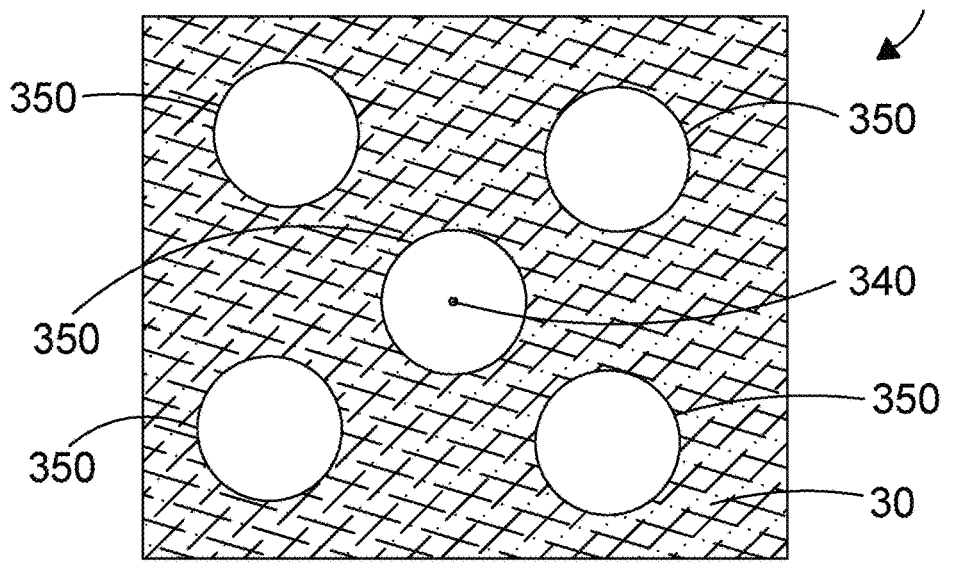
FIG. 28 is a schematic plan view of an example deployment of a plurality of conical monitoring assembly units of FIG. 20 around and directly over a well centre.

As illustrated in FIG. 28 several conical monitoring units 350 may be deployed on the seabed 30 in a pattern 405 around an original well centre 340.

Figure 29:
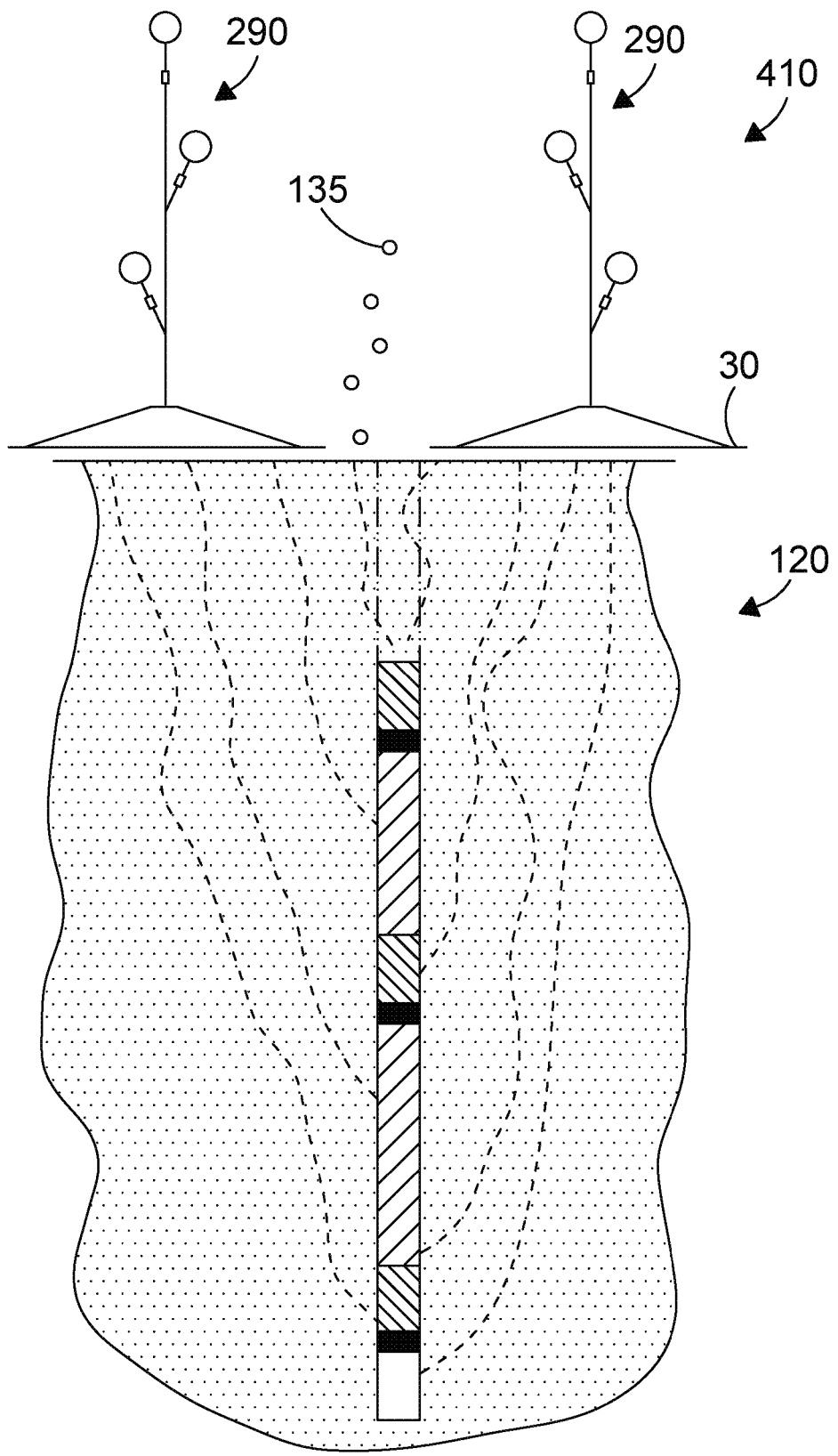
FIG. 29 is a schematic cross-sectional representation of example sub-surface post-decommissioning leak paths and side view of the example deployment monitoring units from FIG. 17 around a well centre.

FIG. 29 shows example multi-buoy detection assemblies 290 in context 410 with example sub-surface post-decommissioning leak paths 120. It will be appreciated that material 135 emerging from the seabed 30 into the subsea environment will, depending on placement of the monitoring units 290 in relation to the point(s) of leakage and the influence of subsea currents 345, interact with the release trigger mechanism of one or more detection units 290.

Figure 30:
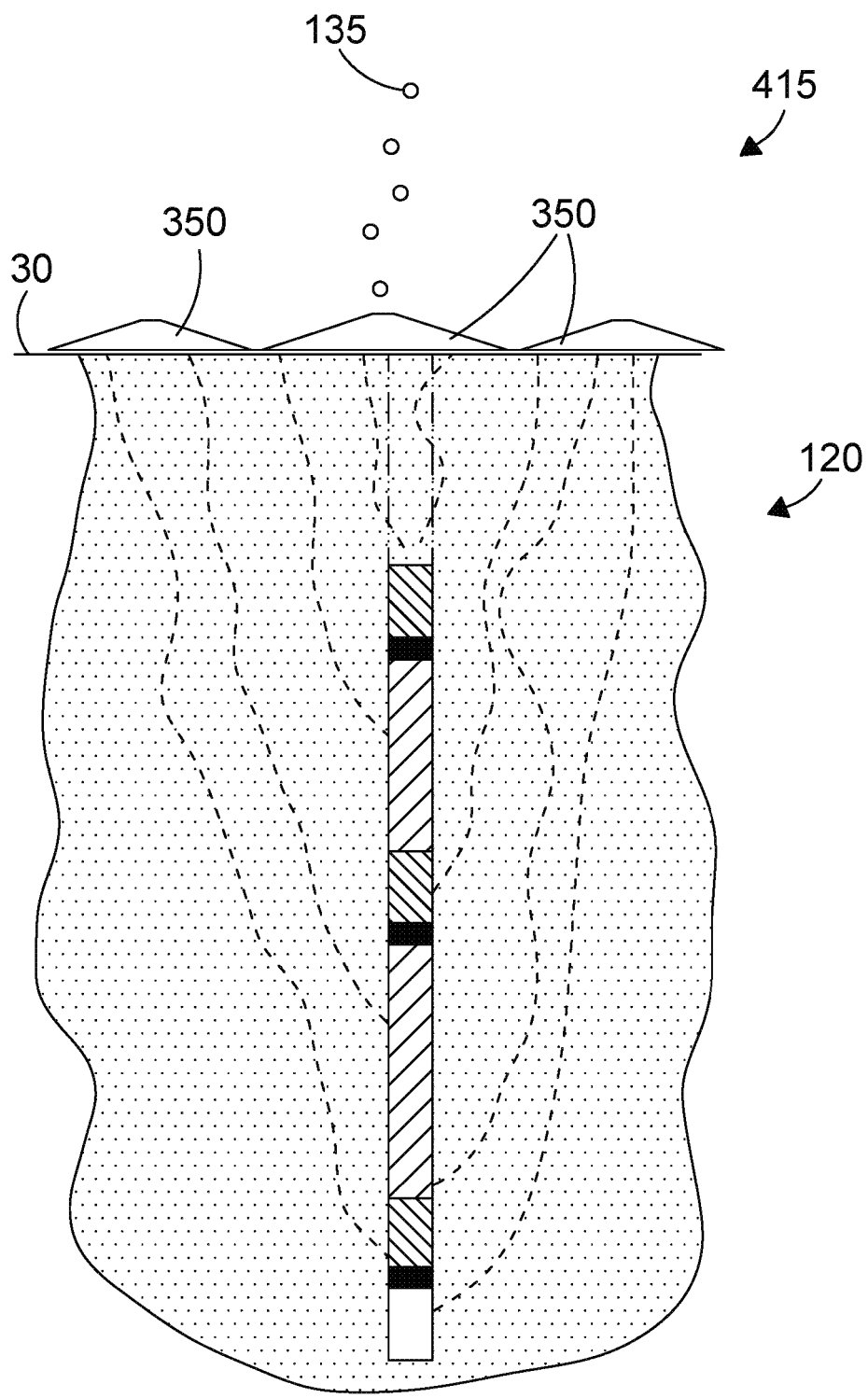
FIG. 30 is a schematic cross-sectional representation of example sub-surface post-decommissioning leak paths and side view of the example deployment conical monitoring units from FIG. 20 around a well centre.

FIG. 30 shows example conical monitoring units 350 in context 415 with example sub-surface post-decommissioning leak paths 120. It will be understood that material 135 emerging from the seabed 30 into the subsea environment will, depending on placement of the conical monitoring units 350 in relation to the point(s) of leakage, be gathered by the inner surfaces of the conical units 350 and funnelled upwards towards beacon launch apertures 360. By increasing the number of, and/or diameter of, the conical monitoring units 350, the area of the seabed 30 around a well centre that is monitored can be optimised.

As described above, shallow gas, e.g. biogenic methane, may be released naturally into the subsea environment through normal processes; however, there is increasing evidence that shallow gas accumulations which have been penetrated by the passage of wells drilled to much deeper hydrocarbon reservoirs are leaking biogenic gas which has been released by these boreholes. Given that biogenic gas migrating close to the outside of casing sections will be within a short distance of the well centre, the conical gathering embodiment discussed in relation to FIGS. 28 and 30 are particularly suited to capturing such gas—thereby distinguishing the gas escape from naturally arising biogenic gas released further from the well centre.

A further distinction of the example conical monitoring unit 350 design is that multiple units may be stacked vertically in a suitable framework (with each unit lying horizontally, one above another with their launch apertures 360 aligned). This is advantageous in minimising deck space on deployment vessels and maximising the number of monitoring units 350 that can be shipped at once.

Figure 31:
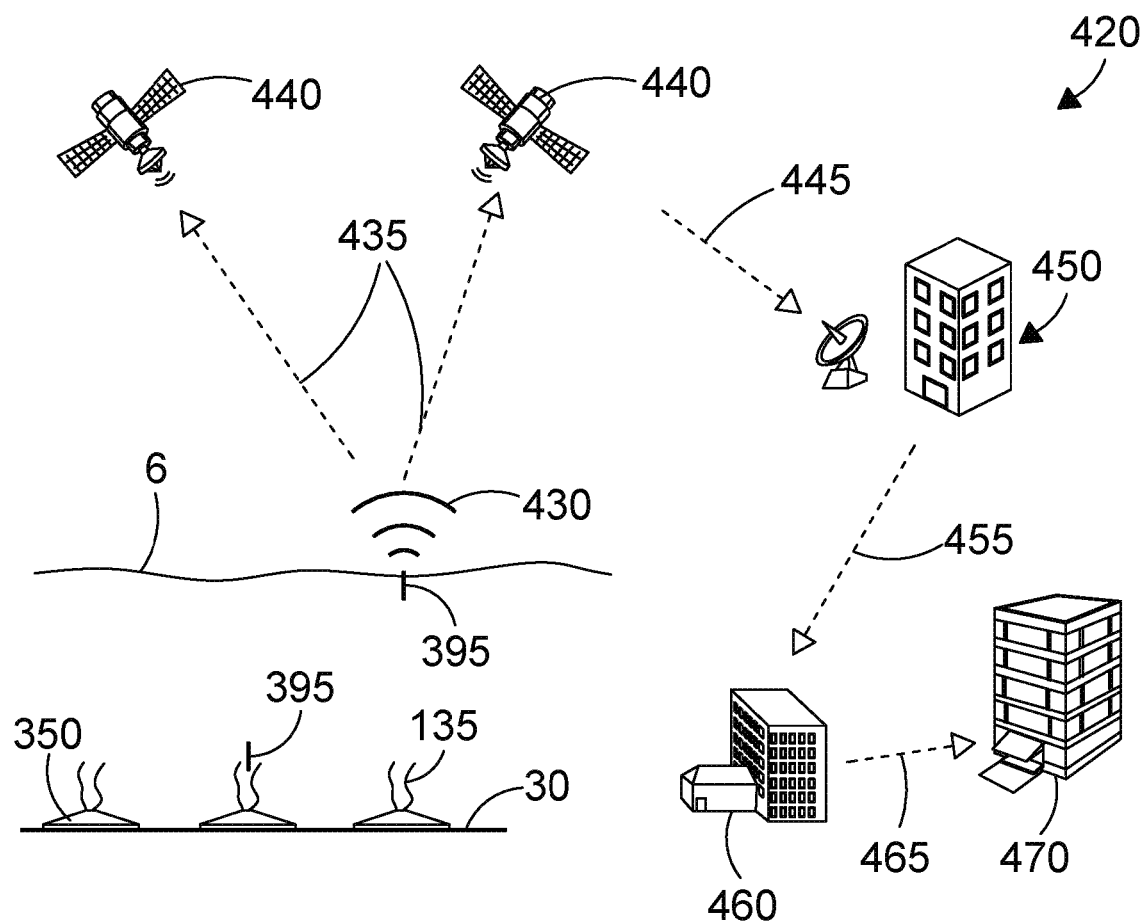
FIG. 31 is a schematic view of the monitoring alert operational sequence following release of at least one beacon from a conical monitoring unit such as those shown in FIG. 20.

FIG. 31 provides an overview schematic of the complete monitoring and alert operational sequence 420 associated with the present disclosure. In this embodiment a number of conical monitoring units 350 are deployed on the seabed 30 and leaked material 135 emerges from the seabed into the subsea environment. As discussed in relation to FIG. 30 the leaking material (such as SWIFT 145 or hydrocarbons) is guided naturally by the shape of the conical monitoring unit 350 towards a trigger component 140, 160, 400. Upon completion of a reaction 150, 185, 210 that degrades 155 a trigger 40, 160, 400, the structural integrity of the trigger component is reduced to the extent that the restraining force holding an alert beacon 395 in place is removed and the beacon 395 self-launches to the sea surface 6 under the influence of buoyancy 275. Upon reaching the sea surface 6 an alert beacon 395 begins transmitting using a protocol such as short burst data (SBD) 430 used by the Iridium satellite network provider. SBD signals 430 are sent to an orbiting satellite network 435 where satellites 440 receive signals and in turn relay these signals to ground stations 445. A satellite service provider's ground infrastructure 450 receives an alert signal and notifies the party responsible for well monitoring that a signal has been received. As a minimum this notification may include the unique beacon identification code (ID) 455 associated with the broadcasting unit. The party responsible for well monitoring processes the received data, e.g. cross-referencing the beacon ID against a database of well locations and owners 460. The well monitoring service provider alerts the party responsible for the well 470 that an alert has been received (including appropriate supporting information) 465.

Many further variations of the embodiments disclosed herein are envisaged. These include the use of multiple alert beacons associated with a single well, where each beacon is restrained by a trigger sensitive to different materials such as SWIFT 145 or different hydrocarbon fractions. The receipt of an alert from a particular beacon can then be tied to the presence of a particular material in the subsea environment, providing a richer data set upon which to base operational decisions.

For the deployment of monitoring units, such as the conical monitoring unit 350 discussed earlier, operational efficiencies (reductions in vessel time) may be achieved by deploying multiple units simultaneously. A spreading beam framework, which may be in the shape of an equal-length sided horizontal cross, might be used to lower a number of units on one main lifting wire. One example deployment frame might have four legs, supporting five conical monitoring units (one in the centre and one at each cardinal point at the end of a leg). By employing commonly used techniques such as USBL (ultra-short baseline) acoustic positioning, the multi-unit arrangement can be centred on a well with the outlying units automatically distributed and positioned with respect to the well centre.

In a simplified approach to deployment, smaller monitoring units may be deployed by over-boarding from a surface vessel and sinking through appropriate ballast-induced forces to the seabed. Many means of controlling the rate of descent of such units are possible, including drag devices and gas-filled lift bags which may be released remotely to return to the surface for recovery once the monitoring units are landed on the seabed. Whereas the deployment methods described previously are intended to position monitoring units with a reasonable degree of locational accuracy, typically within one or two metres of a well centre, the over-boarding approach is less accurate, but might be deemed suitable for the monitoring of larger areas, such as those associated with clusters of wells.

Referring now to FIGS. 32-35, a vertical gathering and concentrating assembly 500 in accordance with the present invention is illustrated. The assembly 500 comprises a clump weight 501 for securing the assembly 500 to the seabed when the assembly 500 is deployed. The assembly comprises a series of vertically stacked conical funnels 520, 521 which are supported at the lower end of the assembly 500 by a tripod arrangement of ribs 505, which may be made of, for example, steel or similar material. The tripod arrangement 505 is arranged so that the larger conical end 520*a* of the lowermost conical funnel 520 fits over the tripod 505 and is thereby supported. The tripod arrangement 505 may be a pyramid shape having a flat base 505*b* formed from ribs and may be cemented, for example, into the clump weight 501 for stability and security.

Figures 32, 33:
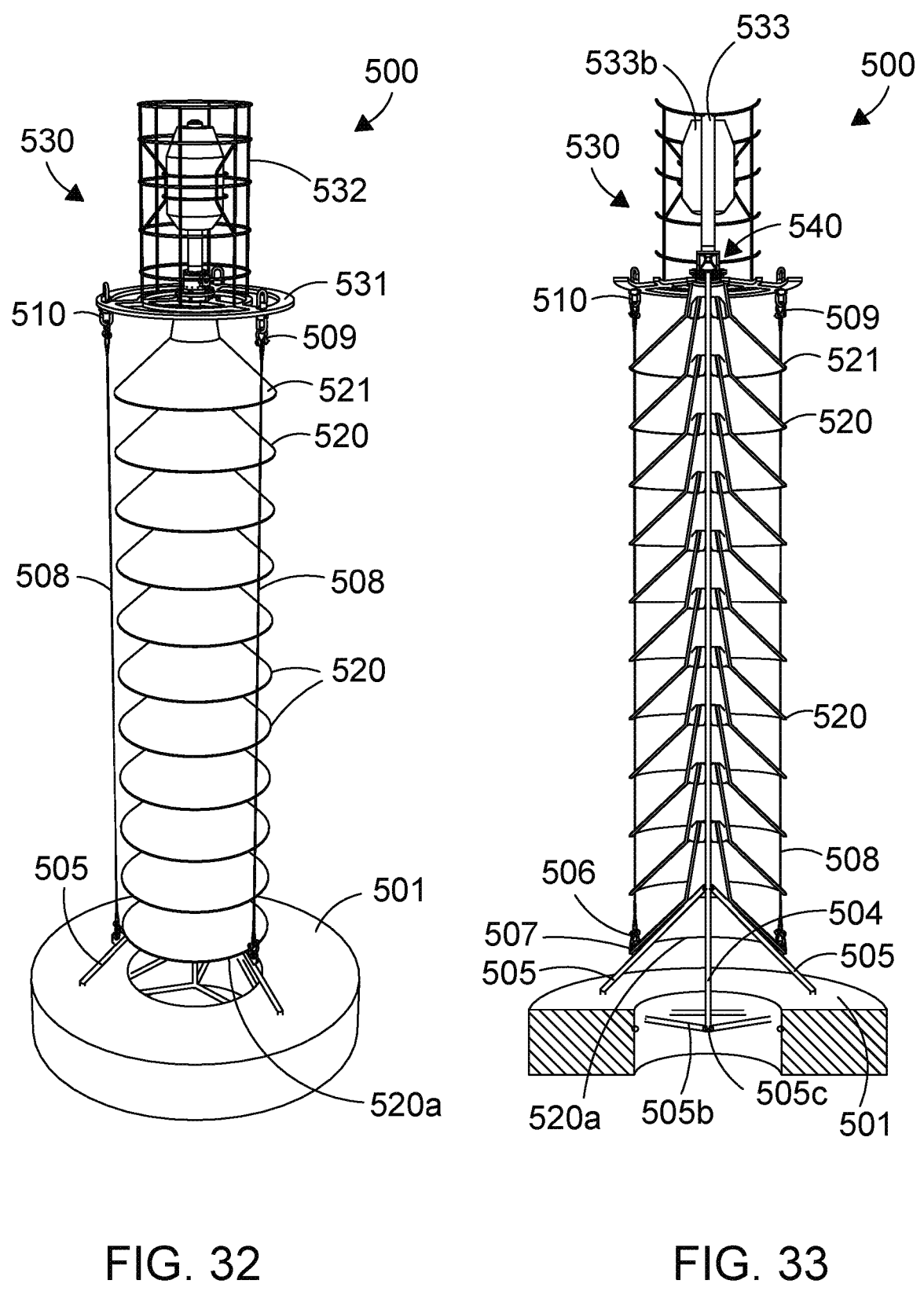

As best seen in FIG. 33, a central support rod 504 is connected to the central point 505*c* of the tripod base 505*b* and the apex of the tripod ribs 505, and runs up through the centre of the stacked conical funnels 520, 521, providing further support to the conical funnels 520, 521.

A signalling assembly 530 is provided at the upper end of the assembly 500, which is mounted onto mounting plate 531. The mounting plate 531 also serves to restrain the conical funnels 520, 521 within the assembly 500 and provides anchor points 510, through which tension wires 508 are connected by shackles 509 at one end, while at the other end of the tension wires 508 the tension wires 508 are connected via shackles 506 to pad eyes 507 on the tripod ribs 505. The anchor points 510 are double-sided and the other side of the anchor points 510, not connected to the tension wires 508, are used as lifting points for the whole assembly 500 during subsea deployment and recovery operations. The tension wires 508 also serve to augment the central support rod 504 in resisting bending forces caused by subsea currents acting on the assembly 500.

Signalling assembly 530 further comprises an alert beacon 533, encased in external buoyancy 533*b* and surrounded by a protective cage 532. The cage 532 is secured to the mounting plate 531. The cage 532 comprises an open end, so that the alert beacon 533 is free to float out of the cage 532 when the trigger rod 542, 642 within the reaction chamber 540, 640 fails as will be described further below.

Each of the conical funnels 520, 521 comprises a lower skirt-like section 520*a*, 521*a* that has a large diameter to facilitate capture of tracer fluid (e.g. SWIFT, hydrocarbons, or another predetermined chemical) as the naturally buoyant chemical drifts under, or into, the space enclosed by the capturing portion 520*a*, 521*a*, which then guides the fluid up the inner surface of the capturing portion 520*a*, 521*a*. Immediately above the capturing portion 520*a*, 521*a* of the funnels 520, 521 is a guiding channel 520*b*, 521*b* (see FIGS. 34 and 35) that directs captured fluid upwards, through adjacent funnels 520, 521 and eventually into the reaction chamber 540, 640 (see FIGS. 37-43) which will be discussed in more detail below. The guiding channel 520*b* of a first conical funnel 520 immediately beneath a second conical funnel 520, 521 fits within a portion of the guiding channel 520*b*, 521*b* of the second conical funnel 520, 521, immediately above the first conical funnel 520. In this way, the funnels 520, 521 are arranged such that they overlap and interconnect with one another.

Figure 34:
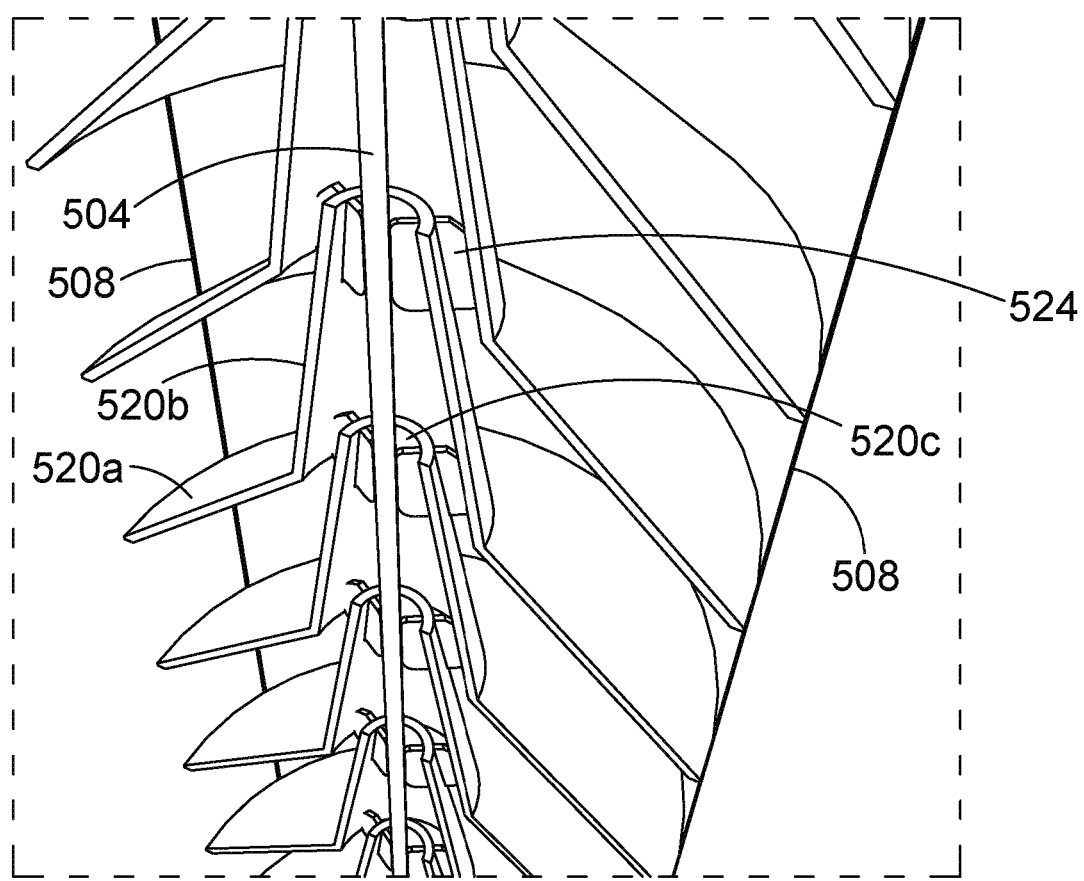
FIG. 34 is a zoomed-in cross-sectional perspective view of several conical funnels of the assembly of FIG. 32.

As can best be seen in FIGS. 33 and 34, at the upper end of the guiding channels 520*b* of each non-truncated conical funnel 520, there are tabs 524 extending on either side of the wall forming the guiding channel 520b. The tabs 524 abut the central support rod 504 in the inwards direction and abut the inner surface of the guiding channel 520b, 521b of the adjacent conical funnel 520, 521. The tabs 524 centralise, stabilise, and align each of the conical funnels 520, 521 within the stack.

The overlapping nature of the vertically stacked, interconnected conical funnels 520, 521 provides a continuous fluid pathway from any radial or vertical point of entry of buoyant material (e.g. tracer fluid) into the assembly 500, through a series of apertures 520c formed between the tabs 524 to the reaction chamber 540, 640 at the top of the assembly 500.

Figure 35:
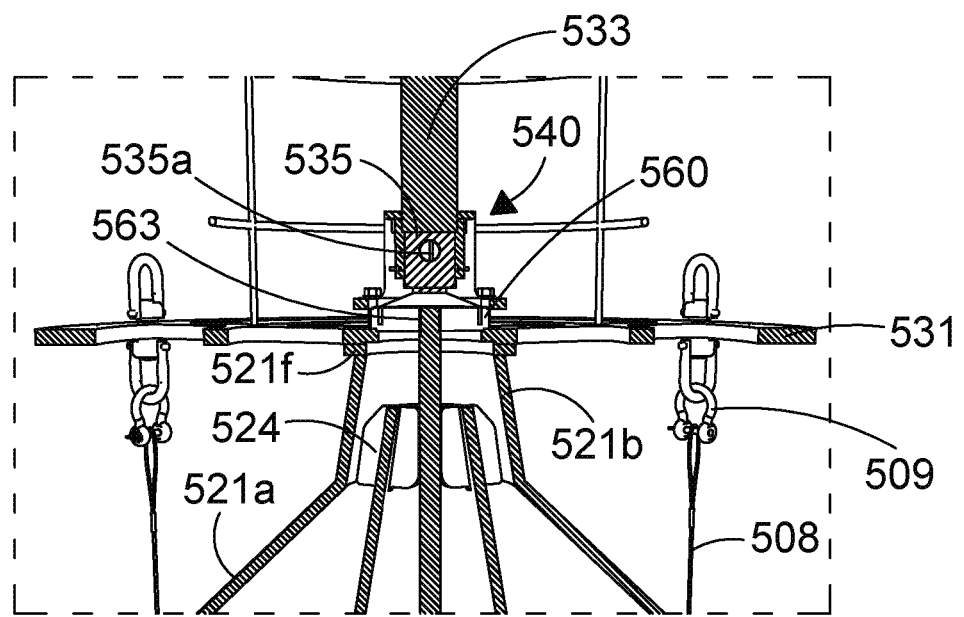
FIG. 35 is a zoomed-in cross-sectional illustration of a top portion of the assembly of FIG. 32, including the mounting ring and reaction chamber.

As best seen in FIG. 35, the uppermost conical funnel 521 in the stack comprises a truncated guiding channel 521b, and is fitted with a flange 521f to which the mounting plate 531 is secured. Aligned with the central axis of the assembly 500 is a locking disc 560, which comprises a threaded central aperture 563. The locking disc 560 engages with the central support rod 504 by mating threaded sections and threading the disc 560 onto the rod 504. The engagement of the disc 560 and rod 504 traps the mounting plate 531 in place between the flange 521f of the uppermost funnel 521 and the disc 560, and also exerts a tensile force on the central support rod 504 through the reaction of the compressive force exerted on the stack of conical funnels 520, 521. The locking disc 560 includes a fluid pathway to allow gathered fluid/material which has flowed upwards through one, some, or all of the interconnected conical funnels 520, 521 into the reaction chamber 540. The reaction chamber 540 is an enclosed volume where the tracer fluid can be concentrated in such a way as to surround the trigger rod 542 and dwell there to facilitate the degradation reaction(s).

Figure 36:
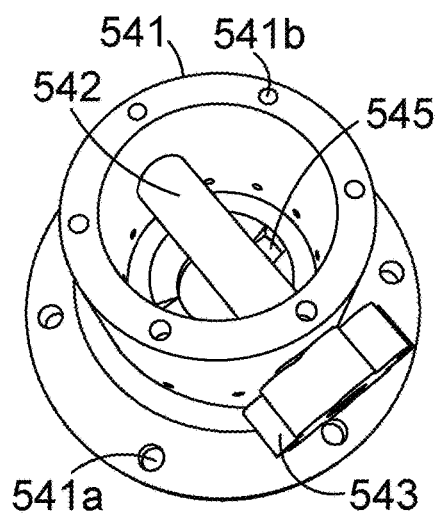
FIG. 36 is a perspective view of a lower portion of the reaction chamber with a trigger rod in place.

FIG. 36 shows an example of the reaction chamber housing 541 with a trigger rod 542 installed. The reaction chamber may be made of steel or other materials that will not react with the target chemical, and which meet user requirements for weight, longevity, buoyancy, and the like.

The reaction chamber housing 541 comprises a substantially cylindrical compartment formed from the walls of the housing 541, through which extends an aperture 541c (best seen in FIG. 37) through which the trigger rod 542 enters the reaction chamber housing 541 and passes across the housing 541 to abut an orifice 541d directly opposite the aperture 541c. A guiding and securing (via mating threaded portions) handle 543 is provided to facilitate the insertion (and if necessary, the removal) of the trigger rod 542 into, or from, the reaction chamber 540. The cylindrical compartment of the housing 541 narrows to a throat portion 541t and flares out to a skirt-shaped portion 546 (best seen in FIG. 37), where the skirt-shaped portion 546 has a diameter that is sufficient to encompass the fluid pathway or pathways provided through the locking ring 560. The skirt-shaped portion 546 comprises a shaped shoulder 541f around the circumferential inner edge of the skirt-shaped portion 546 which engages with a correspondingly shaped shoulder on the locking ring 560 and centres the reaction chamber housing 541 on the locking ring 560.

A series of circumferentially arranged through-holes 547 extend through the wall of the housing 541 towards the base of the cylindrical compartment. As denser material that might be held within the reaction chamber 540 is gradually displaced by increasing volumes of less dense captured tracer fluid, the displaced material can be passed out of the through-holes 547. The through-holes 547 thus provide a route for fluid circulation, and small debris particles, for example particles that may be produced as the trigger rod 542 degrades.

At the lower end of the reaction chamber housing 542, protruding outwardly, is a circumferentially extending flange comprising apertures 541a via which the reaction chamber housing 541 is bolted to the mounting plate 531. Around the uppermost rim of the housing 541 are further orifices 541b (see FIG. 36) which permit connection (for example by screws, bolts, or the like) of a collar 544 to seal the reaction chamber 540 when the reaction chamber 540 is assembled and an alert beacon 533 installed.

Figure 37:
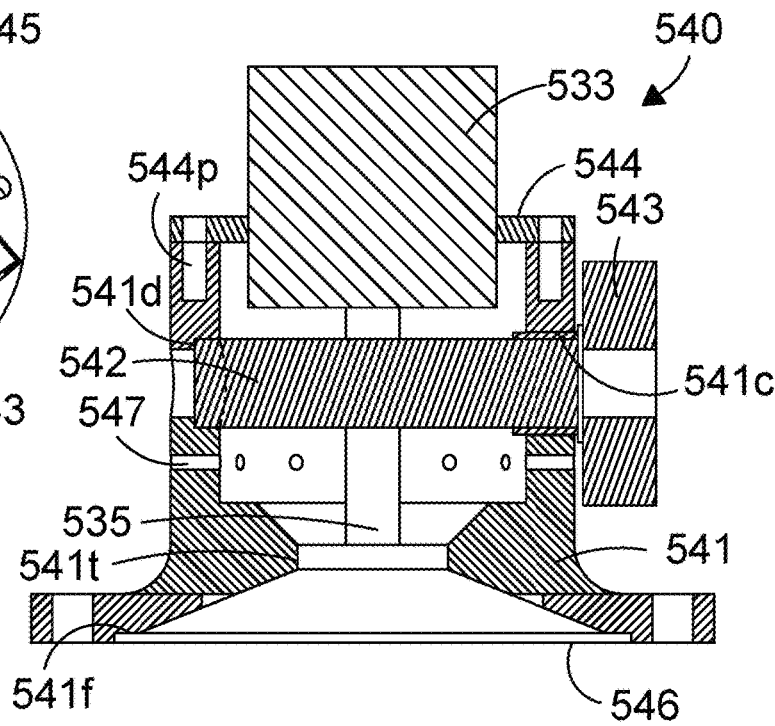
FIG. 37 is a cross-sectional side view of a reaction chamber showing the restraining connection between the beacon and the trigger rod.

FIG. 37 shows the reaction chamber housing 541 in an assembled configuration with the trigger rod 542 inserted through aperture 541c and abutting orifice 541d. The chamber has been sealed by the collar 544 which has been connected to the reaction chamber housing 541 by fixings 544p, which restricts the premature escape of buoyant material from the chamber 540, and prolongs the exposure of the trigger rod 542 to the tracer fluid, encouraging degradation of the trigger rod 542. The collar 544 may include an elastomeric seal to enhance the sealing of the reaction chamber 540 against fluid escape. The seal may be made from any suitable material that can withstand the conditions in which the assembly 500 is to be placed, and can for example withstand long-term immersion in cold sea water.

The alert beacon 533 comprises a planar plate 535 extending from its base and comprising an aperture 535a (see FIG. 35) which is configured to align with the aperture 541c in the housing 541. The plate 535 can be aligned in a straightforward manner by sliding it into the notches 545 that are formed within the compartment of the housing 541. The notches 545 help to prevent torsional and lateral movement of the alert beacon 533 as well. When the trigger rod 542 is installed, it is therefore also passed through the aperture in the plate 535 of the alert beacon 533. The trigger rod 542 thus retains the alert beacon 533 in position while the trigger rod 542 remains intact, preventing the beacon 533 from moving vertically under its own buoyancy.

Over time, and potentially many tidal cycles, as the concentration of the tracer fluid builds up within the reaction chamber 540, the effect of the tracer fluid on the exposed trigger rod 542 will intensify. The alert beacon 533 will be launched under self-buoyancy once the mechanical properties of the trigger rod 542 restraining it have been diminished below its ability to resist the upward-acting buoyant force, leading to failure of the trigger rod 542. At this point the plate 535 will slide out of the notches 545, and the beacon 533 and its buoyancy unit 533b will disengage from the reaction chamber 540, move clear of the protective cage 532, and rise to the surface of the sea at a rate determined by the degree of buoyancy and the prevailing subsea conditions. On breaching the surface, the beacon 533 will activate and establish communication with a satellite network to deliver the message that the beacon 533 has been released from a specific subsea well.

Figure 38:
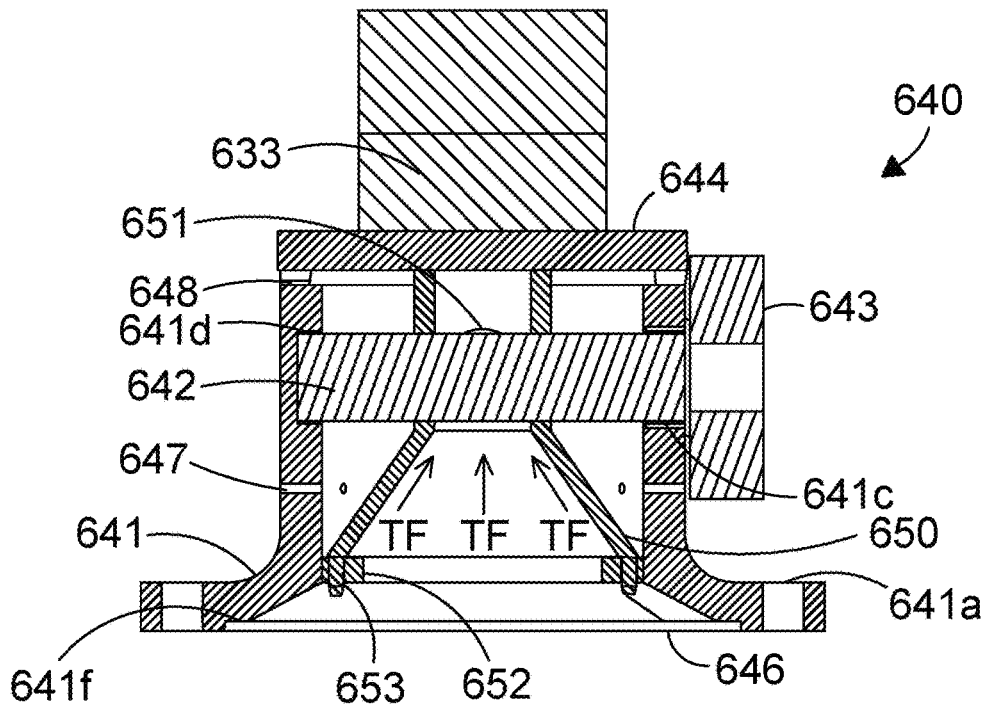
FIG. 38 is a cross-sectional side view of a reaction chamber comprising a notching device.

FIG. 38 shows an alternative arrangement of the reaction chamber 640, where the tracer fluid can be focused on a particular section of the trigger rod 642 to accelerate the failure of the rod 642, and therefore the release of the alert beacon 633. Many components of the alternative embodiment of reaction chamber 640 are similar to those of the first embodiment of reaction chamber 540 and where that is the case, the same reference number has been used with the addition of 100.

The release chamber 640 comprises a housing 641, which in this example comprises a cylindrical compartment and a skirt-shaped portion 646 but does not comprise a narrowed throat portion. Instead, the alert beacon 633 is integrally connected to the chamber collar 644 and a notching device 650. An advantage of integrating the chamber collar 644 with the alert beacon 633 is that when the beacon 633 is released from the reaction chamber 640, the entire internal diameter of the chamber 640 is opened, rather than the vertical passage being constrained to an aperture defined by the outside diameter of the beacon 633. This permits the use of the notching device 650 within the reaction chamber 640.

The notching device 650 fits within the chamber housing 641. The housing 641 has semi-circular projections 652 on the inner surface of the cylindrical compartment which comprise orifices for locator pins 653 (see FIGS. 38 and 39). The locator pins 653 are positioned on the lowermost rim of the notching device 650 facing downwards, so that when the notching device 650 is slid into the reaction chamber housing 641, the locator pins 653 fit into the orifices in the semi-circular projections 652. These have the additional advantage of correctly aligning the notching device 650 within the chamber housing 641. The notching device 650 comprises a lower funnel-shaped skirt portion 650a, and an upper cylindrical channel 650b. The upper cylindrical channel 650b has four apertures 651 formed through the walls of the notching device 650; two of the apertures 651 are for the trigger rod 642 to pass through when the rod 642 is installed within the reaction chamber 640, and the other two apertures 651 are to provide a fluid circulation route and an escape route for trigger rod material and spent fluids as the trigger rod 642 degrades. Two apertures 651 thus align with aperture 641c in the wall of the reaction chamber housing 641 on one side and orifice 641d, into which the trigger rod 642 abuts when installed, on the other.

As in the previously described example, the reaction chamber housing 641 comprises a shaped shoulder 641f around the inner edge of the circumference of the skirt-shaped portion 646. This abuts a similarly shaped shoulder on the locking ring 660 and provides a means of centring the reaction chamber 640 on the locking ring 660. Tabs (not shown) may be incorporated into the bottom edge of the skirt-shaped portion 650a to locate it in cut-outs in the bottom of the reaction chamber housing 641 to prevent vertical axial rotation of the alert beacon 633 in a manner similar to the previous example.

By placing the skirt-shaped portion 650a (which is shaped as a hollow cone) above the point of entry of the buoyant material through the base of the reaction chamber 640, most of the tracer fluid rising through the assembly 500, 600 will be gathered into the skirt-shaped portion 650a, and thereby brought to bear on the target areas of the trigger rod 642. Any buoyant chemical that does not get caught in the skirt-shaped portion 650a will still circulate within the volume of the reaction chamber housing 641 and ultimately interact with the trigger rod 642, thus will not be lost or wasted.

The tracer fluid TF is restrained within the inner volume of the skirt-shaped portion 650a of the notching device 650 and guided by the inner surfaces of the skirt-shaped portion 650a towards the trigger rod 642. This focusses the tracer fluid TF on a smaller surface area of the trigger rod 642 in comparison to the reaction chamber 540, and leads to a higher concentration of the tracer fluid TF surrounding the trigger rod 642. This causes more rapid degradation of the trigger rod 642 in at least one specific location, causing one or more notches to develop in the trigger rod 642. This notching effect has been shown to reduce the time to failure of trigger rods 642 for a given volume of tracer fluid, or conversely to allow the same reaction time as achieved in a non-focused reaction chamber 540 to be achieved with a lower volume of captured tracer fluid.

Once the trigger rod 642 reaches a certain level of degradation, it can no longer resist the upwards force of the buoyancy of the alert beacon 633 and fails, allowing the integral alert beacon 633, collar 644, and notching device 650 to lift out of the reaction chamber housing 641 and float to the surface. When the alert beacon 633 is released from the reaction chamber housing 641, the entire internal diameter of the reaction chamber housing 641 is opened, rather than the vertical passage being constrained to an aperture defined by the outside diameter of the beacon 633. This additional clearance permits the use of the notching device 650.

The entire notching device 650 may lift out in one piece, for example the pegs or pins 653 may slide out of the orifices in the semi-circular projections 652. Alternatively, the skirt-shaped portion 650a may be separable from the cylindrical channel 650b. For example, the skirt-shaped portion 650a may be threadedly fixed into the semi-circular projections 652, or otherwise fixed within the reaction chamber housing 641, and the notching device 650 may be fitted together at the intersection between the skirt-shaped portion 650a and the cylindrical channel 650b, with the two sections 650a, 650b held in place relative to one another by the restraining action of the trigger rod 642. When the trigger rod 642 fails, only the cylindrical channel 650b may then lift out of the reaction chamber housing 641.

FIG. 39 shows a side view of the integral alert beacon 633/notching device 650 assembly. The alert beacon 633 is connected to the collar 644 which comprises, on its lower surface, an elastomeric seal 648. This improves the fluid-tightness of the seal achieved by the collar 644 when the reaction chamber 640 is made up and reduces loss of tracer fluid/SWIFT from the chamber 640.

An exploded cross-sectional view of the upper components of the reaction chamber 640 and mounting ring 531 is illustrated in FIG. 40, showing the relationships between the principal upper components. The integral notching device 650 and alert beacon 633 example of the reaction chamber 640 is shown with the trigger rod 642.

The semi-circular projections 652 into which pegs or pins 653 may slide can be seen. The reaction chamber housing 641 comprises a shoulder 641f as previously described which is configured to fit onto a similarly complementary first shoulder 661, on the outer circumference of the upper face of the locking ring 660. The reaction chamber housing 641 further comprises apertures 641a around a circumferentially extending flange at the base of the housing, which apertures 641a align with apertures 531a in the mounting ring 531. The reaction chamber housing 641 can thus be secured to the mounting ring 531.

Locking ring 660 comprises a central threaded aperture 663 as previously described which is configured to thread on to a complementary threaded portion 504t of the central support rod 504 of the assembly 500. The locking ring 660 as illustrated here is perforated by a plurality of vertical through-holes or capillaries 664 passing from the lower face of the locking ring 660 to the upper face thereof. These capillaries 664 provide multiple fluid pathways for the tracer fluid/SWIFT and other buoyant and/or less dense material to continue to flow from the apertures 520c created by the conical funnels 520, 521 into the reaction chamber 640 where the tracer is concentrated.

The locking ring 660 further comprises a second shaped shoulder 662 on the outer circumference of its lower face which fits onto a complementary shoulder 535 around the inner circumference of the upper face of the inner aperture 535a of the mounting ring 531. Likewise, the inner circumference of the lower face of the inner aperture 535a of the mounting ring 531 comprises a further shoulder 536 which abuts the flange 521f of the uppermost conical funnel 521. The flange 521f may also comprise a shoulder that complements the facing shoulder on the mounting ring 531. The effect of the series of shoulders 521f, 535, 536, 661, 662, 641f is to self-centre each of the components when they are assembled together.

Although the mechanical design of the disclosed examples prevents movement of the alert beacon 533, 633 in multiple directions, it cannot prevent the upward force exerted by the beacon's 533, 633 buoyancy during the deployment phase of installation subsea, e.g. as the vertical gathering and concentrating assembly 500, 600 is lowered from a surface vessel through the splash zone into the water. To resist this force and thereby prevent damage to the trigger rod 542, 642, a sea water soluble restraint can be used to stop the beacon 533, 633 rising during deployment. This restraint is designed to prevent unwanted vertical movement of the beacon/buoyancy unit 533, 533b, 633 whilst the latter is being deployed and is further designed to fully dissolve in an environmentally-friendly manner after a predictable period of submersion in sea water. Once this dissolution is complete, the alert system may be regarded as being fully armed.

Figure 41:
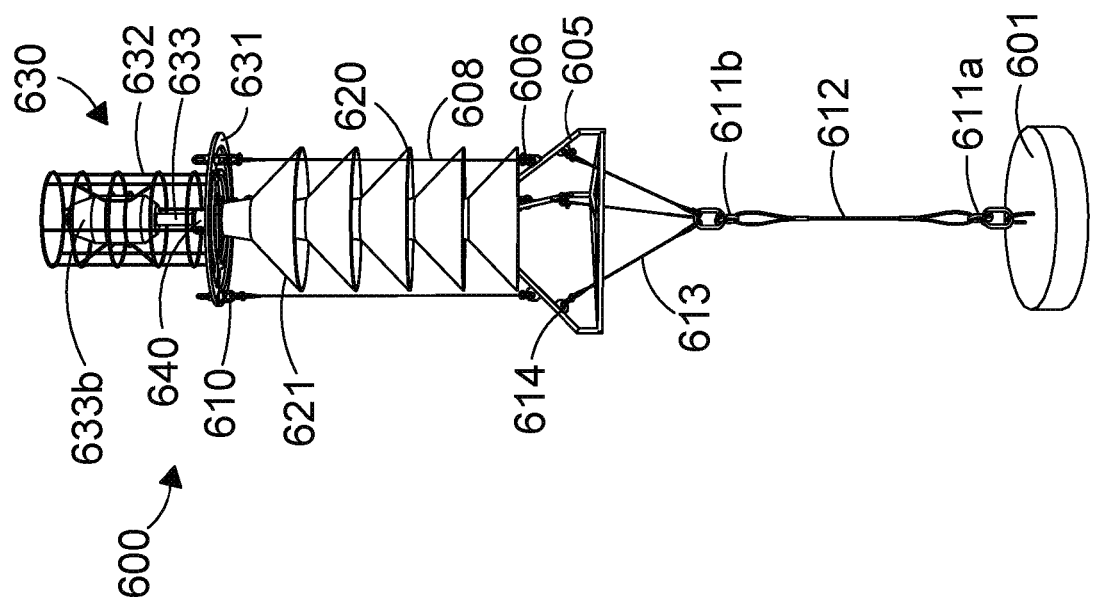
FIG. 41 is a perspective view of a single-wire, buoyant, tethered vertical gathering and concentrating assembly.
Figure 44:
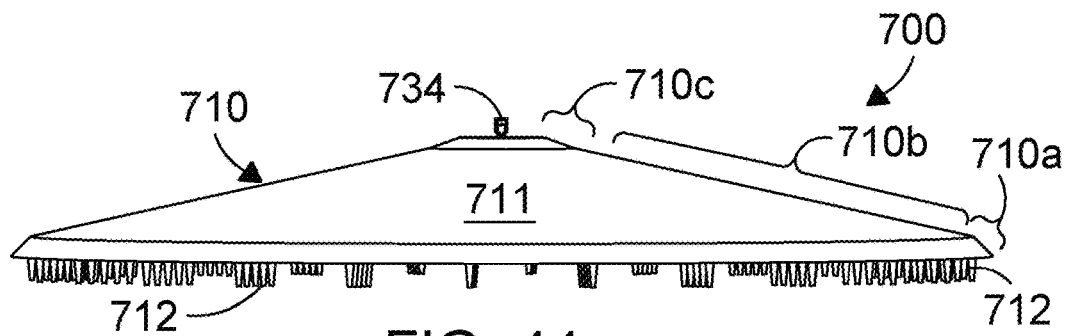
FIG. 44 is a side view of an alternative example of a conical monitoring assembly to that of FIG. 20.

FIG. 41 shows an example of the vertical gathering assembly 600 which is suspended, as opposed to mounted rigidly on the seabed. In this example, features in common with the previous embodiment have their reference numbers increased by 100 for ease of comparison.

Funnels 620, 621 may be made of syntactic foam or similarly buoyant material to encourage the flotation of the stack of funnels 620, 621 and the reaction chamber 640, signalling assembly 630, and so forth. The funnels 620, 621, beacon 630 and other components are tethered by a tether line 612 which is connected at one end 611a to a clump weight 601, and at the other end 611b to three further lines 613 which are connected by shackles 614 to a tripod frame 605. As before the tripod frame 605 is arranged so that the lowermost conical funnel 620 fits over the tripod frame 605 and is thereby supported. The stack of funnels 620, 621 is further supported by a central support rod, not visible in this illustration. Connected by shackles 606 to the tripod frame 605 and shackles 610 to a mounting ring 631 are tension wires 608, augmenting the central support rod as previously described.

The signalling assembly 630 comprises a beacon 633 and buoyancy 633b within a protective cage 632 as previously described. A portion of the beacon 633 extends within the reaction chamber 640 and is restrained by a trigger rod (not shown) until such time as the trigger rod degrades and fails and the alert beacon 633 (with buoyancy 633b) is released.

The suspended example of the invention may be useful where it is known that there is no tracer fluid, SWIFT, or other predetermined chemical of interest within the area of suspension (i.e., within the vertical region between the clump weight 601 and the first conical funnel 620). By utilising a suspended vertical gathering assembly 600, a specific zone of the benthic environment may be targeted for capture of predetermined chemicals.

The dimensions, angles, proportions and other characteristics of the funnels 520, 521 used in the vertical gathering and concentrating assembly 500 may be varied in many ways to influence performance results such as: to increase or decrease the capturing portion 520a, 521a, to withstand higher or lower subsea currents, to pass higher or lower volumes of gathered buoyant material and to vary the amount of overlap between the funnels 520, 521. Similarly, the diameter of the guiding channel 520b, 521b of the conical funnels 520, 521 may be changed to create an assembly with larger capturing portions at the bottom of the stack than the top, or vice versa, depending on the gathering strategy employed for a given well site.

The choice of deploying a tall, rigid stack of gathering funnels which start just above the seabed, or a shorter configuration designed to float tethered well clear of the seabed, is driven in part by the site characteristics of the well being monitored. Prior measurement or modelling of the site bathymetry, coupled with analysis of measured or calculated subsea current data, will indicate if the dispersion and flow behaviour of escaping tracer fluid is better suited to a close-to-seabed capture strategy or a clear-of-the-seabed approach.

Figure 42:
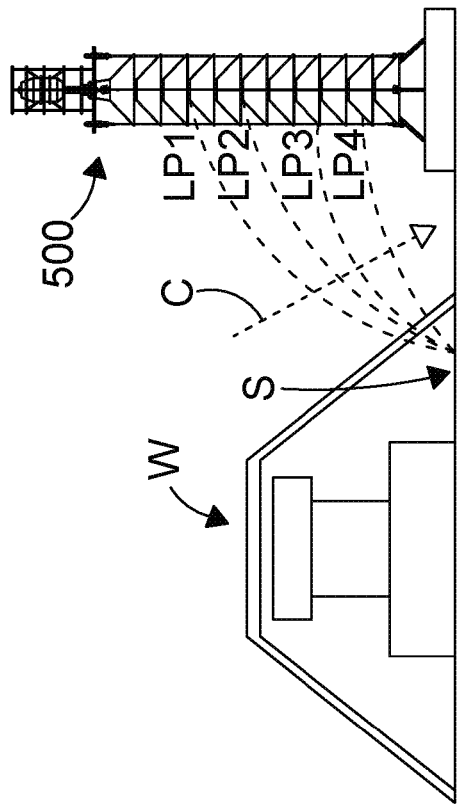
FIG. 42 is a side view of example leak paths from seabed to a vertical gathering and concentrating assembly.

A fundamental aspect of the vertical gathering and concentrating assembly 500, 600 is its ability to capture buoyant material at different heights above the seabed. As the subsea current velocity increases (either owing to the tidal cycle or naturally with height from the seabed), the tracer fluid will move more parallel to the sea floor, but conversely, during low current, e.g. slack tide periods, the tracer will tend to rise more vertically. As illustrated in FIG. 42, if a vertical gathering and concentrating assembly 500 is placed close to the path of the flow, i.e. close to being in-line with the prevailing tidal direction (flood or ebb) with respect to the centre of the monitored well W, then tracer fluid released from the seabed will travel to different vertical points $LP_{1-4}$ in the structure depending on the effect of the current C, where the arrow in FIG. 42 is in the direction of increasing current C. As the current C increases, the path taken by any given droplet of tracer fluid from the seabed to the gathering assembly will move closer to the seabed because the lateral movement is greater due to the current C than the vertical movement caused by natural buoyancy. Thus at a lower current C, a droplet of SWIFT or another fluid may follow path $LP_1$, and as the current C increases, the path of a droplet of tracer fluid will move towards the seabed, following paths $LP_2$, $LP_3$, and potentially at a relatively high current $LP_4$. By analysing available data, creating predictive models or conducting on-site surveys, the heights at which the majority of tracer fluid might be captured can be used to configure the gathering apparatus prior to deployment.

Rather than try to capture all released tracer material under all tidal conditions, a strategy may be adopted whereby it is accepted that the tracer material will not be captured during the fastest flowing tidal conditions. Such an approach avoids the complication of harvesting fast-moving fluid but still allows for significant capture duration throughout the lunar day.

Figure 43:
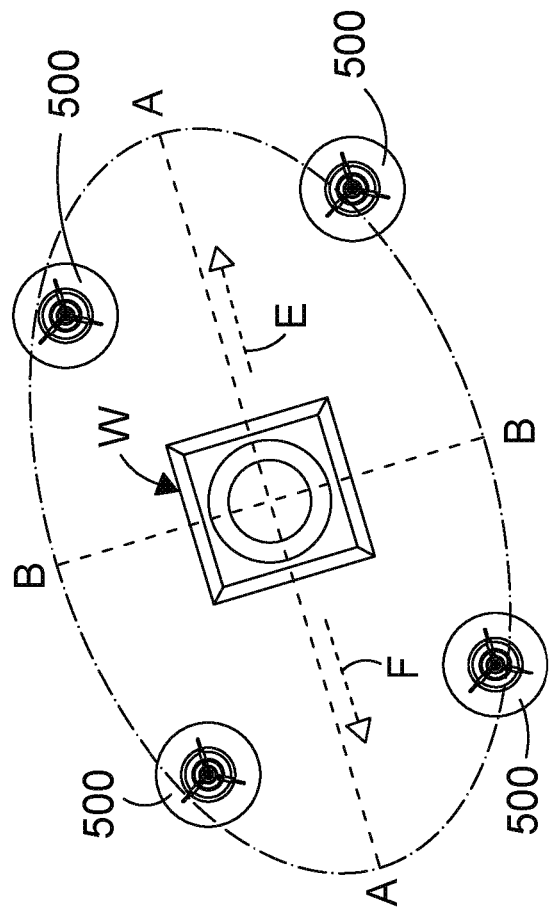
FIG. 43 is a schematic illustration of a multi-assembly deployment around a well, highlighting the choice of location to capture both Flood tide and Ebb tide movements.

One example deployment arrangement of multiple vertical gathering and concentrating assemblies 500 is shown in schematic plan view in FIG. 43. This multi-beacon approach harnesses tidal variation to provide corroboration of a leak. If assemblies 500 are deployed to both the Flood F and Ebb E sides of a well W, then should one of the Flood direction beacons be released this could be regarded as an amber warning. If an Ebb direction beacon is subsequently released this could be taken as a red warning, since tracer material has clearly been gathered in both directions of tidal flow across the well, confirming that there is an issue.

By arranging the assemblies 500 in a manner akin to the corners of a rectangle, another aspect of tidal flow can be addressed, that of elliptical flow patterns. Positioning gathering assemblies not just on the major axis A-A of the tidal ellipse for a well site but also at points spaced parallel to the minor axis of the ellipse B-B, a capture strategy can be implemented to suit the site conditions and tidal behaviours.

Similarly, the global location of the monitoring apparatus needs to be considered such that due account is taken of factors such as whether the body of water is subject to diurnal or semi-diurnal tides.

FIGS. 44-50 show an alternative example of the conical monitoring assembly illustrated in FIGS. 20-28.

Figure 45:
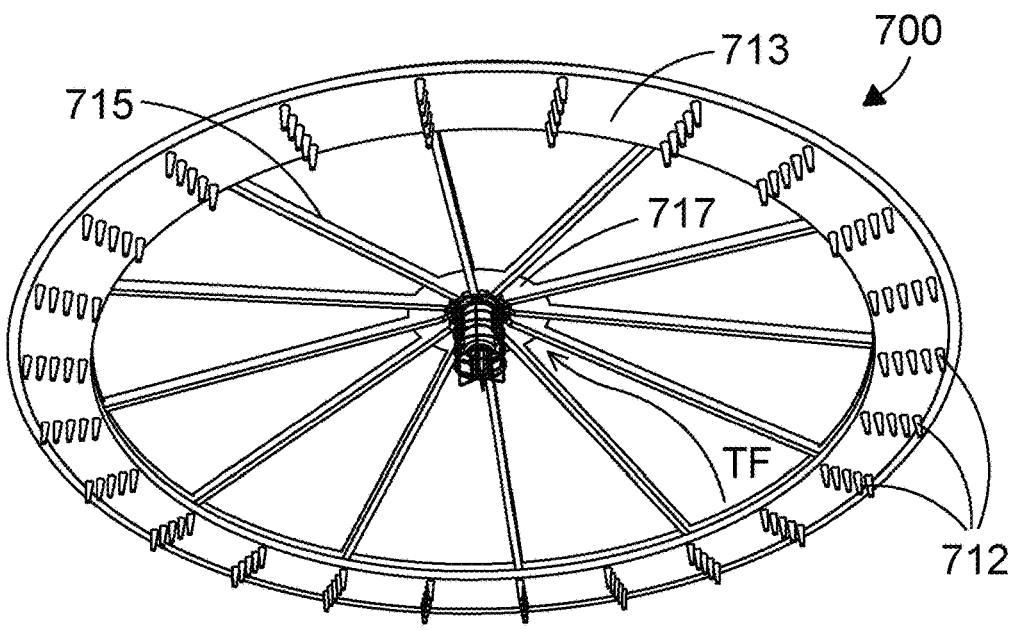
FIG. 45 is a perspective view of the underside of the conical monitoring assembly of FIG. 44.
Figure 46:
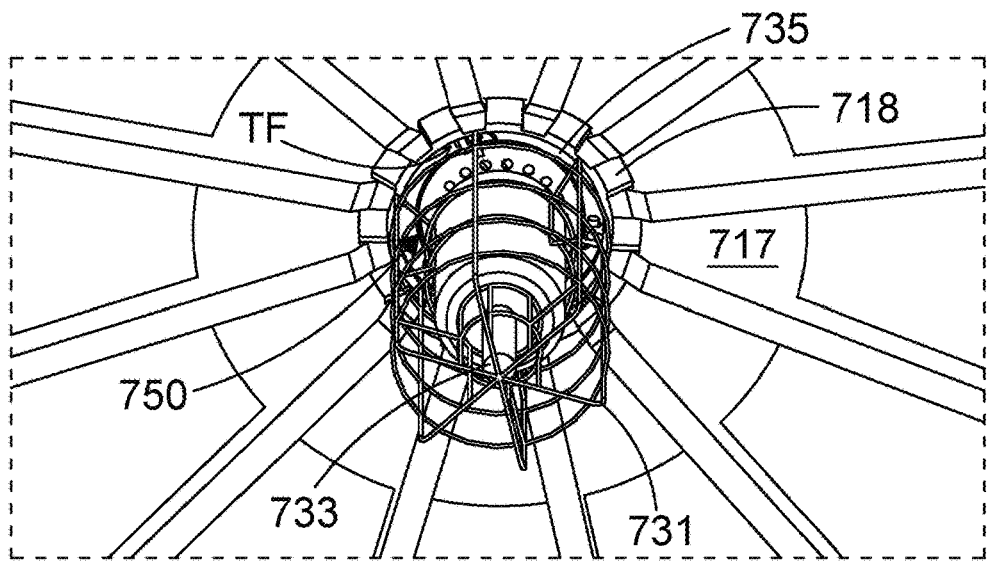
FIG. 46 is a close-up view of the alert assembly of the conical monitoring assembly of FIG. 44.

In this example the assembly 700 comprises a conical gathering cap 710. The gathering cap 710 comprises a circumferential base 713, on which anchoring spikes 712 are placed to anchor the assembly 700 to the sea bed. As best seen in FIG. 45, the spikes 712 are grouped together in substantially equally spaced groups forming radial lines of spikes 712 extending from the inner edge of the circumferential base 713 to the outer edge of the base 713.

The gathering cap 710 comprises a skeleton formed of the circumferential base 713 and a series of ribs 715 connected to the base 713 at one end and extending upwards, forming a conical shape, connecting to a circumferential rim 718 at the upper end of the ribs 715. The gathering cap 710 is then formed by covering the skeleton in a covering or skin 711, which may be flexible or rigid. The ribs 715 provide strength and rigidity to the gathering cap 710, and may assist the skin 711 in guiding gathered fluid towards the reaction volume 736 as will be described below.

The upper surface of the skin 711 of the gathering cap 710 comprises a first gradient 710a corresponding to the circumferential rim 713. This first gradient 710a transitions into a second gradient 710b which is less than the first 710a and which forms the majority of the conical unit 710. At the uppermost end of the conical unit the second gradient 710b transitions into a third gradient 710c which assists in protecting the alert beacon assembly, particularly the ROV/AUV handle 734 which protrudes from the top of the gathering cap 710 to permit an ROV or AUV to access the beacon assembly. In some embodiments, the ROV/AUV handle 734 may be completely surrounded by the gathering cap 710 such that the handle 734 does not protrude above the gathering cap 710. The gathering cap 710 is shaped to reduce the risk of damage from other subsea equipment passing over it such as fishing nets and so forth, or snagging of the same.

Although not shown in the figures, the skin 711 of the gathering cap 710 may be fitted with handles to allow ROV pilots or AUV units to establish a fixed operating position when installing or removing detection and alert assemblies. Similarly, suitable means of deploying and recovering the gathering cap assembly 700 are required, such as multiple lifting points created by forming apertures over the circumferential base 713 and installing pad eyes or similar on the circumferential base 713 or the ribs 715.

As fluid leaks from a well and is captured by the assembly 700, tracer fluid TF (which is preferably buoyant and/or less dense than the surrounding fluid, which is typically sea water) is guided by the inner face of the gathering cap 710 towards the highest point of the assembly 700. At the highest point, the gathering cap 710 comprises an aperture into which the alert beacon assembly 730 is positioned. Around the aperture, to enhance the guiding of the tracer fluid TF towards the alert beacon assembly 730 (and more particularly, towards the reaction volume 736) the tracer fluid TF first encounters a web 717 and then the circumferential rim 718 around the aperture, to which the ribs 715 are connected. The end of the ribs 715 as they connect to the rim 718 are angled to encourage tracer fluid TF flow towards the reaction volume 736, and the rim 718 comprises further angled cut-outs that also act to constrain and direct tracer fluid TF into the reaction volume 736.

The reaction volume 736, trigger rods 742 or trigger system 750, retaining tabs 737, beacon 733 and buoyancy 733b may be assembled as a modular unit 730 that can be released and/or inserted into the gathering cap 710 independently of the deployment of the gathering cap 710, e.g. by ROV or AUV. This modular approach allows those elements of the system to be replaced as necessary, e.g. for system reset, upgrade or long-term maintenance, without the need to disturb the gathering cap 710.

Figure 47:
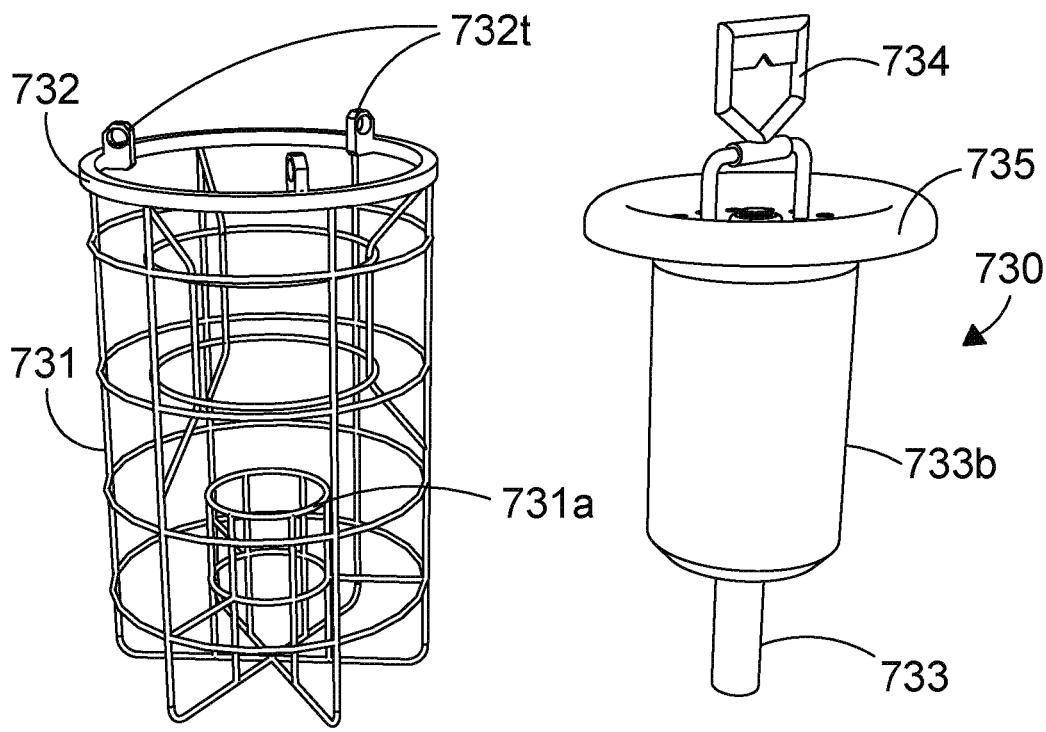
FIG. 47 is an illustration of the frame of the alert assembly of FIG. 46 and, separately, the alert beacon comprising the ROV handle, frame lid, external buoyancy, and the beacon itself.
Figure 48:
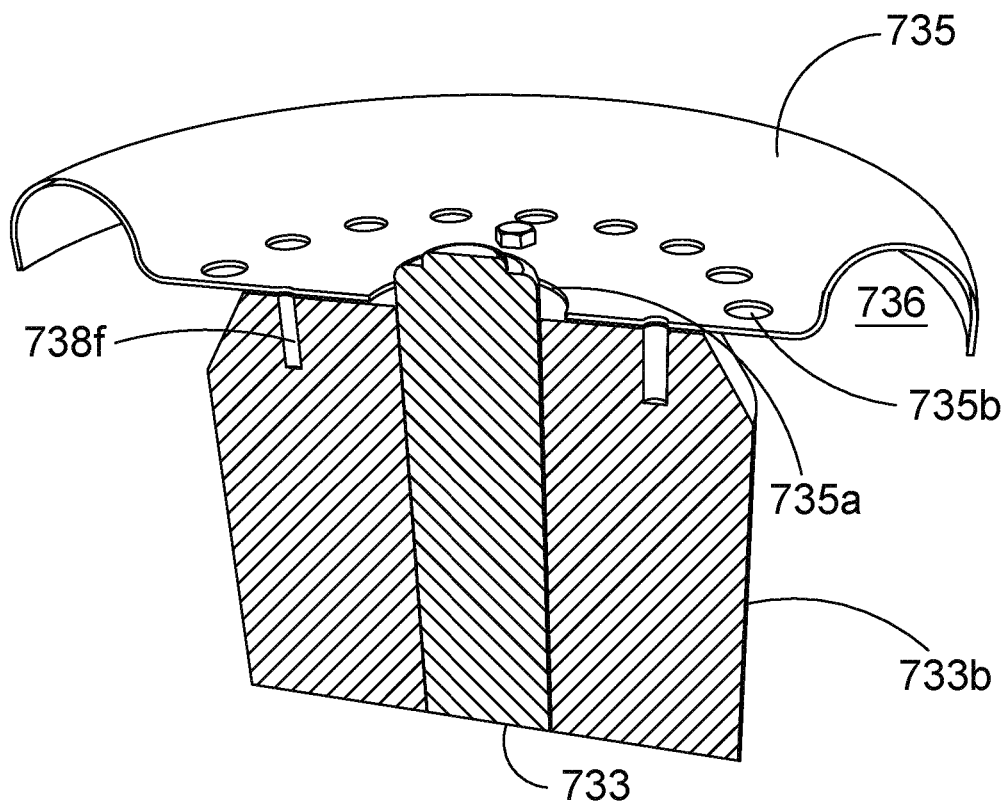
FIG. 48 is a close-up cross-sectional view of the frame lid and upper portion of the alert beacon and external buoyancy of the alert assembly of FIG. 46.

As best seen in FIG. 47, the gathering cap 710 comprises a protective cage 731, into which the alert beacon assembly 730, comprising an alert beacon 733, surrounded by a buoyancy jacket 733b is inserted. Within the cage 731 is a section with a smaller diameter 731a into which the end of the alert beacon 733 that extends downwardly out of the buoyancy 733b fits. The cage 731 thus acts to protect, guide, and partially support the alert beacon assembly 730. The cage 731 is secured to a locking ring 732 which is in turn secured to the skeleton of the gathering cap 710, in particular the ribs 715. Attached to the locking ring 732 are three trigger rod receivers 732t, positioned around the inner circumference of the locking ring 732, aligned vertically, and comprising an aperture through which a trigger rod 742, 752 may pass.

The locking ring 732 engages the locking plate 735 which comprises the reaction volume 736. In particular, the lower, external circumferential edge of the channel forming the reaction volume 736 abuts the upper surface of the locking ring 732 when the assembly 730 is installed.

The reaction volume 736 is in the form of an annular channel that extends around the outer portion of the locking plate 735, within which three trigger rods 742 are secured to retaining tabs 737. The trigger rods 742 are positioned at an angle relative to the retaining tabs 737. As the locking plate 735 is rotated into place, the free end of each trigger rod 742 is thus closer to the centre of rotation in order to permit easier engagement with the trigger rod receivers 732t. The ROV/AUV handle 734 is mounted on top of the locking plate 735. The alert beacon 733 extends through a central aperture 735a in the locking plate 735 and is secured to the ROV/AUV handle 734, while the external buoyancy 733b is secured to the locking plate 735 by bolts 738f which pass through apertures 738 in the locking plate 735.

Once the alert beacon 733 and buoyancy 733b are lowered into the protective cage 731, and the locking plate 735 is seated against the locking ring 732, alert beacon assembly 730 is rotated by the application of rotational force on the ROV handle 734 such that the trigger rods 742, 752 are pivoted about the central vertical axis of the overall apparatus 700 until they pass through, and engage with, the trigger rod receivers 732t attached to the locking ring 732. Once in place, this configuration prevents the removable alert beacon assembly 730 from rising under the influence of the buoyancy 733b until such time as either it is rotated to the release position, or the trigger rods 742, 752 are degraded by the action of the tracer fluid TF.

The locking plate 735 is illustrated here with a uniformly domed portion forming the channel 736, although this may be changed to change the shape of the channel. For example, it may be advantageous to reduce the volume of the channel and limit the space in which the tracer fluid TF gathers, such as a smaller volume around the trigger rods. In that case, the trigger rods may have a domed section formed over them, and the rest of the channel may be flattened out so that little or no volume is available for buoyant material (and therefore tracer fluid) to gather.

The locking plate 735 comprises apertures 735b in the central, flat portion of the plate 735, in this example circumferentially arranged, but other arrangements would be suitable as would be evident to the skilled person. The apertures 735b permit excess material to pass out of the top of the assembly 700 rather than becoming trapped (and potentially restricting access to the trigger rods 742, 752 by tracer fluid TF). The apertures 735b also assist in reducing drag forces after the alert beacon assembly 730 has been released through degradation and failure of the trigger rods 742, 752.

Figure 49:
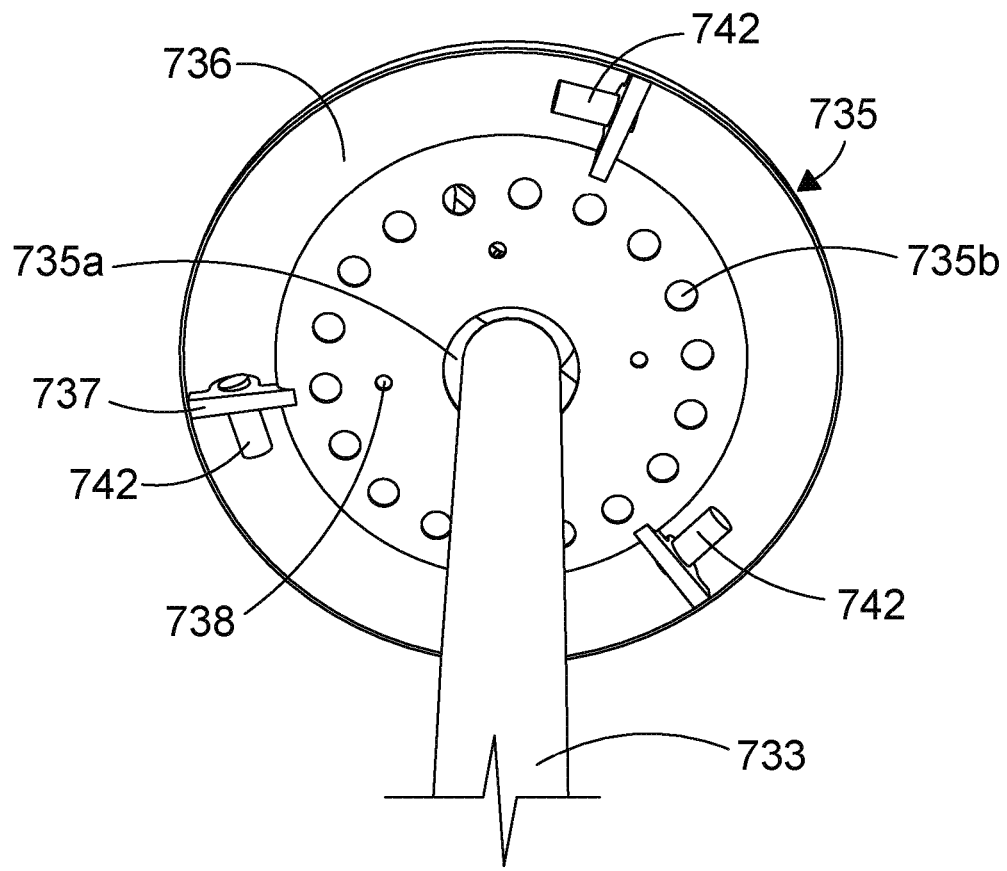
FIG. 49 is a perspective view of the underside of the lid of the alert assembly of FIG. 46 and the alert beacon with trigger rods installed.

The locking plate 735 may be secured to the trigger rod receivers 732t with trigger rods 742 alone as best seen in FIG. 49. In this example, the trigger rods 742 degrade over time as they encounter tracer fluid TF and undergo the chemical reactions leading to degradation of the rods 742. The rods 742 may not fail simultaneously due to possibly asymmetry in the concentrations of tracer fluid encountered by the trigger rods 742.

Once all three trigger rods 742 have been sufficiently degraded to no longer resist the buoyant force of the buoyancy 733b, the trigger rods 742 will fail and the buoyancy 733b will push the locking plate 735 in an upwards direction, disengaging the plate 735 and thereby the alert beacon assembly 730 from the locking ring 732 and the protective cage 731. The alert beacon assembly 730 can then rise to the water surface and transmit an alert as previously described.

Figure 50:
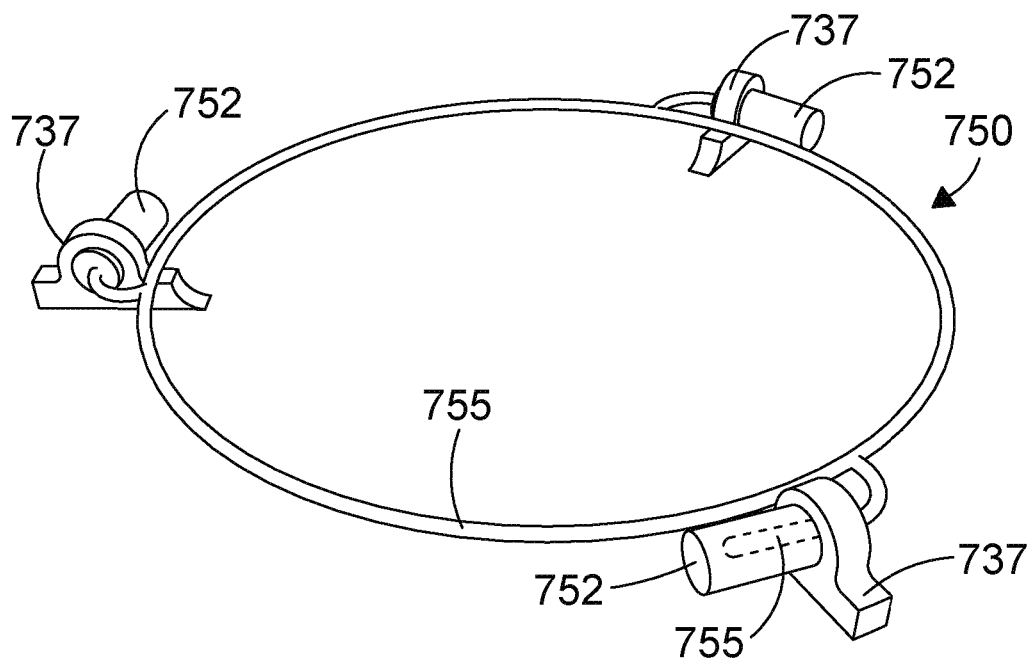
FIG. 50 shows an alternative embodiment of an example system for accelerating failure of trigger rods subsequent to failure of a first trigger rod and which can be used with the frame lid of FIG. 49.

Alternatively, it may be useful for all three trigger rods 752 to fail substantially simultaneously. An alternative embodiment of a trigger system 750 is shown in FIG. 50 and comprises three trigger rods 752 which are secured within retaining tabs 737 in a similar manner to the trigger rods 742 as previously described. The trigger rods 752 are interconnected by a fuse line 755 which contains a material that is selected to react rapidly with water (for example sodium metal), SWIFT, tracer fluid, or another predetermined chemical, surrounded by a suitable protective covering or layer. The fuse line 755 extends partially within each trigger rod 752, aligned with the trigger rod's 752 central axis. At least a portion of the fuse line 755 within the trigger rod 752 is uncovered, and thereby reacts rapidly when contact is made with the chemical with which it has been selected to react, e.g. water, SWIFT, etc. The trigger system 750 is configured to fit within the reaction volume 736 of the locking plate 735 (best seen in FIG. 46).

When one trigger rod 752 has degraded sufficiently that water has entered the core of the trigger rod 752 and contacted the fuse line 755 within the centre of the trigger rod 752, the rapid reaction of the fuse chemical with the water causes the trigger rod 752 to lose what remains of its mechanical integrity. As the trigger rods 752 are interconnected by the fuse line 755, as soon as one section of the fuse line 755 is exposed to water, the effect of this reaction is transmitted through the fuse line 755 to the remaining trigger rods 752, causing failure of the trigger rods 752. The alert beacon assembly 730 would thus be released very soon after the first trigger rod 752 were to fail.

The use of such a sacrificial region in the design of a trigger system may be adjusted and varied as required, for example by selectively responding to different stimuli and responding in different ways to those stimuli.

Dye or another indicative fluid may be incorporated into the trigger rod(s) to serve as a visual or chemical indication of damage to the trigger rod. For example, if a trigger rod is damaged in transit, a dye would alert the operator to the damage before the trigger rod was installed, or the assembly was deployed.

Trigger rods having different diameters may be used with the conical monitoring assembly 700 (and with any of the previously described examples of the invention). The use of trigger rods having different diameters provides a multi-stage alert where different beacons may be released to signify an ongoing leak, to corroborate a leak, and to provide a rudimentary indication of the severity (flow rate) of the leak. Multiple alert beacons may be disposed under a single gathering cap, and released in sequence in response to the influence of the tracer fluid/SWIFT on varying diameters of trigger rod.

Although the disclosure discussed herein is presented primarily with respect to decommissioned oil and gas wells, it will be readily understood that many of the systems and methods described are applicable to other scenarios, such as producing or suspended wells, or carbon dioxide storage sites, where passive monitoring of the surrounding environment may be required or advantageous.

What is claimed is:

1. An apparatus configured to monitor the integrity of a subsea well or fluid sequestration site and configured to operate on or above a seabed and below a sea surface;
   wherein the apparatus comprises a detection mechanism configured to chemically react to contact with a predetermined chemical and thereby release a signaling device, wherein the predetermined chemical is released from the subsea well or the fluid sequestration site when it has suffered a loss of integrity, so that detection of the predetermined chemical is indicative of the loss of integrity in the subsea well or fluid sequestration site;
   wherein the signaling device comprises at least one beacon configured to transmit a signal to alert an operator to a loss of integrity in the subsea well or fluid sequestration site;
   wherein the at least one beacon has internal or external buoyancy; and
   wherein the signaling device is configured to rise to the sea surface and thereby transmit the signal to alert the operator to the loss of integrity in the subsea well or fluid sequestration site.

2. The apparatus as claimed in claim 1, wherein the detection mechanism comprises material that degrades in response to contact with the predetermined chemical.

3. The apparatus as claimed in claim 2, wherein contact with the predetermined chemical causes degradation of the material forming the detection mechanism, leading to loss of structural integrity of the detection mechanism; wherein the loss of structural integrity of the detection mechanism initiates release of the signaling device.

4. The apparatus as claimed in claim 1, wherein the detection mechanism comprises at least two trigger devices that degrade in response to contact with the predetermined chemical, wherein each trigger device is connected to each further trigger device by a failure acceleration line, wherein the failure acceleration line comprises a material configured to react rapidly with a selected fluid and thereby accelerate failure of subsequent trigger devices following degradation of a first trigger device.

5. The apparatus as claimed in claim 1, wherein the predetermined chemical is a tracer fluid.

6. The apparatus as claimed in claim 1, wherein the signaling device is configured to communicate with a satellite network, and wherein the satellite network is configured to relay the signal to a party monitoring the subsea well or fluid sequestration site.

7. The apparatus as claimed in claim 1, further comprising at least one unit configured to capture and gather volumes of the predetermined chemical.

8. The apparatus as claimed in claim 7, wherein the at least one unit comprises a conically shaped portion, wherein the conically shaped portion comprises a lower end having a first diameter, an upper end having a second diameter, and walls, the first diameter being larger than the second diameter, wherein the lower end of the conically shaped portion is open and configured to capture volumes of the predetermined chemical, and wherein the upper end of the conically shaped portion comprises at least one aperture.

9. The apparatus as claimed in claim 8, wherein the unit comprises a circumferential base for anchoring the unit to a seabed, wherein a plurality of ribs are connected at a first end to the circumferential base, wherein the ribs are connected at a second end to an annular brace, wherein the annular brace comprises a smaller diameter than the circumferential base, thereby forming a conical structure, and wherein the circumferential base, ribs, and annular brace form a skeleton on which a covering can be placed to form the conically shaped portion of the at least one unit.

10. The apparatus as claimed in claim 9, wherein the covering is configured to guide the captured predetermined chemical towards the at least one detection mechanism.

11. The apparatus as claimed in claim 8, wherein an alert beacon assembly is connected to each aperture of the unit, the alert beacon assembly comprising a signaling device and a locking cap configured to cap the aperture at the upper end of the conically shaped portion of the unit.

12. The apparatus as claimed in claim 11, wherein the locking cap is secured to the unit, and wherein the locking cap comprises a reaction volume within which one or more detection mechanisms are disposed, wherein the one or more detection mechanisms are configured to attach the locking cap to the unit.

13. The apparatus as claimed in claim 12, wherein one or more detection mechanisms degrade in response to contact with the predetermined chemical; wherein degradation of one or more of the detection mechanisms leads to loss of structural integrity of all of the detection mechanisms, thereby disconnecting the locking cap from the unit and releasing the alert beacon assembly.

14. The apparatus as claimed in claim 11, wherein the alert beacon assembly is configured to be removably connected to each aperture of the unit, wherein the assembly is connectable to and/or removable from each aperture of the unit.

15. The apparatus as claimed in claim 10, wherein the guiding means comprises at least one channel, wherein each channel is connected to an aperture at the upper end of the conically shaped portion of the unit.

16. The apparatus as claimed in claim 15, wherein the apparatus comprises a plurality of units arranged substantially vertically, and wherein the apparatus is anchored to the sea bed.

17. The apparatus as claimed in claim 16, wherein the apparatus comprises a central support aligned along a central vertical axis of the apparatus and configured to support the vertically arranged units.

18. The apparatus as claimed in claim 17, wherein the conically shaped portion of a first unit overlaps at least partially with the conically shaped portion of a second unit, and wherein the channel of the second unit is received at least partially within the channel of the first unit.

19. The apparatus as claimed in claim 18, wherein the apparatus comprises a reaction chamber adapted to contain at least a portion of at least one detection mechanism and at least a portion of at least one signaling device, wherein the at least one detection mechanism is configured to restrain the at least one signaling device in a secured position until the at least one detection mechanism degrades and thereby releases the at least one signaling device, and wherein the reaction chamber comprises at least one opening in a first end through which the predetermined chemical is received.

20. The apparatus as claimed in claim 19, wherein the apparatus comprises a mounting means comprising a lower face, an upper face, and a central aperture, wherein the lower face of the mounting means is configured to engage an uppermost unit in the plurality of units such that the channel of the uppermost unit is aligned with the central aperture of the mounting means, and wherein the reaction chamber is configured to be mounted onto the upper face of the mounting means such that the opening in the first end of the reaction chamber is aligned with the central aperture of the mounting means.

21. The apparatus as claimed in claim 20, wherein the apparatus comprises a locking ring configured to be inserted within the central aperture of the mounting means, wherein the locking ring is configured to engage the central support of the apparatus and thereby tension the vertical arrangement; wherein the locking ring comprises at least one further aperture configured to provide a pathway for the predetermined chemical to pass from the plurality of units to the reaction chamber.

22. The apparatus as claimed in claim 19, wherein the reaction chamber comprises a shaped device that is adapted to focus the predetermined chemical towards at least one single locus on the detection mechanism as the fluid enters the reaction chamber, so that said locus preferentially degrades.

23. The apparatus in as claimed in claim 1, further comprising a plurality of the apparatuses, wherein each of the apparatuses comprises more than one detection mechanism, wherein each detection mechanism is configured to retain another signaling device, and wherein each detection mechanism comprises different mechanical, reactive, and/or physical properties configured to provide the detection mechanism with a given failure time.

24. A method of detecting a loss of integrity in a subsea well or fluid sequestration site, the method comprising the steps of deploying at least one apparatus as claimed in claim 1 on and/or around a subsea well or fluid sequestration site.

25. The method as claimed in claim 24, wherein the method includes selecting deployment positions for each, apparatus in accordance with prevailing tidal directions in the proximity of the well or sequestration site.

26. The method as claimed in claim 24, wherein the method includes deploying a plurality of apparatuses; and providing each apparatus with a different detection mechanism comprising different mechanical, reactive, and/or physical properties configured to provide the detection mechanism with a given failure time.

27. The method as claimed in claim 24, further comprising deploying more than one apparatus; configuring each signaling device with a unique signal; and upon receipt of a signal from a signaling device, cross-referencing the signal with a deployment location of the signaling device.

28. The method as claimed in claim 24, further comprising inserting a volume of predetermined chemical into the subsea well or fluid sequestration site so that it is, at least initially, sealed within the subsea well or fluid sequestration site.

29. The method as claimed in claim 28, further comprising inserting a volume of a first predetermined chemical into a first location in the subsea well or fluid sequestration site, and a volume of a second predetermined chemical into a second location in the subsea well or fluid sequestration site, so that the first and second predetermined chemicals are, at least initially, sealed within the respective location of the subsea well or fluid sequestration site.

* * * * *